United States Patent [19]

Chan et al.

[11] Patent Number: 4,520,506

[45] Date of Patent: May 28, 1985

[54] METHOD AND SYSTEM FOR COMPRESSION AND RECONSTRUCTION OF CULTURAL DATA FOR USE IN A DIGITAL MOVING MAP DISPLAY

[75] Inventors: Luen C. Chan, Indian Harbor Beach; Paul B. Beckwith, Indialantic; Jeffrey B. Pearce, Melbourne, all of Fla.

[73] Assignee: Harris Corporation, Melbourne, Fla.

[21] Appl. No.: 313,327

[22] Filed: Oct. 20, 1981

[51] Int. Cl.³ .............................................. G06K 9/36
[52] U.S. Cl. ...................................... 382/56; 340/739; 340/812; 358/133; 358/135; 358/260; 382/60
[58] Field of Search .................. 382/56, 54, 55, 21, 382/22, 24, 60; 358/260, 133, 135; 340/739, 812; 364/521

[56] References Cited

U.S. PATENT DOCUMENTS

| | | | |
|---|---|---|---|
| 3,769,442 | 10/1973 | Heartz | 364/516 |
| 4,015,239 | 3/1977 | Fujimoto | 382/24 |
| 4,020,463 | 4/1977 | Himmel | 382/56 |
| 4,087,788 | 5/1978 | Johannesson | 382/56 |
| 4,189,711 | 2/1980 | Frank | 382/56 |
| 4,300,122 | 10/1981 | McMahon | 382/56 |

Primary Examiner—Howard W. Britton
Attorney, Agent, or Firm—Antonelli, Terry & Wands

[57] ABSTRACT

A method and digital system for the compression and reconstruction of cultural data for use with display systems, such as a system for producing a real time moving map display of terrain, provides a modified footprint/common boundary technique for data compression in which the footprint extends forward of the last point generated along a line in the direction of the line to that point. The particular scheme for compressed data reconstruction employs the storage of footprint data in such a manner that change in line direction information is automatically provided along with the necessary delta data information so that the direction of the line can be constantly updated as each point is generated. The compression of area cultural features involves a double compression of data based on a common boundary approach and the linear compression techniques of the modified footprint technique. In addition, in the reconstruction of compressed cultural data, changes in scale factor are accommodated along with feature deselection based on the selected scale factor.

43 Claims, 64 Drawing Figures

ORIGINAL

LEADING EDGES

COMPRESSED

RECONSTRUCTED

CULTURAL FEATURE RECONSTRUCTION
SEQUENCER PROGRAM
TOP LEVEL BLOCK DIAGRAM

MAIN PROGRAM

MAIN PROGRAM

MAIN PROGRAM

SUBBLOCK SEARCH ROUTINE

SUBBLOCK SEARCH ROUTINE

AREA BOUNDARY WRITE ROUTINE 12.5m

AREA BOUNDARY WRITE ROUTINE 12.5m

AREA BOUNDARY WRITE ROUTINE 12.5m

AREA BOUNDARY WRITE ROUTINE 12.5m

AREA BOUNDARY WRITE ROUTINE 12.5m

AREA BOUNDARY WRITE ROUTINE 12.5m

AREA BOUNDARY WRITE ROUTINE 12.5 m

AREA BOUNDARY WRITE ROUTINE
12.5 m

AREA BOUNDARY WRITE ROUTINE 12.5 m

AREA BOUNDARY WRITE ROUTINE 12.5 m

AREA BOUNDARY WRITE ROUTINE
25, 50, 100 m

AREA BOUNDARY WRITE ROUTINE
25, 50, 100 m

AREA BOUNDARY WRITE ROUTINE
25, 50, 100 m

AREA BOUNDARY WRITE ROUTINE
25, 50, 100m

AREA BOUNDARY WRITE ROUTINE
25, 50, 100m

AREA BOUNDARY WRITE ROUTINE
25, 50, 100 m

AREA BOUNDARY WRITE ROUTINE
25, 50, 100 m

AREA BOUNDARY WRITE ROUTINE
25, 50, 100 m

AREA FILL ROUTINE

LINEAR WRITE ROUTINE

LINEAR WRITE ROUTINE

LINEAR WRITE ROUTINE

LINEAR WRITE ROUTINE

LINEAR WRITE ROUTINE

LINEAR WRITE ROUTINE

LINEAR FEATURE WRITE ROUTINE

LINEAR FEATURE WRITE ROUTINE

LINEAR WRITE ROUTINE

LINEAR WRITE ROUTINE

FIND POINT FEATURE ROUTINE

POINT WRITE ROUTINE

POINT WRITE ROUTINE

POINT WRITE ROUTINE

POINT WRITE ROUTINE

POINT WRITE ROUTINE

POINT WRITE ROUTINE

METHOD AND SYSTEM FOR COMPRESSION AND RECONSTRUCTION OF CULTURAL DATA FOR USE IN A DIGITAL MOVING MAP DISPLAY

The Government has rights in this invention pursuant to Contract No. DAAK80-80-C-0780 awarded by the Department of the Army.

FIELD OF THE INVENTION

The present invention relates in general to information display systems, and more particularly, to a method and digital system for the compression and reconstruction of cultural data, including linear, area and point features, for use in conjunction with a real time moving map display of terrain data over which a vehicle, such as an aircraft, is passing, or a simulation thereof.

BACKGROUND OF THE INVENTION

In the navigation of an aircraft alonq a route to a specified destination, various types of equipment are available to the pilot to aid in the navigation of the aircraft to that destination, including rather-sophisticated navigational computer systems which are capable of providing such information as heading, altitude, geographical position, ground speed, and the like. However, pilots still rely to a large extent on the visual observation of check points along the route to the selected destination. Thus, the visual observation of cultural terrain features such as rivers, lakes and natural rock formations, as well as man-made cultural features such as roads, towns and significant structures, provide an important guide to the pilot in his navigation of the aircraft.

On the other hand, as a result of weather conditions, it may not be possible to visually observe the terrain for these cultural checkpoints, the visibility of which is also impaired to a great extent during hours of darkness. Thus, it is highly desirable to make available to the pilot some means of picking out cultural checkpoints along the path of the aircraft as it proceeds towards its selected destination. To this end, various systems have been proposed, including radar scanning systems and systems using preprocessed films of terrain over which an aircraft is to pass for providing to the pilot a display which simulates that which he would visualize if he were to actually view the terrain over which the aircraft is passing.

One of the most-recent developments in the area of terrain display systems relates to a system for the real-time dynamic display of terrain data which is stored in compressed digital form and which may be viewed on a cathode ray tube display in the form of a moving map that is automatically oriented under the control of the aircraft's navigational computer system to the instantaneous position of the aircraft with a heading-up disposition. This system is disclosed in copending U.S. application Ser. No. 224,742, filed Jan. 13, 1981 now abandoned, and refiled as a continuation application on Aug. 15, 1984, which application is entitled "Digital Map Generator and Display System", filed in the name of Paul B. Beckwith, Jr., and is assigned to the same assignee as the present application.

The system disclosed in the above-mentioned copending application provides a topographical two-dimensional display of the terrain over which the aircraft is passing on the basis of digital data stored on a cassette tape as data compressed in the transform domain, thereby permitting the storing of large quantities of terrain data for use in generating the moving map display.

The compressed terrain data is read from the cassette tape as the aircraft traverses the terrain to provide instantaneous access to that data relating to the terrain over which the aircraft is passing and this data is reconstructed by decompression processing and is stored in a scene memory with a north-up orientation. The terrain data is then read out of the scene memory in a direction related to the heading of the aircraft, the elevation data thus read out is processed to provide slope shading and a video display in the form of a real-time moving map of terrain is generated therefrom.

In the above-mentioned display system, the addition of cultural data to the real-time display even more particularly enhances the realistic aspects of the information available to the pilot and provides the check points in the display which aid the pilot in the navigation and guidance of the aircraft. In the system described in U.S. application Ser. No. 224,742, it is proposed that the elevational data be compressed in accordance with a hybrid discrete cosine transform (DCT) compression algorithm, with differential pulse code modulation (DPCM) being used to transmit the DCT coefficient differences between each row of grid points. In reconstruction of this data, all of the in-between picture element (pixel) points are filled in by interpolation directly from the DCT transform in one direction and in the other direction, the DPCM data is interpolated to provide data to fill in intermediate lines. However, for cultural data which occupies only selected portions of the display area, this type of compression entails undesirably-large storage requirements for the relatively-small amount of data involved. For example, for a $512 \times 512$ pixel display of cultural having a single river or road as terrain data extending across a portion of the display, it would not be efficient to store all 262,144 pixels even in a compressed form simply to display what would appear as a single line in the display.

One solution to the problem of compression and storage of cultural data in a moving map display is based upon the display of these cultural features as individually-generated characters with different types of cultural features being designated by different digital values. In this regard, a footprint technique of generating lines in a video display may be used in which the data for the display is stored in the form of an address of the beginning point of the line to be generated and subsequent delta code values defining the incremental steps in respective X and Y directions for generating line segments from the beginning point through successive points on the line to the end point thereof. In accordance with the footprint scheme of line generation, as each point on the line is generated, the next point is determined on the basis of a delta code $(\Delta X, \Delta Y)$ which is capable of identifying the footprint or pattern of points in an area surrounding the last point generated. Thus, where the delta code consists of eight bits, the footprint will consist of a pattern of $16 \times 16$ points symmetrically disposed with respect to the last point generated along the line. However, with this type of scheme, the maximum spacing of points along the generated line on the basis of the eight bit delta code will be approximately eight points, which is the distance between the center and one corner of the square pattern surrounding the last point generated. Thus, the degree of compression which can be achieved using this footprint technique is limited.

BRIEF DESCRIPTION OF THE INVENTION

It is one object of the present invention to provide a method for compression and storage of cultural data using an improved footprint technique for line generation with respect to both linear features and area features of a moving map display.

It is another object of the present invention to provide a reconstruction processor which is capable of reconstructing the compressed cultural data for generation of a real time moving map display of the terrain and the cultural features thereof in relation to the position of an aircraft passing over that terrain.

It is still another object of the present invention to provide a system for generating a real time moving map display of terrain including cultural features associated with the terrain over which an aircraft is passing.

In accordance with this invention, a modified footprint/common boundary technique is proposed for the compression and subsequent reconstruction of cultural data to be provided along with elevation data in a real-time moving map display of terrain over which a vehicle, such as an aircraft, is passing. The compression of the cultural data, insofar as linear and area features are concerned, is based on a line generating technique involving the storing of the address of the starting point of the line and delta code values which identify subsequent points on the line on the basis of a footprint which extends primarily forward of the previously-determined point in the general direction of the last segment of the line which has been generated to that point. In this way the degree of compression can be substantially doubled, since the footprint is no longer symmetrically disposed with respect to the last point generated, but provides almost its entire area forward of that point in the direction the line is most likely to continue, i.e., in the same direction it was proceeding up to the last point generated on the line.

Since the compression technique provided by the present invention requires a knowledge of the direction of the line up to the last point generated, to begin line generation, both the address of the first point on the line and an initial direction must be provided. Thus, in the compression of cultural data in accordance with the present invention, both an address and an initial direction must be stored along with the delta code values and the identity of the feature. However, this additional need to store an initial direction for each line to be generated increases storage requirements insignificantly as compared to the much larger number of delta code values which need to be stored in connection with the conventional footprint scheme of compression.

The present invention also provides a novel approach to the compression and reconstruction of area cultural features through a common boundary approach. Terrain is basically made up of contiguous area features on which linear and point features are superimposed insofar as the cultural aspects of the terrain are concerned. The present invention provides for the compression of area cultural features by means of the same modified footprint scheme as used for linear features to store data relating to the boundary of the area, and then, during reconstruction, the area is filled in to provide the data for display of the complete area. However, it will be recognized that the common boundary of two contiguous areas need not be stored in connection with both areas in the compression of these features, since this would result in the unnecessary storage of the same data twice and redundant operations in the reconstruction of the compressed data, and this would unnecessarily limit the degree of compression of this data which otherwise could be achieved.

In the common boundary approach of the present invention, only the left facing boundaries of area features are compressed and stored. Then during reconstruction of this data, the common boundaries will be generated only once in conjunction with the area feature which is positioned more right in the display of terrain. Subsequent thereto, using a fill-in procedure which involves a left-to-right scanning of the reconstructed data, pixels are filled in according to the feature identification of each boundary encountered along the scanning line.

A further compression of area features is achieved by treating the left-facing boundaries of the area features as a linear feature. Thus, the area feature is compressed first by taking only the left-facing boundaries, and then a second compression results from treating these left-facing boundaries in the same manner as linear features by reducing them to a starting point address, initial direction and a series of delta code values.

In the compression and reconstruction of cultural data, certain types of features are processed prior to others in accordance with a selected priority. That is, since point features, for example, will generally provide more important information in the resulting display than linear features, and since area features should not be allowed to override either linear or point features, area features are processed first followed by linear features and then point features are processed last. Thus, in the reconstruction of the compressed cultural data, the compressed area feature data is first reconstructed to provide the area boundaries and then these areas are filled in. This is followed by reconstruction of the compressed linear feature data, which is then written over the reconstructed area feature data. The point features are then written over this data to produce the complete cultural data pattern for display.

In the reconstruction of both area and linear features, which have been compressed using the modified footprint/common boundary technique of the present invention, a footprint memory in the form of a programmable read-only memory (PROM) stores the footprint pattern of values required for the line generation operation on which reconstruction of these features is based. Such line generation is based on the generation of a designated number of points in a certain direction in accordance with designated $\Delta X$ and $\Delta Y$ values. In such line generation incrementing will be by unit steps in either the X or the Y direction, while, fractional steps are taken in the other of these directions. In addition, the direction of line generation must be known so as to know whether incrementing or decrementing is to be carried out in the respective X and Y directions. Finally, the total number of unit steps to be taken in generating each segment of the line must be known. Thus, each delta code value of the compressed cultural data must provide the value of the fraction to be used in incrementing, the number of unit steps to be taken in generating the line segment and directional information which identifies whether the unit direction is the X or the Y direction, whether the unit direction of incrementing is positive or negative, and whether the fractional direction of incrementing is positive or negative.

This is accomplished by storing all of this data for each line segment to be generated in a respective PROM storage location in the footprint memory which is uniquely identified by the particular delta code value.

Since the footprint scheme of the present invention is based on the generation of line segments with reference to an initial direction or the direction of the last line segment which was generated, the footprint memory stores as directional information the change in direction of the point identified by the applied delta code, and this value is added to the direction of the previously-generated line segment to provide the new direction of the line. For this purpose, the footprint data is stored in the footprint memory in eight sectors, each sector including those points in the footprint which have the same unit and fraction signs and the same unit identification (X or Y). Thus, each sector of data in the footprint memory may also be assigned a unique delta direction, so that when the footprint is aligned with the direction of the previously-generated line segment, the directional change is automatically read out of the footprint memory by the applied delta code along with the value of the fraction and the number of unit steps to be taken in generating the next line segment.

A further feature of the present invention relates to the ability to reconstruct the compressed cultural data in accordance with a selected scale factor and to also automatically select or deselect the display of certain cultural features on the basis of such scale factor. In this regard, the line generation which comprises the reconstruction of linear features and the half-boundaries of area features is effected by generation of successive X and Y addresses by successive incrementing (or decrementing) from an initial address. To provide a display at a selected scale factor, circuitry is provided in the reconstruction processor for modifying the generated X and Y addresses in accordance with the scale factor and a comparing operation with respect to the resulting pixel positions insures that left-facing boundaries of area features are preserved. In addition, on the basis of the feature identification, which forms part of the compressed cultural data, and the selected scale factor, the processor automatically deselects those features which may not be desired in the resulting display at that scale.

These and other objects, features and advantages of the present invention will become more apparent from the following detailed description thereof, when taken in conjunction with the accompanying drawings.

BRIEF DESCRIPTION OF THE DRAWINGS

FIG. 5b is a schematic diagram illustrating the reconstruction of the compressed linear features of FIG. 5a;

FIGS. 7a through 7c are schematic diagrams which in combination illustrate the cultural reconstruction processor, in which FIG. 7a represents the data processing portion of the cultural reconstruction processor, FIG. 7b represents the scale factor control portion thereof, and FIG. 7c represents the feature control portion thereof;

DETAILED DESCRIPTION OF THE INVENTION

One of the basic problems faced by systems which attempt to provide a visual display of terrain on the basis of stored digital information relates to the ability to store sufficient information to provide all of the elevation and cultural features for a significant area of terrain over which the aircraft might wish to travel without limitation to a single predetermined flight path. In this regard, efficient digital terrain data storage is absolutely essential to a reduction of the capacity of the data base memory required for each aircraft if the on-board system is to be reduced to a practical size. The basic objective in this regard is to provide a practical aircraft operating range that can be mission updated through the storage of the elevation and cultural data in compressed form. This may be accomplished for elevation data by utilizing a compression approach which serves to convert the spatial elevation points to the frequency domain. For the compression of cultural data, a modified footprint/common boundary technique for line generation is proposed in accordance with the present invention.

Figure 1A:
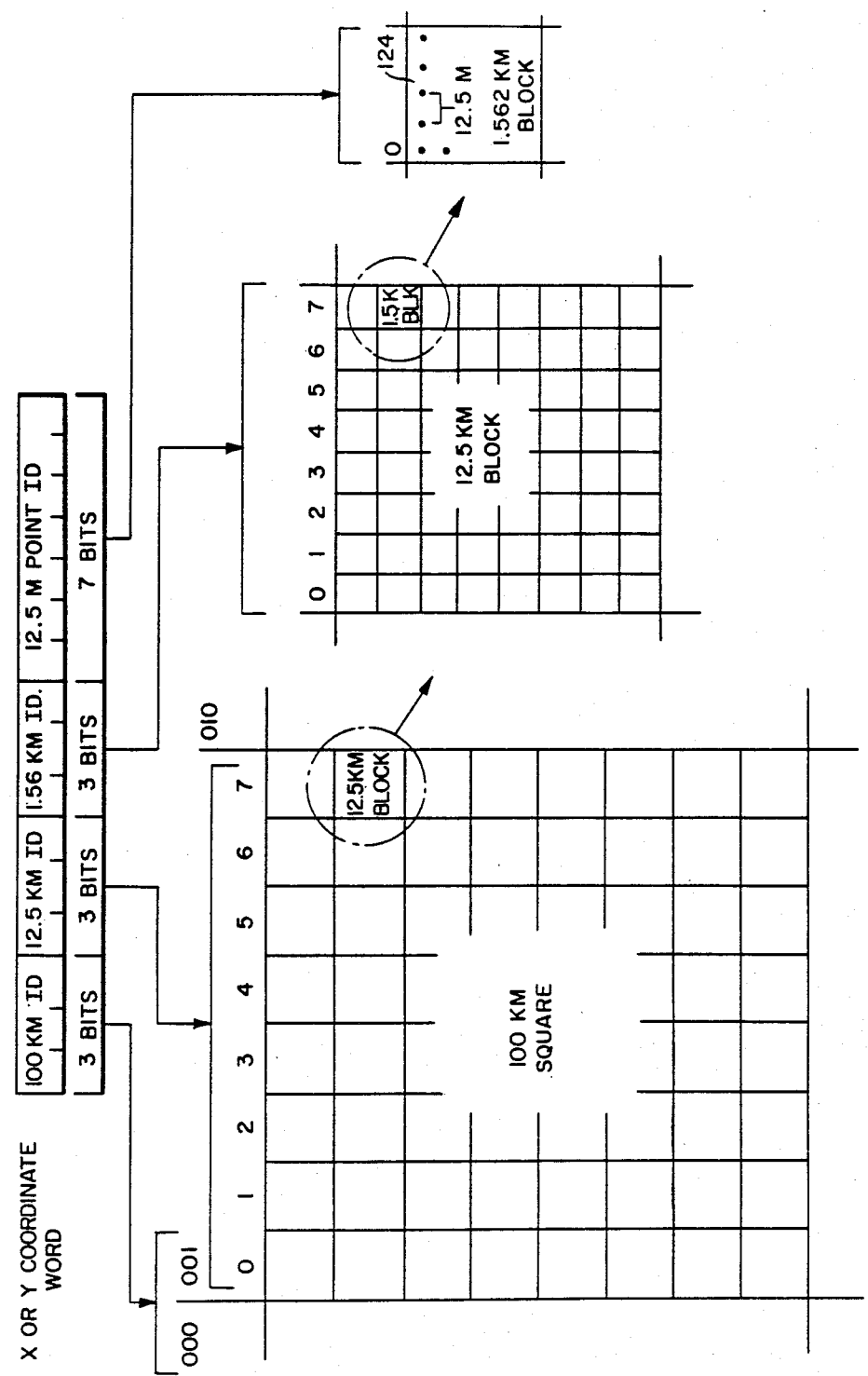
FIG. 1a is a diagram of the coordinate system used in the compression and storage of terrain data.

The compression and storage of both elevation and cultural terrain data may be based on the Defense Mapping Agency data base which provides elevations on 12.5 meter grid points. Overall, the terrain elevation data can be compressed within 12.5 km square areas, which are a submultiple of the 100 km square used on the transverse mercator projection military maps. Thus, the data base will be addressed on the basis of sixteen bit X and Y coordinate words, each of which provide three bits for the 100 km identification, three bits for the 12.5 km identification, three bits for the 1.56 km identification and seven bits for identification of the individual 12.5 meter grid points, as seen in FIG. 1a. On the other hand, as will be described in greater detail hereinafter, the cultural data is compressed as sixteen sub-blocks of each 12.5 km square area.

One of the largest capacity mass storage systems available for mobile applications is a cassette tape unit, which is easily capable of providing storage capacities of up to 12 megabits in a single tape. With this in mind, if it is assumed that one-third of the storage capacity of the tape is reserved for conventional cultural data, annotated data, and tape overhead functions, such as inter-record gaps, then eight megabits are available for elevation data storage. Conventional grid elevation data, stored as eight bits of data for each 12.5 m grid point, will use the available eight megabits in the form of a square area with 12.5 km per side. The discrete cosine transform compressed data approach may then use the available eight megabits to store a square area of approximately 140 km per side. Thus, it is quite apparent that all of the flight mission data, which includes terrain elevation data, cultural data, flight annotated data, and the respective coordinate identification, can be stored on a single tape providing all of the information relating to a significantly-large area of terrain.

Figure 1B:
FIG. 1b is a diagram of the data format as provided on the cassette tape.
Figure 2:
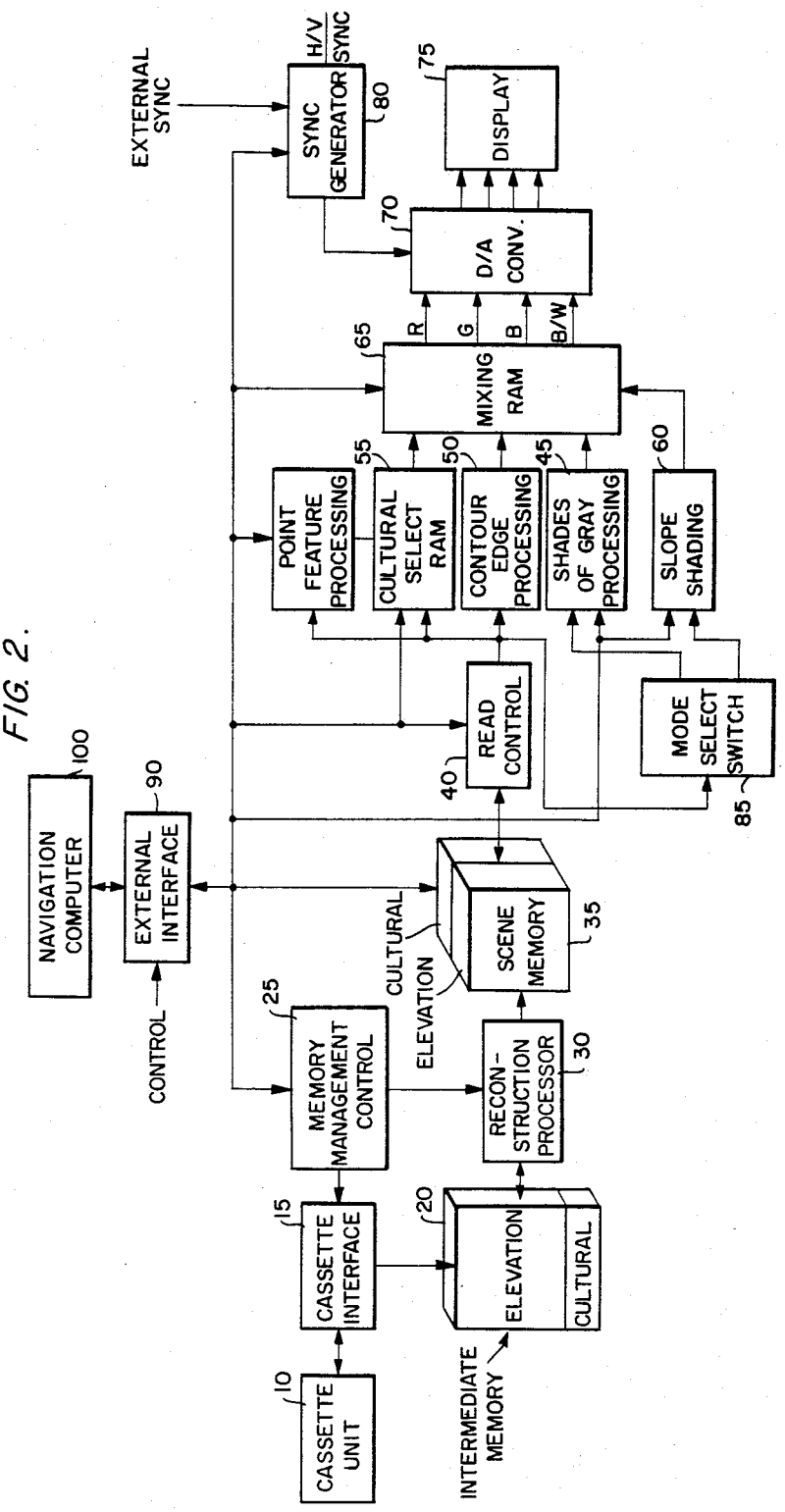
FIG. 2 is a schematic block diagram of a display system in which the cultural reconstruction processor of the present invention may be used.

FIG. 2 is a basic block diagram of a system of the type disclosed in the above-mentioned Beckwith, Jr., co-pending U.S. application Ser. No. 224,742, into which system the present invention may be incorporated for the real-time dynamic display of terrain data, including both elevation and cultural information, for use in the navigation of an aircraft along a predetermined flight path. Data processing is effected under control of a navigation computer 100 which is connected to the system via interface 90, through which operator selection and control of the data to be displayed is also possible. Prior to flight operation, a cassette tape which stores the properly-formatted mission data is loaded into the cassette unit 10. The mission data, which consists of cultural data, flight annotation data and compressed elevation grid data, is stored on the cassette tape in blocks organized according to their coordinate location in a format such as shown in FIG. 1b. In this regard, the header associated with each block will include the X and Y coordinate addresses of the block made up of three 100 km I.D. bits and three 12.5 km I.D. bits, as seen in FIG. 1a.

The output of the cassette unit 10 is applied through a cassette tape control unit 15 to an intermediate memory 20. Since the latency time of the cassette unit 10 (the difference in time between data requisition and data acquisition) can be as much as several seconds, which is clearly beyond the instantaneous response required in the system, the cassette tape unit 10 is not used as the primary source for acquiring data for processing. Rather, the intermediate memory 20 is provided as the primary data source and the cassette unit 10 supplies data in compressed form to the intermediate memory 20 as required under control of the tape control unit 15.

The cassette unit 10 will be accessed relative to translatory movement of the aircraft and the maximum cassette tape access rate, under control of the memory management control 25, which is responsive to control signals and data received from the onboard navigation computer 100 in the aircraft. The computer 100 provides various information concerning the aircraft itself, such as altitude, ground speed, and heading, in addition to the present coordinate location of the aircraft, which forms an instantaneous "center of display" coordinate for data control within the system.

The tape control unit 15 controls the cassette tape unit 10 to search the tape and read the mission data corresponding to the "center of display" coordinate received from the navigation computer 100 under control of the memory management control 25, and the required data is loaded into the intermediate memory 20, which provides the fast data access capability required by the system. The memory management control 25 controls the tape control unit 15 so as to insure that the terrain data stored in the intermediate memory 20 will always be sufficient to support the required processing and resultant display. Thus, the memory management control 25 functions to control both the read and write operations of the intermediate memory 20 and manages the data routing in conjunction therewith.

Upon receiving position commands from the navigation computer 100, the memory management control 25 will determine which of the 12.5 km blocks of data are required to fill out the intermediate memory 20 with the aircraft at the center of display position, and, the tape unit 10 will be controlled via the tape control unit 15 to read out the designated data blocks to the memory 20, filling that memory, with the elevation and cultural data being segregated in separately-addressable memory areas. Then, as the aircraft moves, based on the heading and position data received from the navigation computer 100, the memory management control 25 will determine which new blocks of data will be required from the tape and which old blocks in the memory 20 are no longer needed, and the intermediate memory 20 will be updated to insure a valid display. At the same time, the reconstruction processor 30 will be controlled to read out data from the memory 20 and reconstruct it to a non-compressed form.

The reconstructed data obtained at the output of the processor 30 is applied to a scene memory 35 which also has separate sections for elevation and cultural data. The data reconstruction processor 30 accesses the intermediate memory 20 under control of the memory management control 25 using an address relative to the instantaneous center of display position, under control of the on-board navigation computer 100, and the compressed elevation data is then reconstructed into the elevation format required for processing. The cultural data is also reconstructed by a separate portion of the processor 30 in accordance with this invention. The data reconstruction interval can be externally selectable at 1:1, 2:1, 4:1 or 8:1 with respect to a 12.5 meter scale.

The scene memory 35, like the intermediate memory 20, is divided into sections to allow independent data storage of elevation and cultural data. Similar to the intermediate memory 20, the scene memory 35 has a size which is based on a terrain square with the aircraft located near the center thereof, and the size of the terrain square is a function of the scale factor selected. Thus, the sides of the terrain square will be 6.4 km for a 8:1 scale and 51.2 km for a 1:1 scale. The elevation data section of the scene memory uses 8 bits per grid point to define the relative elevation. The reference elevation and scale factor are stored with the associated 12.5 km grid square address in an index register forming part of the memory management control 25.

Elevation and cultural data is read out of the scene memory 35 under control of the read control 40 in such a way as to convert this data from a north-up orientation as stored to a heading-up orientation for display purposes. This is accomplished by the read control 40 which addresses the data in the scene memory 35 in sequential rows which are perpendicular to the angular heading of the selected reference location, i.e., the heading of the aircraft at the coordinate location thereof. This data read out of the scene memory 35 is applied to a shades-of-gray processor 45, a contour edge processor 50, a cultural selection RAM 55 and a slope shading circuit 60. These processors will independently generate three types of data for display: shades of gray data, contour edge data and cultural data.

The cultural data selector 55 allows display of any subset of the scene memory cultural data set on the basis of control provided by the reconstruction processor 30 in response to the memory management control 25. The flight annotated data will be defined as a subset of the cultural data set, and can be individually selected by the cultural data selector 55.

A programmable mixer 65 allows the mixing of the three types of data under real time program control, and the outputs of this programmable mixer 65 represent user-selected digital codes which define the intensity levels for all combinations of the selected data types as well as color selection for different cultural features. Thus, the intensity and color signals are supplied from the mixing ram 65 through a D/A converter 70, which is controlled by sync generator 80, to the display device 75 to provide a moving map display.

Rather than control the intensity of the resulting display in accordance with assigned shades of gray as provided by processor 45, the output of the scene memory 35 may be selectively applied to a slope shading circuit 60 under control of a mode select switch 85 to control display intensity as a function of slope, with the sum fixed relative to the display screen as the display and vehicle rotate to prevent optical illusions.

The present invention relates in particular to the compression of cultural data, and the cultural reconstruction portion of the processor 30 in the system of FIG. 2 which operates to reconstruct the compressed cultural data read from the cassette tape and stored in the intermediate memory 20. As in the present system, where thirty-two bits per pixel is provided for the digitizing of the elevation and cultural data, for a pattern of 1000×1000 pixels representing a 12.5 km square area, it would be necessary to store 32,000,000 bits if the data were to be stored without compression. This would require far too much storage capacity than can be provided in a practical system for the compression of cultural features including linear features, area features and point features. Accordingly, in accordance with the present invention, compression on the basis of a modified footprint scheme is provided so that a cultural compression ratio of 400:1 is implemented in conjunction with the data stored on the cassette tape.

Figure 3:
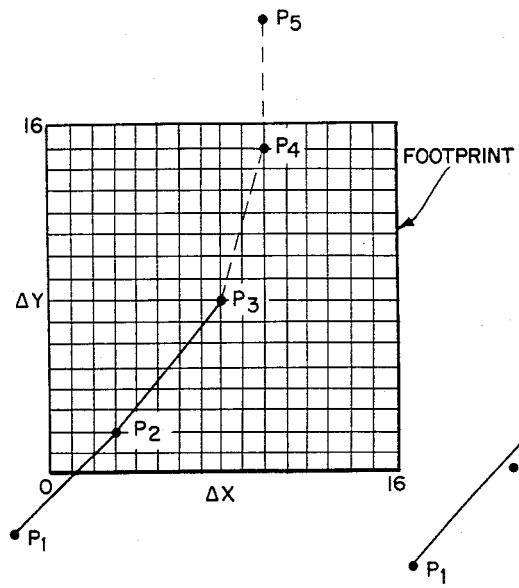
FIG. 3 is a schematic diagram illustrating the basic footprint technique of line generation in the display of compressed digital data.

In the normal footprint plotting of lines, as seen in FIG. 3, the points P1, P2, P3, P4 and P5 are sequentially plotted on the basis of the address of the previously-plotted point and the delta values in the X and Y direction identify a footprint around the last-plotted point. In the example of FIG. 3, the points P1, P2 and P3 have been generated, and a footprint defined by a four bit $\Delta X$ value and a four bit $\Delta Y$ value is used to identify the next point P4 along the line. In this regard, where the footprint is located with the last-generated point at the center thereof, the next point P4 can be any one of the 256 points in the footprint about the point P3; however, the maximum distance that the next point can be from the last point is eight pixels. This obviously is not a very efficient method of compression.

The present invention provides a modified footprint technique of compression which assumes that a line, although not perfectly straight, will extend generally in the same direction as the last-line segment thereof. By accepting this premise, the footprint can then be extended out ahead of the last point generated, in the manner illustrated in FIG. 4.

Figure 4:
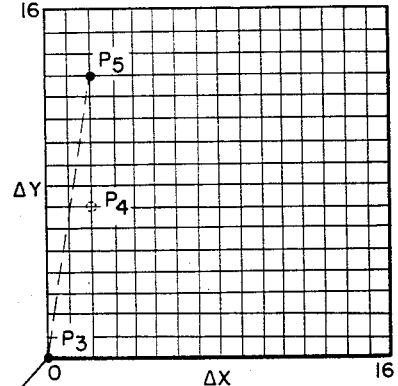
FIG. 4 is a schematic diagram of a modified footprint technique for line generation of a video display of digital data in accordance with the present invention.

As seen in FIG. 4, the point P3, which is the last point generated along the line, is located at one corner of the footprint, and the next point to be generated along the line is the point P5. In comparing FIGS. 3 and 4, it will be readily seen from FIG. 4 that the modified footprint scheme of the present invention provides for a greater degree of compression than the standard footprint scheme of FIG. 3, since the prior scheme requires the storage of data in conjunction with substantially twice as many points along the line.

For the compression of cultural data in accordance with this invention, both a starting point address and an initial direction are stored. Also, in the storing of linear and area boundary features in compressed form, certain special codes are used to identify various characteristics of the data. Thus, a special code is provided to identify the beginning of data relating to a new feature or a new sub-block of data. Similarly, since area, linear and point features are processed in a particular order, special codes are provided to identify the beginning of data relating to these three types of features. In addition, a special code is provided to identify a change of feature identification, such as where a two-lane road becomes a four-lane road. Features are identified by different codes, which ultimately result in a color selection in the final display. Thus, the code for a grassy area may designate the color green, while a lake may be represented by a code designating the color blue, and so forth.

The following list may well indicate the data items stored on the cassette tape for linear and area boundary features:

---
---special code (new feature)
---new feature identification
---starting address (X, Y)
---initial direction
---delta code

```
---special code (feature I.D. change)
---feature identification
---delta code
```

For point features, the data stored on the tape primarily comprises the addresses of each feature and the feature identification. Thus, the following list may illustrate the point feature data stored on the cassette tape:

```
---special code (start of point features)
---feature identification
---X₁ address
---Y₁ address
---feature identification
---X₂ address
---Y₂ address
```

Figure 5A:
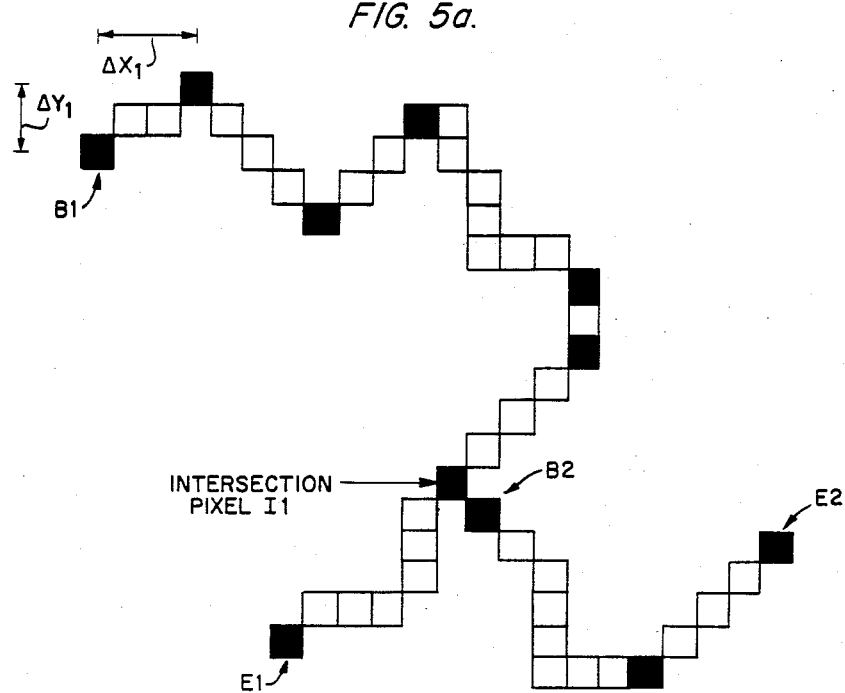
FIG. 5a is a schematic diagram illustrating the application of the modified footprint technique to the compression of linear features in accordance with the present invention.

A practical example of the compressed data stored in accordance with the present invention, as applied to linear features, is shown in FIG. 5, which illustrates first and second linear features. The first linear feature begins with the pixel B1 and ends with the pixel E1, while the second feature begins with the pixel B2 and ends with the pixel E2. In order to compress the line features illustrated in FIG. 5 in accordance with the present invention, the following data is stored:

| Feature #1 | | Bit Count | Feature #2 | | Bit Count |
|---|---|---|---|---|---|
| New Feature | Special Code | 8 | New Feature | Special Code | 8 |
| Feature I.D. | Special Code | 6 | Feature I.D. | Special Code | 16 |
| Address of B1 | (X₀, Y₀) | 14 | Address of B2 | (X₀', Y₀') | 14 |
| Initial Dir. | Direction Code | 3 | Initial Direction | | 3 |
| | (ΔX₁, ΔY₁) | 8 | | (ΔX₁', ΔY₁') | 8 |
| | (ΔX₂, ΔY₂) | 8 | | (ΔX₂', ΔY₂') | 8 |
| | (ΔX₃, ΔY₃) | 8 | | | |
| | (ΔX₄, ΔY₄) | 8 | | | |
| | (ΔX₅, ΔY₅) | 8 | | | |
| | (ΔX₆, ΔY₆) | 8 | | | |
| | (ΔX₇, ΔY₇) | 8 | | | |

For feature No. 1, the address in the X and Y directions of the beginning point B1 is stored using fourteen bits. Following the address of the beginning point B1 and the initial direction bits, there is successively stored the delta code values of selected points (indicated by the shaded points in FIG. 5a) along the line to the ending point E1. These delta code values are selected on the basis of the modified footprint scheme of the present invention, as will be described in greater detail hereinafter, in which the footprint extends ahead of the last point generated in the same general direction as the immediately-preceding segment of the line. As already indicated, insofar as the beginning point B1 is concerned, in addition to the address of the point, there is also stored an indication of the direction of the line as it extends to that point, since there is no preceding line segment from which to determine this information.

The feature No. 2 in FIG. 5 begins with the point B2 and ends with the point E2. Again, in the compression of this line feature, the X and Y address of the beginning point B2 is stored along with the initial direction of the line to that point. Following the storage of this data will be the delta code values of successive (selected) points along the line to the end point E2 using the modified footprint scheme as described with reference to FIG. 4.

Figure 5B:
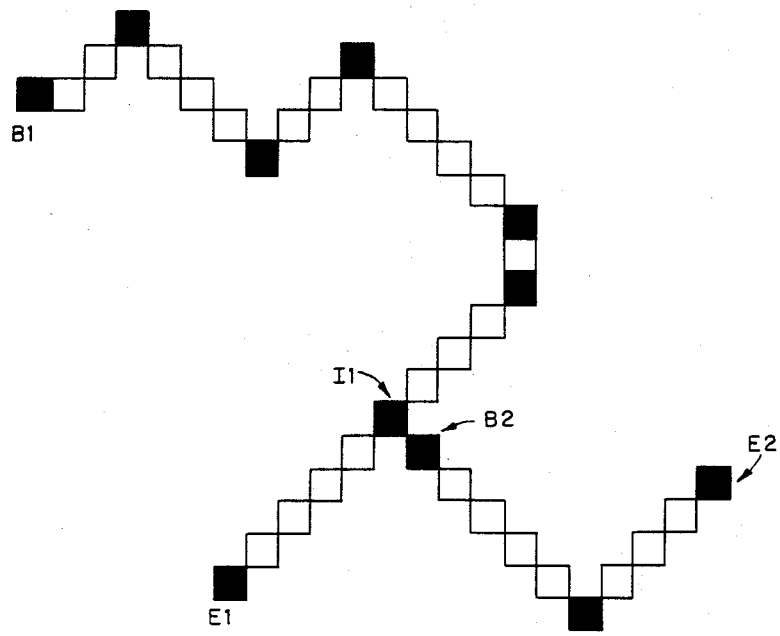

The reconstruction process for linear features is based on a straight line interpolation method to fill-in between the selected pixels. The two reconstructed features are shown in FIG. 5b. It should be noted that, although the interpolation process does not necessarily provide exact reconstruction of all the pixels in the original features, critical pixels such as the beginning, end and intersection pixels are reconstructed exactly. This provides for good reconstruction quality.

The compression and storage of area features, as opposed to linear features, utilizes the same basic modified footprint scheme used with linear feature compression to compress the boundary of the area feature; however, in accordance with the present invention, increased compression can be achieved in conjunction with the storage of area features by storing only those points on a half boundary (left-facing edge) of the area. Both the compression and reconstruction of area features in accordance with the present invention is illustrated in FIGS. 6a–6d.

Figure 6A:
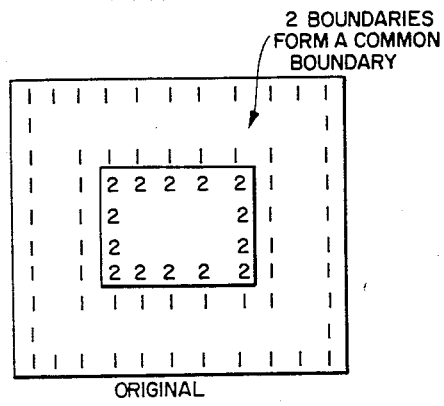
FIGS. 6a through 6d are schematic diagrams which illustrate the application of the modified footprint technique of the present invention to the compression and reconstruction of area features in a video display.
Figure 6B:
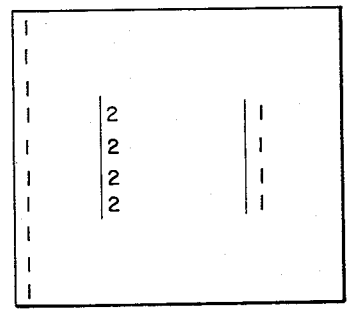
Figure 6C:
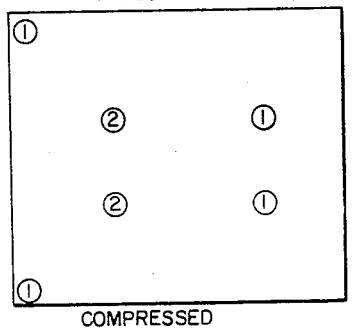

FIG. 6a illustrates a rectangular area feature made up of pixels having a weight No. 2 within an area made up of pixels having a weight No. 1. Thus, the inner boundary of the rectangle 1 and the outer boundary of the rectangle 2 form a common boundary. If the data illustrated in FIG. 6a is scanned from left to right along successive lines beginning at the top and moving toward the bottom of the figure, in a manner similar to the scanning of a television screen, the data of each pixel encountered in this scanning operation will only change as the scanning crosses the common boundary, i.e., at the left-facing edges, as seen in FIG. 6b. For this reason, it is possible to compress the data which makes up the pattern illustrated in FIG. 6a by storing only the left-facing edges of these patterns as seen in FIG. 6b. On the other hand, the data of FIG. 6b can be even further compressed by using the linear feature compression algorithm of the present invention, as seen in FIG. 6c, since the half boundaries are in the form of linear features, they can be compressed as such. Thus, after further compression, it is necessary, as seen in FIG. 6c, to store only the pixel at the top and bottom ends of the vertical lines which make up the left-facing edges.

Figure 6D:
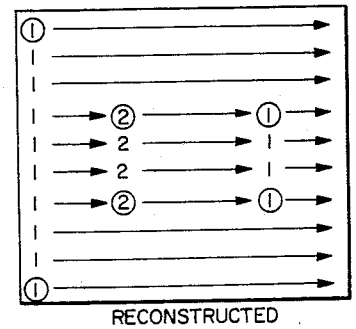

That the data of FIG. 6a can be compressed in the form seen in FIG. 6c without loss of information and subsequently reconstructed will be described in conjunction with FIG. 6d. The first step of reconstruction comprises the use of the same line generating process, i.e., straight line interpolation, associated with the reconstruction of a linear feature. In this regard, as seen in FIG. 6d, lines are first generated in the vertical direction to interconnect the points which form the left-facing edges, thereby reconstructing the pattern seen in FIG. 6b. Subsequent to this operation, horizontal scanning from left to right with the changing of data as each boundary is encountered will effect a reconstruction of the original pattern seen in FIG. 6a. Thus, in the fourth line of FIG. 6d, ones will be generated until the boundary of the inner rectangle is reached after which twos will be generated until the opposite boundary is again reached, subsequent to which ones will be generated along that line. By scanning horizontally across each line and sequentially generating the lines from top to bottom, the original pattern seen in FIG. 6a results.

The example illustrated in FIGS. 6a through 6d is a very-simplified example which serves to illustrate the concept of the present invention for the compression, storage and reconstruction of area features. Obviously, the area feature need not be a rectangle, but may take the form of a more-complicated shape having a nonlinear left-facing boundary. In such a case, more points along these left-facing boundaries will need to be stored in the compression of the data; however, the degree of compression achieved in accordance with the present invention will in any event be far superior to the compression techniques used heretofore in the compression and storage of area features based on the storage of the entire boundary of the area. Furthermore, the quality of the reconstructed features based on the half-boundary approach is far superior than that of the full bundary approach. This can be easily seen by noticing the fact that in the full-boundary case, the contiguous full boundaries of contiguous area features may not be contiguous after reconstruction. In fact, typical problems associated with the reconstruction of contiguous area features are that the reconstructed full boundaries are separated, thus leaving a space between the originally-contiguous boundaries. Furthermore, originally-contiguous full boundaries may be reconstructed in such a way that erroneous boundary crossing may occur, thus resulting in highly-undesirable visual effects. In the half-boundary case, all the above undesirable problems are eliminated due to the fact that contiguous area feature boundaries are compressed and reconstructed as a single boundary.

Figure 7A:
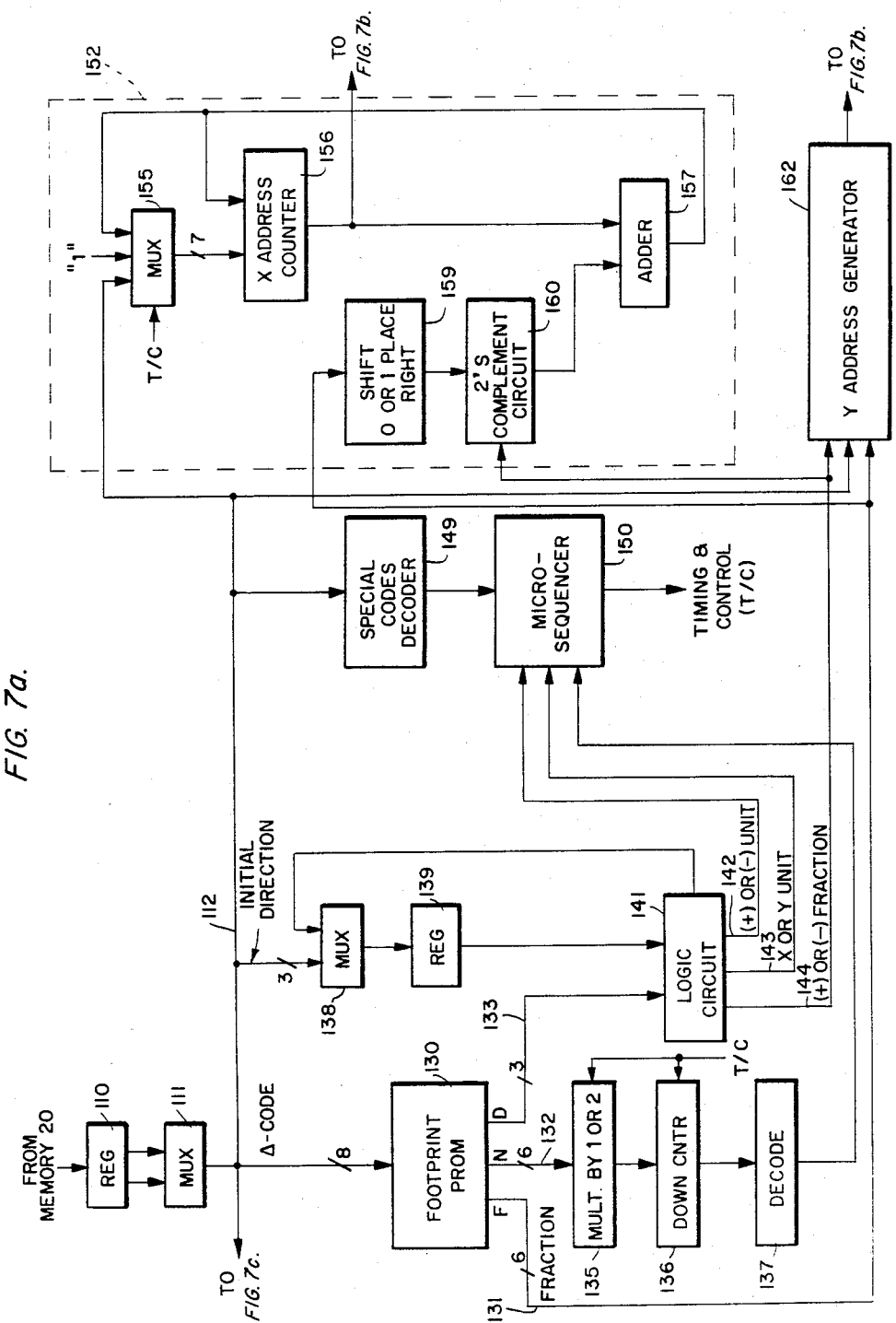
Figure 7B:
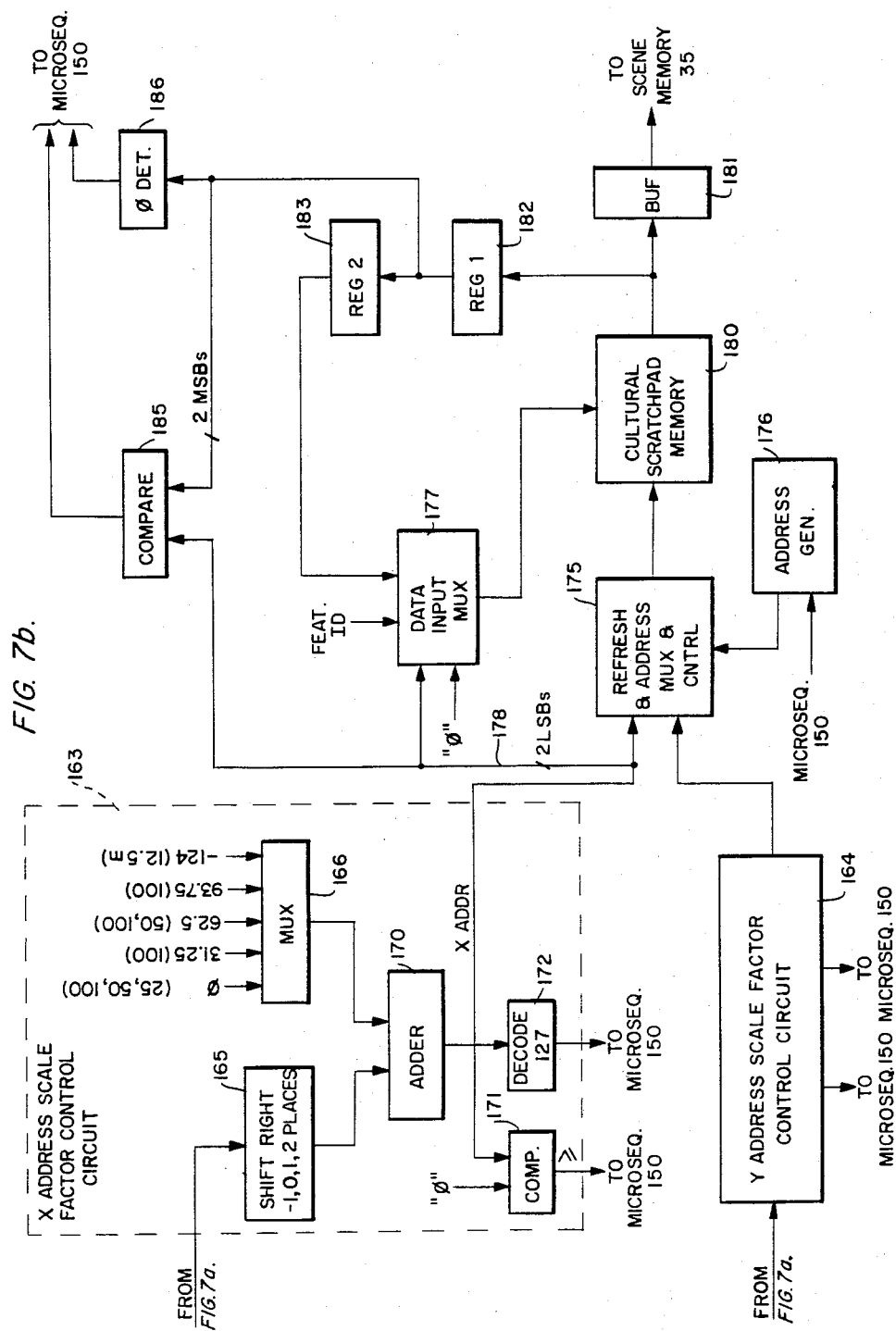
Figure 7C:
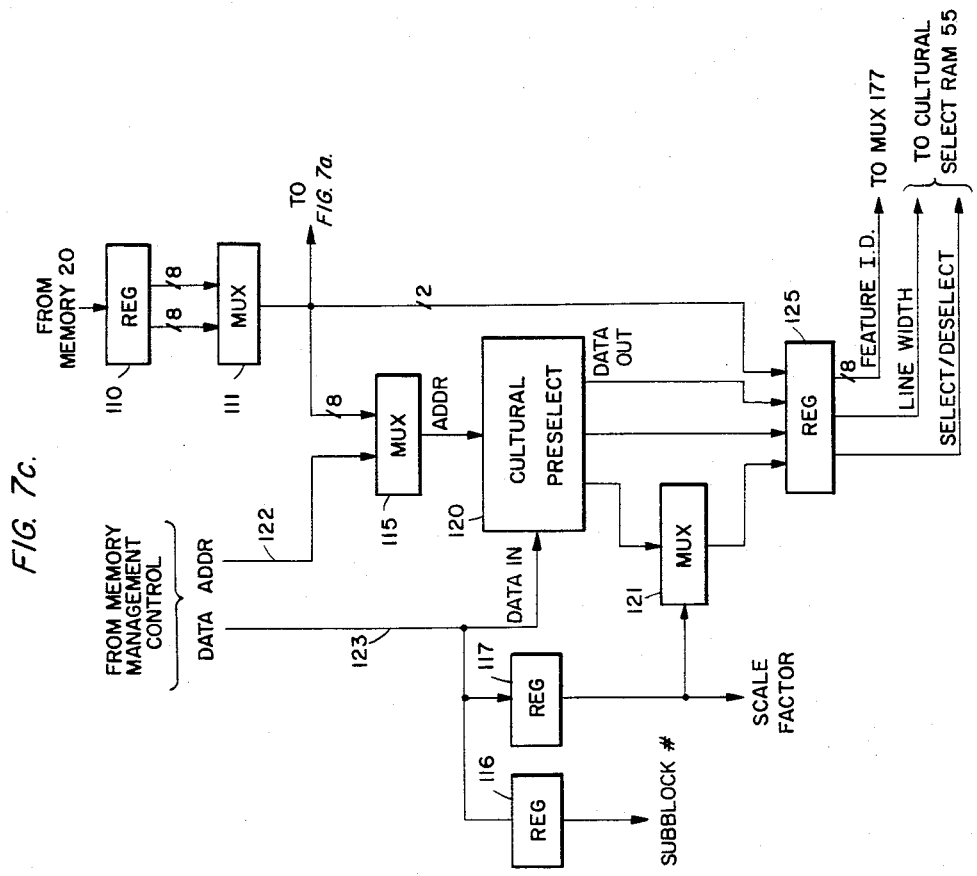

FIGS. 7a through 7c illustrate that portion of the reconstruction processor 30 which operates to reconstruct the compressed cultural data received from the intermediate memory 20. As already indicated, the compressed data includes the X and Y address of each starting pixel associated with a linear feature or with a left-facing boundary of an area feature and the X and Y address of each point feature. In the example which will be used in describing the exemplary system of FIGS. 7a through 7c, the X,Y address of a pixel will be defined by fourteen bits; whereas, delta code data and control words will comprise eight bits. Initial direction data in the form of three bits will be provided in association with the beginning point of a line feature or the left-facing boundary of an area feature.

As seen in FIG. 2, in the intermediate memory 20, elevation data is stored in a different area from the cultural data and the two types of data are addressable independently by the memory read-out circuitry under control of the memory management control 25. Thus, the elevation and cultural sections of the intermediate memory 20 may be read out at different rates to the separate elevation and cultural sections of the reconstruction processor 25 which act to reconstruct this compressed data. Further, the cultural data stored in the intermediate memory 20 is divided into area, linear and point features, which are read out for reconstruction processing in that order.

FIG. 7a represents the data processing portion of the cultural reconstruction processor in accordance with the present invention and operates to generate lines designating both linear features and area features on the basis of the compressed cultural data read from the cassette tape and written into the intermediate memory 20. Data is received from the intermediate memory 20 under control of the memory management control 25 at a register 110. The data received from the intermediate memory is sixteen bits wide and is supplied to a multiplexer 111 which selects the data as two eight bit words. The cultural data is supplied from the output of multiplexer 111 to the feature data line 112, from which this data is then received by various circuits which operate to effect reconstruction of the compressed data.

Figure 8:
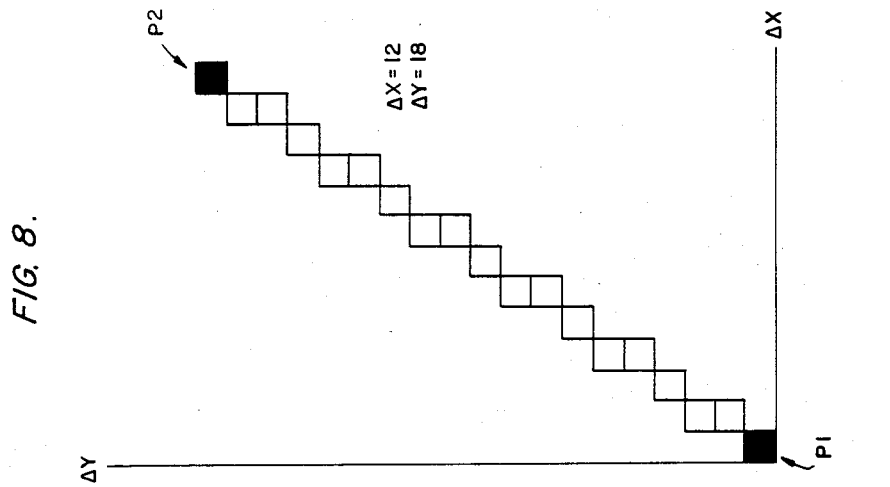
FIG. 8 is a diagram illustrating the line generation operation used for reconstruction of both linear and area cultural features.

The reconstruction process performed by the processor 30 in reconstructing cultural data primarily comprises the generation of points between the beginning of the line and the end of the line based on a series of delta code values ($\Delta X$, $\Delta Y$) which identify segments along the line. FIG. 8 illustrates an example of the generation of points between a beginning point P1 and a point P2 on the basis of the delta code values $\Delta X = 12$ and $\Delta Y = 18$. The generation of the line between the points P1 and P2 involves a stepping by incremental values in the X and Y direction based on the designated delta code values. In the example of FIG. 8, each incremental step will comprise one unit in the Y direction (because $|\Delta Y| > |\Delta X|$) and two-thirds of a unit in the X direction. Thus, each point is generated between the points P1 and P2 by indexing the X and Y address of point P1 by a unit in the Y direction and two-thirds of a unit in the X direction until the point P2 is reached. In this regard, it should be noted that the increment value will always be a unit value in either the X or the Y direction of line writing and the increment value in the other direction will always be a fraction of a unit. The above method of interpolation insures the best straight digital line between two pixels.

As already indicated with reference to FIGS. 3 and 4, the present invention not only provides for line generation in the reconstruction of linear and area cultural features on the basis of stored delta code values, but advantageously extends the footprint out ahead of the last point generated along the line in the same direction as the line up to that last point. Thus, the generation of each line segment based on an applied delta code requires information of the change in direction, if any, with respect to the last-known direction of the line, in addition to the number N of unit steps required to generate the segment to the end point and the value F of the fractional steps to be taken. All of this information must be generated for each applied delta code. For this purpose, as seen in FIG. 7a, a footprint PROM 130 is provided for storing a footprint pattern of this data, which is selectively read out in response to delta code values received on line 112.

Figure 9:
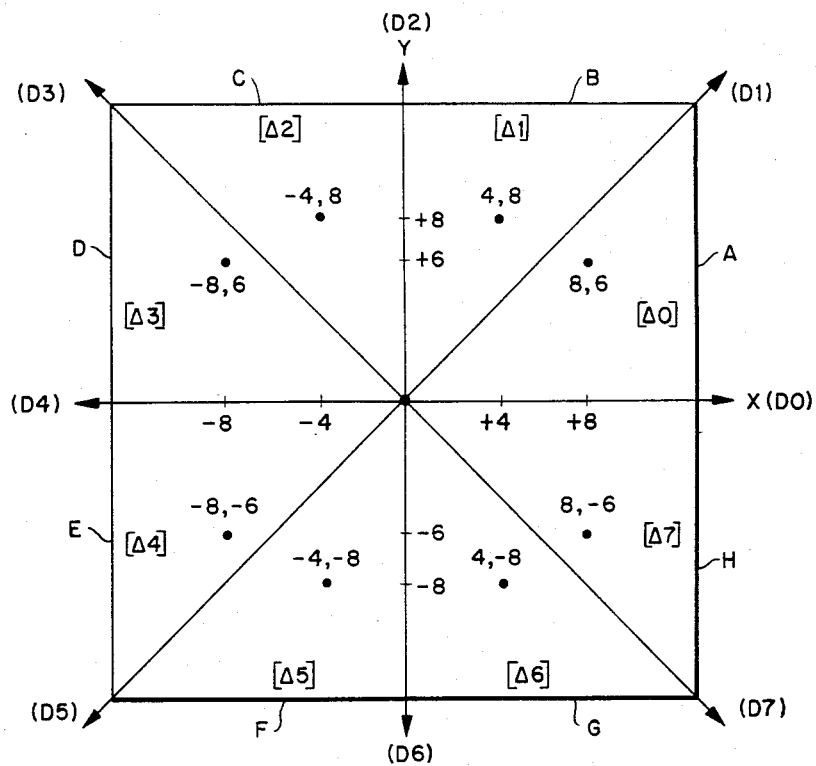
FIG. 9 is a diagram of a coordinate pattern used to describe the data stored in the footprint PROM.

How the footprint of values are provided in the footprint PROM 130 will be described with reference to FIGS. 9 and 10. The relationship of points in a coordinate X-Y pattern is shown in FIG. 9, in which the X axis and the Y axis intersect in the center of a square of data points. Thus, points to the right of the Y axis have positive X values and points to the left of the Y axis have negative X values; while, points above the X axis have positive Y values and points below the X axis have negative Y values. Accordingly, if one ignores the signs of the X and Y values, a given X, Y code will designate four points, each in different quadrants of the coordinate pattern. For example, the code 8,6 (X=8, Y=6) will identify the four points 8,6 and −8,6 and −8,−6 and 8,−6. Similarly, the code 4,8 (X=4, Y=8) will identify the four points 4,8 and −4,8 and −4,−8 and 4,−8. However, it will be noted that for any given code the number N of unit steps to be taken from the origin and the fraction F of a unit to be taken at each step to any of the four points designated by that code is the same. Thus, for the code 8,6 the number N will be 8 and the fractional value F will be $\frac{3}{4}$ for all four points designated by that code. Similarly, for the code 4,8 the number N will be 8 and the fractional value F will be $\frac{1}{2}$. Accordingly, it will be apparent from FIG. 9 that the values of N and F for the points in one quadrant of the coordinate pattern are duplicated in the other three quadrants. Thus, only the N and F values for a single quadrant of points need be stored to make this data available for all points in the coordinate pattern.

However, in addition to values of N and F, the applied delta code must also provide information from which the direction of the line segment can be determined, i.e., whether the unit direction is the X or Y direction, whether incrementing in the unit direction is positive or negative, and whether incrementing in the fractional direction is positive or negative. This is so since unlike the standard footprint technique of data compression, the footprint is not symmetrical with the last point generated, but extends outward from that last point in a direction which is related to the direction of the last line segment. Thus, the orientation of the footprint varies as the direction of the line varies.

Referring to FIG. 9, it is seen that the coordinate pattern is divided into eight sectors A–H, and it may be shown that the points in each sector all have common directional characteristics. Thus, in sector A, the unit direction is the X direction and both the unit and fractional directions of incrementing are positive for all points. In sector B, the unit direction is the Y direction and both the unit and fractional directions of incrementing are positive. The similar directional relationships for points in the sectors C–H will be apparent. On this basis, the boundaries of these sectors A–H can be given the directional designations D0–D7. Then, if this pattern is aligned along one of the directional lines, such as D1, with the direction of the last line segment generated, the position of the next point which is identified by the delta code will fall in a sector whose directional line has a numerical designation which indicates how many sectors of rotation has taken place. Therefore, the points in each sector can be given a delta direction value Δ0-Δ7 as indicated in brackets in FIG. 9.

In summary, it is seen that only a single quadrant of points in the coordinate pattern of FIG. 9 is needed to determine the N and F values for all points in the pattern; however, some points in all quadrants are needed to provide the directional information necessary to the reconstruction of the compressed data. Accordingly, a footprint pattern of data as seen in FIG. 10 is stored in the footprint PROM 130. This footprint consists of a main lobe L1 which corresponds to a single quadrant such as formed by the sectors A and B in FIG. 9, along with a minor lobe L2 which includes a limited number of points in the other three quadrants so that directional changes over a full 360° can be accommodated by the footprint. In this regard, it will be noted the footprint will accommodate more lengthy line segments within the main lobe L1 than it will within the minor lobe L2. Thus, maximum compression of data is available in the direction D1 in the footprint, while more limited compression is available in the directions which extend through the minor lobe L2. However, since linear cultural features will generally tend to extend in fairly-straight lines, the increase in compression available with the present invention will be significantly greater than that heretofore possible.

Figure 10:
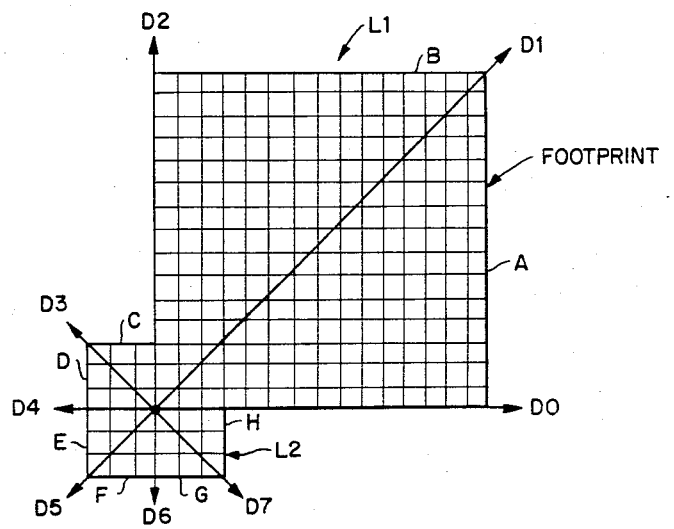
FIG. 10 is a diagram of the footprint pattern of data stored in the footprint PROM in accordance with the present invention.

It should also be noted at this point that, unlike the more conventional techniques of line generation based on the use of a standard footprint pattern where the center of the footprint is located coincident with the last point generated on the line and the next point is identified by separate ΔX and ΔY values, each point in the modified footprint pattern of FIG. 10 is uniquely identified by an eight bit delta code value which forms an address for that particular storage location in the footprint PROM 130. More particularly, the eight bit delta code value does not represent a four bit ΔX value and a four bit ΔY value as in prior systems, but represents a unique address for one of the 256 points in the footprint pattern. Rather, it is the data read out of the selected storage locations in the memory 130 which identifies characteristics of the ΔX and ΔY incremental steps of the line generation as described with reference to FIG. 8.

Figure 11:
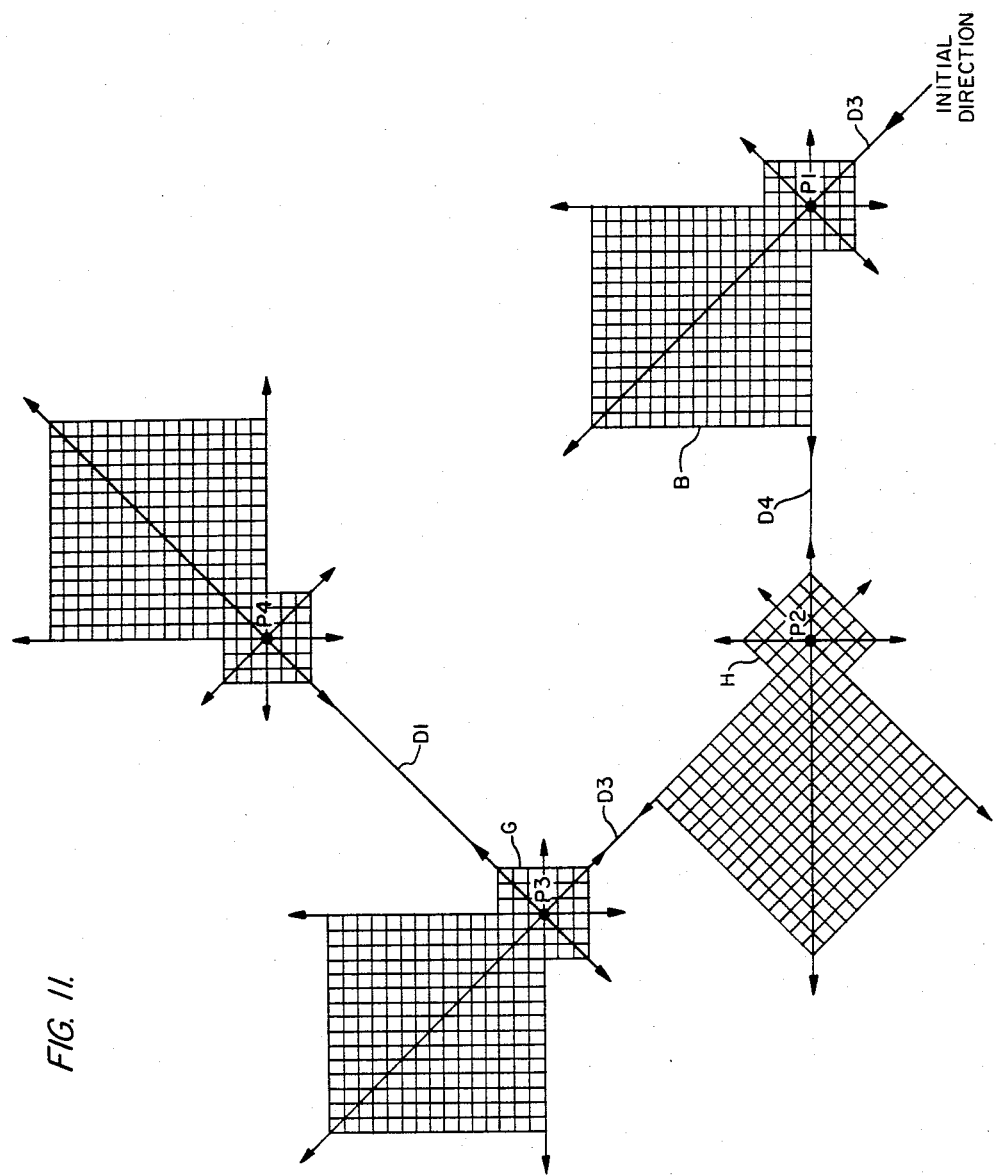
FIG. 11 is a diagram illustrating line generation using the footprint technique of this invention.

FIG. 11 shows an example of line generation using the footprint technique of the present invention. In the drawing the footprint pattern is shown in reduced scale at the points between line segments and the length of the line segments is exaggerated for clarity of illustration; however, it should be understood that the line segments will not extend beyond the footprint pattern, but will fall entirely within one of the sectors of the pattern. The initial direction is designated as D3 at the initial point P1 and the point P2 identified by the applied delta code falls in the sector B of the footprint. The delta direction read out of sector B will be Δ1 which, when added to initial direction D3, will provide the new direction D4. The next delta code identifies a point P3 in the sector H of the footprint, producing read-out of a delta direction Δ7. Since there are eight sectors in the pattern, the addition of directional values is modulo-8. Thus, addition of the previous direction D4 to the delta direction Δ7 will produce the new direction D3. For the point P4, the next delta code produces read-out of the delta direction Δ6 from sector G of the footprint, and this is added modulo-8 to the previous direction D3 to produce the new direction D1.

As seen in FIG. 7a, the delta code data at the output of multiplexer 111 is applied directly to the footprint PROM 130. The output line 131 from the PROM 130 carries a signal indicating the value of the fraction F in the incremental steps in either the X or Y direction involved in the line generation. In the example of FIG. 8, the fraction was equal to $\frac{2}{3}$. The output line 132 from the PROM 130 carries a signal having a value equal to the number N of the unit steps in the generation of the line segment. In the example of FIG. 8, N was equal to 18. The output signal on line 133 from the PROM 130 provides the directional information ΔD indicating the change from the initial direction in which the line is to be generated.

The signal on line 132 from the PROM 130 is applied to a multiplier 135 which is selectively controlled to multiply the value N by 1 or 2 depending upon the scale factor, which may be selected through the external interface 90 in a manner to be described. Thus, the multiplier 135 produces an output to preset a down counter 136 to the value N or 2N. The counter 136 will then be decremented as points are generated along the line until it reaches a 0 value as detected by a zero decoder 137.

A register 139 is also connected to the feature data line 112 via a multiplexer 139 to receive the three bits which indicate the initial direction associated with the beginning point of a linear feature. Thereafter, a new direction code will be generated by the logic circuit 141 on the basis of the delta direction read out of footprint PROM 130 and this new direction code is then stored in register 139 in place of the initial direction code. Thus, the multiplexer 138 is controlled to pass either the three bit initial direction code from the line 112 or the new direction code from logic circuit 141 to the register 139. The logic circuit 141 provides three signals on lines 142, 143 and 144 indicating the various direction values for control of the system. The line 142 provides a signal which indicates the (+) or (−) value in the unit direction, the line 143 provides a signal which indicates whether the unit direction is the X or Y direction, and line 144 provides a signal which indicates whether the direction of fractional incrementing is positive or negative.

Figure 12:
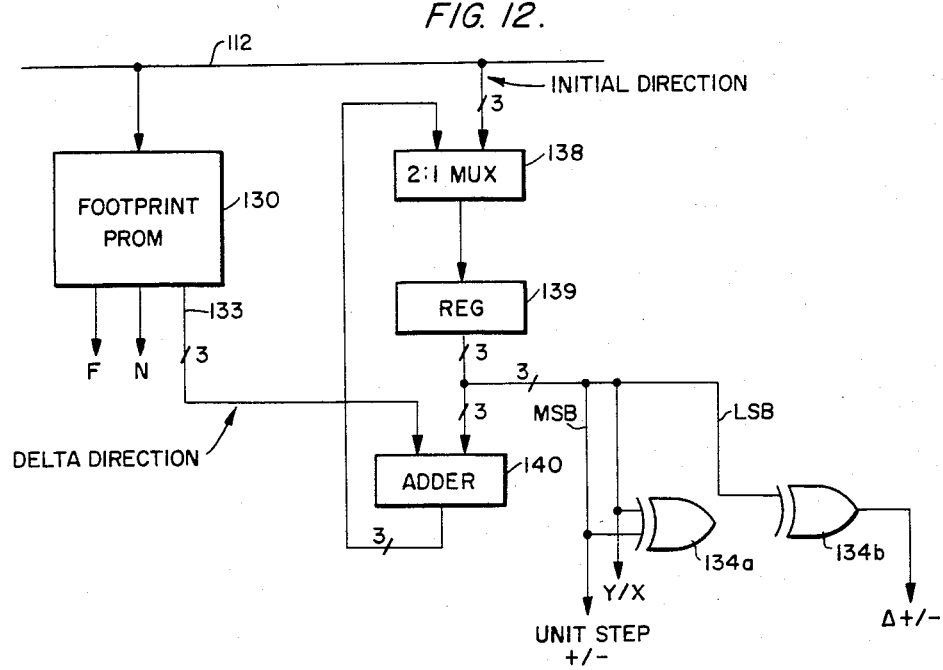
FIG. 12 is a schematic diagram of the logic circuit for producing directional data.

FIG. 12 illustrates the details of the logic circuit 141, which includes a modulo-8 adder 140 and a pair of EXCLUSIVE-OR gates 134a and 134b. The delta direction output on line 133 from the footprint PROM is applied to one input of the adder 140, which receives at its other input the direction of the previous line segment (or the initial direction). The result of the modulo-8 addition is supplied from the output of adder 140 to register 139 via multiplexer 138. The most significant bit (MSB) of the three bit direction code is supplied directly as a signal indicating whether the unit step is positive or negative. The second bit from register 139 is supplied directly to indicate whether the unit direction is Y or X, and it is applied to the EXCLUSIVE-OR circuit 134a along with the most significant bit (MSB). The least significant bit in register 139 is applied to the EXCLUSIVE-OR circuit 134b along with the output of gate 134a, and the output of gate 134b then indicates whether the fractional direction of incrementing is positive or negative.

The timing and control of elements throughout the control portion and data portion of the reconstruction processor are provided by a microsequencer 150, which may be based on the microsequencer 2910, produced by Advanced Micro Devices of Sunnyvale, Calif. The microsequencer 150 responds to stored instructions and various inputs, such as inputs from zero decoder 137 and logic circuit 141, to produce the timing signals which enable the various elements of the reconstruction processor in the proper sequence to achieve reconstruction of the compressed data supplied thereto. The microsequencer 150 also responds to various special codes, such as the control words indicating the beginning of a line feature or a change in feature identification and the like, as provided by the special code decoder 149, connected to the feature data line 112.

Figure 13:
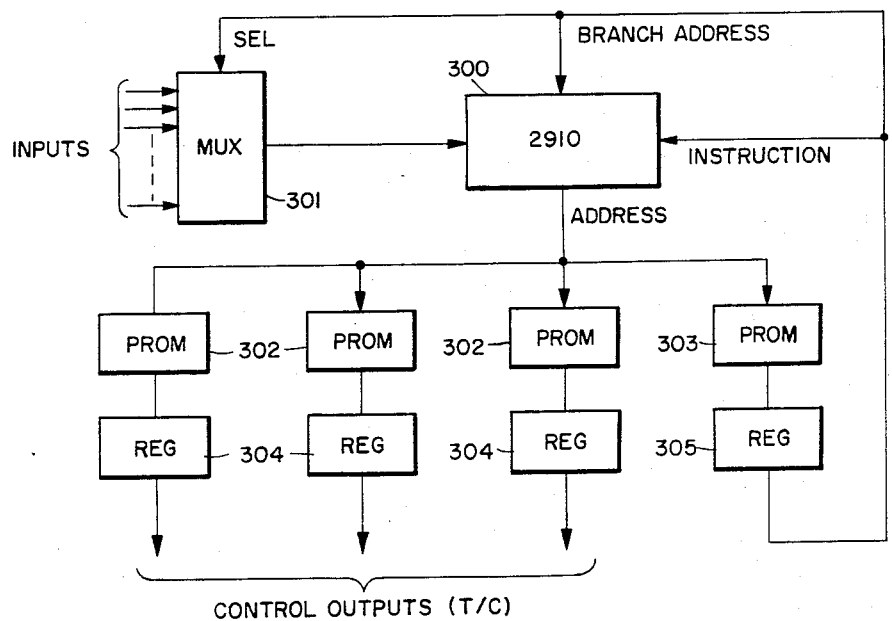
FIG. 13 is a schematic block diagram of the microsequencer.

As seen in FIG. 13, the 2910 microsequencer chip 300 receives various inputs via multiplexer 301 and is responsive to these inputs and instructions stored in a PROM 303 for appropriately addressing one or more PROM's 302 to read out timing and control data to the associated registers 304. The contents of the registers 304 provide the timing and control for the various elements which make up the cultural position of the reconstruction processor. The PROM 303 not only stores the instructions which control the sequencer operation, but also branch addresses and input selection commands which are supplied from register 305 in control of the multiplexer 301. FIGS. 16–56 contain flow charts which identify the various operations of the microsequencer 150.

The X address of the starting pixel is received on the feature data line 112 and applied through multiplexer 155 to the X address counter 156, where it is stored as the address of the first point on the line. If X is the unit direction, the address stored in the counter 156 will be incremented if the line is proceeding positively in the X direction and decremented if the line is proceeding negatively in the X direction. Each incrementing or decrementing of the counter 156 produces an X address component designating a new point generated along the line and results in a decrementing of the counter 136, as already described. On the other hand, if the incremental steps in the X direction are fractional steps, the fraction is supplied from the line 131 at the output of PROM 130 to a shifter 159 which will selectively shift the fraction one place to the right or pass the fraction without change to a 2's complement circuit 160. The shifter 159 accommodates the scale factor and the 2's complement circuit 160 is enabled when the incrementing in the fractional direction is negative. The address stored in the counter 156 is then applied to an adder 157 along with the fraction or the complement of the fraction provided at the output of circuit 160 and the result of the addition of these two values by the adder 157 is then supplied back to the address counter 156, the units value being supplied through multiplexer 155 and the fraction portion of the result being supplied directly to the counter 156.

Elements corresponding to the multiplexer 155, address counter 156, adder 157, shifter 159 and 2's complement circuit 160 are provided for Y address generation and operate in the same manner as described above for the generation of X addresses. This Y address generating system 162 is also connected to the feature data line 112, as seen in FIG. 7a, and serves to provide the successive Y addresses for each point generated along the line.

The system illustrated in FIG. 7a operates in the following manner. Upon detection of the control word indicating the beginning of a feature in the special decoder 149, as received from the feature data line 112 from the intermediate memory 20, the microsequencer 150 will enable the multiplexer 155 to pass the seven bit X0 component of the starting pixel address to the X address counter 156. Sequentially, the Y address component Y0 is applied to a similar Y address counter in the Y address generator 162. Then, the initial direction register 134 is loaded with a three bit code indicating the sign of the unit value, whether the unit value is X or Y and the sign of the fraction value, and the mux 138 is enabled by the microsequencer 150 to pass these three bits to the logic circuit 141. The first delta code following the initial direction code is then received by the footprint PROM 130, which generates the fraction F on line 131 and the number of unit steps N on line 132. The microsequencer 150 also controls the multiplier 135 in accordance with the scale factor permitting the down counter 136 to be preset to the value N or 2N in accordance with the output on line 132 and the control provided over the multiplier 135. The logic circuit 141 produces a signal on the line 142 indicating whether the unit value of incrementing is to be positive or negative and a signal on line 143 indicating whether the unit incrementing direction is the X direction or the Y direction, and these two output signals are supplied to the microsequencer 150, which then takes the steps to initiate the point generation required by the received delta code.

If the X direction is the unit direction, the microsequencer 150 will control the multiplexer 155 to increment or decrement the X address counter 156 in accordance with the signal on line 142 indicating the direction of the unit value. On the other hand, if the X direction is the fractional direction, the fractional value on line 131 is applied through the shifter 159 under control of the microsequencer 150 to the 2's complement circuit 160. Depending on the scale factor, the microsequencer 150 will allow the fractional value to pass unaffected or will shift that value one place to the right. Also, depending on the value of the signal on line 144 from the logic circuit 141, indicating the direction of the fractional incrementing, the 2's complement circuit 160 will either be enabled or disabled. Thus, the fractional value will be applied to one input of the adder 157 to be either added or subtracted from the address stored in the counter 156, and the result of this addition will be supplied back to the address counter 156 as the new stored value through the multiplexer 155 under control of the microsequencer 150. The value of the X address in the counter 156 will be successively incremented, and with each incrementing the down counter 136 will be decremented by the microsequencer 150 until it reaches a value zero. When the counter 136 reaches a zero value, the zero decoder 137 will detect this condition and provide a signal to the microsequencer 150 indicating that the line generation has been completed in accordance with the received delta code. The microsequencer 150 then will signal the memory management control 25 to forward the next delta code from the intermediate memory 20 and the next line segment will be generated in the same manner already described.

As already indicated in connection with FIG. 1a, elevation data is stored in compressed form on the cassette tape in blocks representing 12.5 km square of terrain, and the intermediate memory 20 has a capacity to store sixteen 12.5 km blocks of elevation data. In contrast, the cultural data relating to a 12.5 km block is divided up into sixteen sub-blocks on a 25 meter scale and stored in the intermediate memory 20 in the manner illustrated in FIG. 14. Each sub-block of cultural data stored in the intermediate memory 20 comprises 125×125 pixels; however, this data may be reconstructed at selectively-different scale factors. Thus, for a scale factor of 2:1, a single sub-block, such as sub-block C in FIG. 14, will be reconstructed and stored in one of sixteen available blocks in the scene memory 35. For a 4:1 scale factor, four sub-blocks, such as A, B, C, and D in FIG. 14, will be reconstructed and stored in the scene memory 35 in the same area normally occupied by a single sub-block. For a 8:1 scale factor, the entire sixteen sub-blocks in the intermediate memory 20 will be reconstructed and stored in the scene memory 35 in an area normally occupied by a single sub-block, i.e., an area of 125×125 pixels. Finally, a scale factor of unity will result in one quadrant of one sub-block being transferred into the same size area during reconstruction and storage in the scene memory 35.

As seen in FIG. 7b, a cultural scratch pad memory 180 having a capacity of 125×125 pixels stores the reconstructed cultural data in response to the X and Y addresses generated by the X and Y address generators 152 and 162 described with reference to FIG. 7a. The X and Y addresses are supplied through respective X and Y address scale factor control circuits 163 and 164 to a refresh and address multiplexer and control circuit 175, which applies these addresses to the cultural scratch pad memory 180. As the memory 180 is addressed in this manner, the feature identification data is supplied through the data input multiplexer 177 to the memory 180 to effect a writing of the feature identification into the memory. The data stored in the cultural scratch pad memory will then be read out through the buffer 181 to the scene memory 35 under control of the microsequencer 150 in response to addresses generated by the address generator 176 and applied to the memory 180 via the refresh and address multiplexer and control circuit 175.

If the scale factor of the reconstructed data is not to be changed, (i.e., 2:1 or 25 m) then the X and Y addresses generated by the address generators 152 and 162 will pass through the X and Y address scale factor control circuits 163 and 164 without modification. On this basis, a single sub-block of 125×125 pixels will be stored in the cultural scratch pad memory 180. However, prior to each block reconstruction, the microsequencer 150 will initiate operation of the address generator 176 to scan the memory 180 in the WRITE mode via the refresh and address multiplexer and control circuit 175, while enabling the data input multiplexer 177 to supply zeros to the memory 180. This effects an erasing of the data previously stored in the memory 180. Next, the microsequencer 150 will control the refresh and address multiplexer and control circuit 175 and the data input multiplexer 177 to provide application of the X and Y addresses generated by the address generators 152 and 162 to the memory 180 along with the feature identification data relating to the pixels to be stored in memory at those addresses. This feature identification data is derived from the portion of the processor illustrated in FIG. 7c, which will be described later. When all of the data relating to a sub-block has been stored in the memory 180, the microsequencer 150 will then once again initiate operation of the address generator 176 to effect a read out of data in the memory 180 through the buffer 181 to the scene memory 35.

On the other hand, if a scale factor is required having a value other than 1:1, the X and Y address scale factor control circuits 163 and 164, which are of identical construction, will effect a modification of the addresses generated by the generators 152 and 162, respectively, in accordance with the required scale factor. A specific description of the construction and operation of the X address scale factor control circuit 163 will be provided herein, it being understood that the same description is also applicable to the Y address scale factor control circuit 164.

As seen in FIG. 7b, the X addresses produced by the X address counter 156 in the generator 152 are applied to a shifter 165 in the X address scale factor control circuit 163. This shifter 165 is controlled by the microsequencer 150 in accordance with the scale factor required by the system, as indicated by the memory management control 25 in a manner to be described hereinafter. The shifter 165 is capable of shifting the address received from the X address counter 156 by one place to the right, two places to the right, or one place to the left, and it is also capable of passing that address without modification where no change in scale factor is required, as already indicated. The output of the shifter 165 is applied to one input of an adder 170, the other input of which receives an eight bit value suppled through a multiplexer 166, which is also controlled by the microsequencer 150 in accordance with the required scale factor and which sub-block within the 12.5 km block is being reconstructed. This eight bit value provided by the multiplexer 166 represents the binary equivalent of the numerical values 0, 31.25, 62.5, 93.75 and −124.

Figure 14:
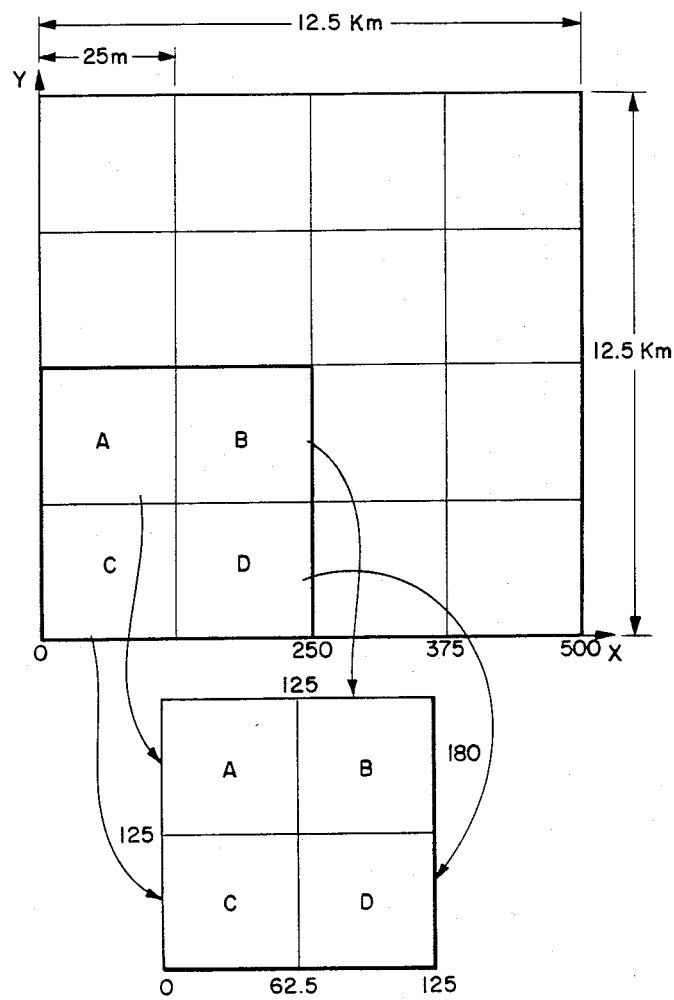
FIG. 14 is a diagram illustrating the features relating to address modification in response to changes in scale factor.

The function of the shifter 165, multiplexer 166 and adder 170 in modifying the X address will be described with reference to FIG. 14 where the scale factor of 4:1 is required to provide for a 50 meter display in the place of the standard 25 meter block. For this purpose, four sub-blocks of 125×125 pixels each will be reconstructed and stored in the single 125×125 storage area of the cultural scratch pad memory 180. Thus, the block A will be reduced from a 125×125 block to a 62.5×62.5 block located in the upper-left quadrant of the cultural scratch pad memory 180. Sub-blocks B, C and D will be similarly transferred and reduced in accordance with the scale factor, as illustrated in FIG. 14. For this purpose, it is therefore necessary to not only modify the specific addresses within each sub-block but also to shift the sub-block to the proper quadrant within the cultural scratch pad memory 180. For example, where a scale factor of 2:1 is required, the sub-block C in FIG. 14 would normally occupy the entire area of the memory 180, i.e., an area of 125×125 pixels. However, in the illustrated example, the sub-block C will now occupy only the lower left-hand quadrant of the cultural scratch pad memory 180 and consists of 62.5×62.5 pixels. Thus, the addresses of the 125×125 pixels in the sub-block C must be first modified to fit into the 62.5×62.5 area of the lower left-hand quadrant of the memory 180. This address modification is accomplished by the shifter 165. In addition, for the sub-blocks A, B and D, an additional translation is required to properly place the reduced blocks in the proper quadrant within the memory 180. For the block D, for example, the pixel which forms the lower left-hand corner of the sub-block having an address 125,0 for the X,Y coordinates thereof will occupy a position 62.5,0 in the cultural scratch pad memory 180. Thus, further translation of the addresses to place the sub-block in the proper quadrant of the memory 180 is required, and this is performed by the multiplexer 166 and adder 170.

In the example illustrated in FIG. 14, the shifter 165 will be controlled by the microsequencer 150 to shift the X addresses to the right by one place, thereby dividing these addresses by two so that the 125×125 pixels will be reduced to 62.5×62.5 pixels. At the same time, the microsequencer 150 will control the multiplexer so that for the blocks A and C, which require no change in the X address, the eight bit value provided to the adder 170 will be zero. However, for the sub-blocks B and D, which require a shifting to the proper quadrant in the memory 180, the eight bit value supplied from the multiplexer 166 to the adder 170 will correspond to the decimal value 62.5. In the Y address modification, performed by the Y address scale factor control 164, the sub-blocks C and D will not require relocation and therefore the multiplexer 166 will provide the eight bit binary value corresponding to zero; while, for the sub-blocks A and B, a shifting in the Y direction to the proper quadrant in the memory 180 will require addition to the address of the binary equivalent of the value 62.5.

In a similar manner, for a scale of 100 meters (4:1), the four sub-blocks A, B, C and D will be shifted into the memory 180 in the area C as seen in FIG. 14. The other three groups of four sub-blocks from the intermediate memory 120 will correspondingly be shifted into the memory 180 in the areas occupied by the blocks A, B and D in the memory 180 as seen in FIG. 14. For this purpose, the shifter will be set to shift the addresses two places to the right and the multiplexer 166 will successively provide the eight bit values 0, 31.25, 62.5 and 93.75.

For a scale factor to provide for a 12.5 meter scale, i.e., one-half of the normal 25 meter scale, one-fourth of a sub-block C, for example, as seen in FIG. 14, will occupy the entire cultural scratch pad memory 180. For this purpose, the shifter 165 is controlled to shift the addresses one place to the left and the multiplexer 166 will provide an eight bit value of either zero or negative 124 to the adder 170.

The comparator 171 and the decoder 172 in the X address scale factor control circuit 163 serve to mark the boundaries of the memory 180, which is 125×125 pixels. Thus, when an address is detected which is equal to or less than zero, the comparator 171 will indicate to the sequencer that the address has reached the left-hand boundary of the memory 180. On the other hand, when the decoder 172 detects an address which exceeds 127, the sequencer 150 is signaled to indicate that the address has reached the right-hand boundary of the memory 180. The Y address scale factor control circuit 164 includes a similar comparator and decoder to detect addresses which reach the upper and lower boundaries of the memory 180. In response to this indication from the comparator 171 and decoder 172 that the left or right boundary or top or bottom boundary of the memory 180 has been reached, the microsequencer 150 will prevent data relating from these out-of-bounds pixels from being stored in memory 180, while continuing operation of the address generators 152 and 162 for that sub-block of data. In this regard, because a linear feature may extend out of bounds due to the scale factor selected and then move back into bounds at another location as it continues, and since the plotting of these later in-bounds points requires knowledge of the line direction as it proceeds in-bounds, it is necessary to continue address generation for the entire sub-block of data even though the out-of-bounds pixels will not be stored in the memory 180.

During the reconstruction process, if a different scale factor is selected by the system, such as 50 meters or 100 meters, four or sixteen pixels will be written into a single pixel location in the memory 180. If all of these four or sixteen pixels relating to a single pixel location in the memory 180 do not relate to the same feature identification, a decision must be made as to which pixel is to be selected. Such a situation is shown, for example, in FIG. 15 in which a pattern on a 25 meter scale is shown after address modification to a 50 meter scale, in which two cultural features H and K are shown in an exemplary pattern.

Figure 15:
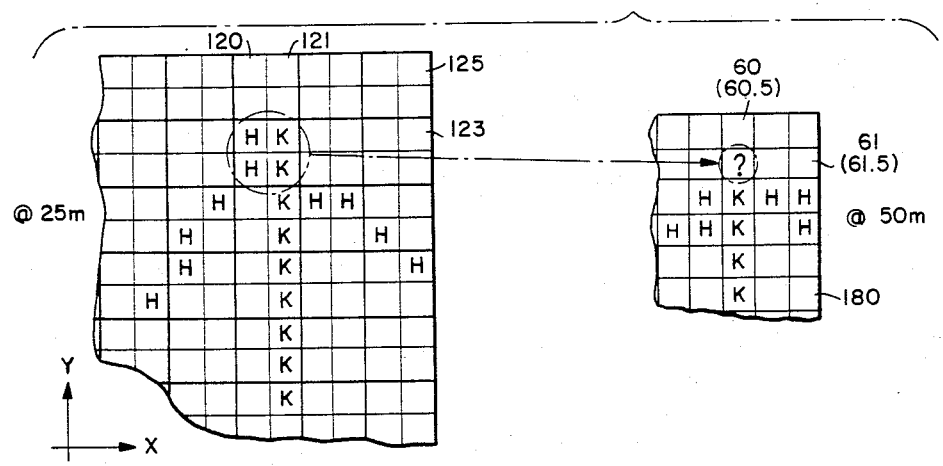
FIG. 15 is a diagram illustrating the problem of proper feature identification in response to changes in scale factor.
Figure 16:
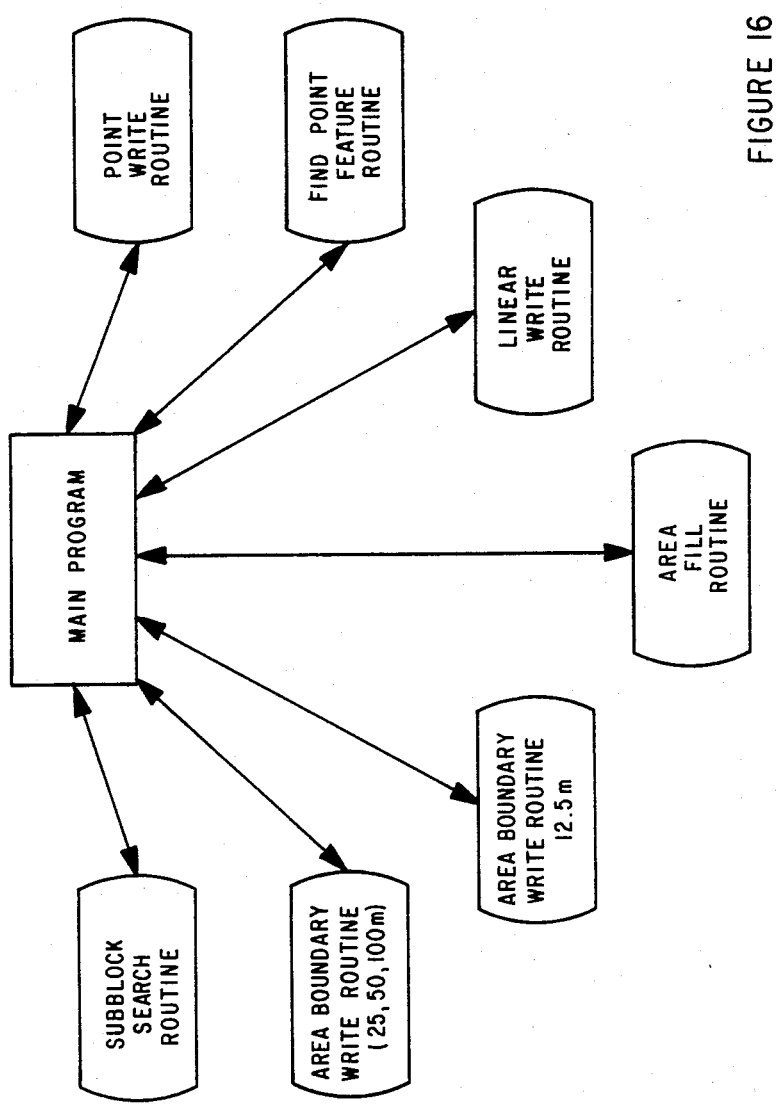
FIG. 16 is a cultural feature reconstruction sequencer program top level block diagram.
Figure 17:
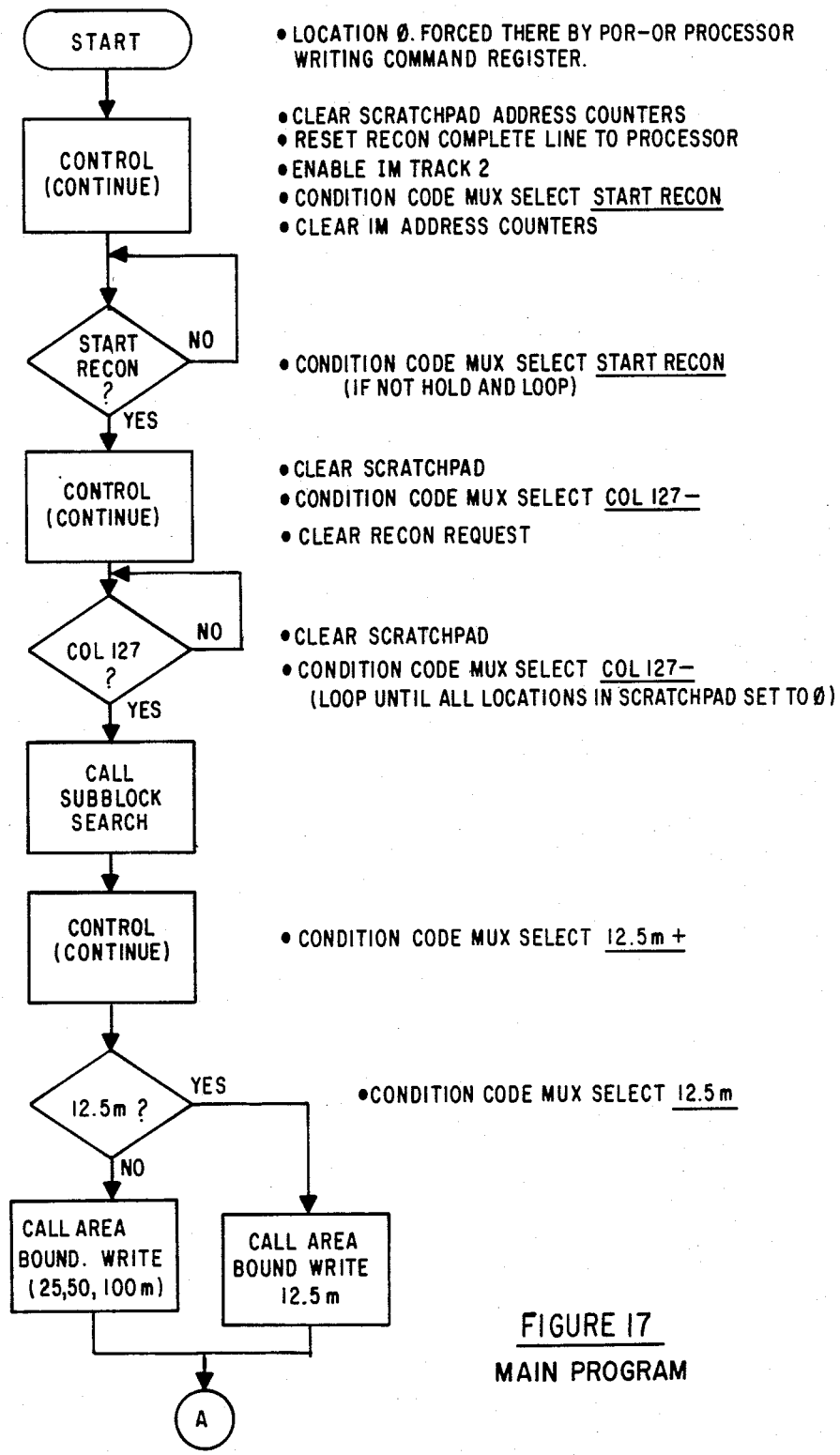
FIGS. 17–19 contain a flow chart of the main program of FIG. 16.
Figure 18:
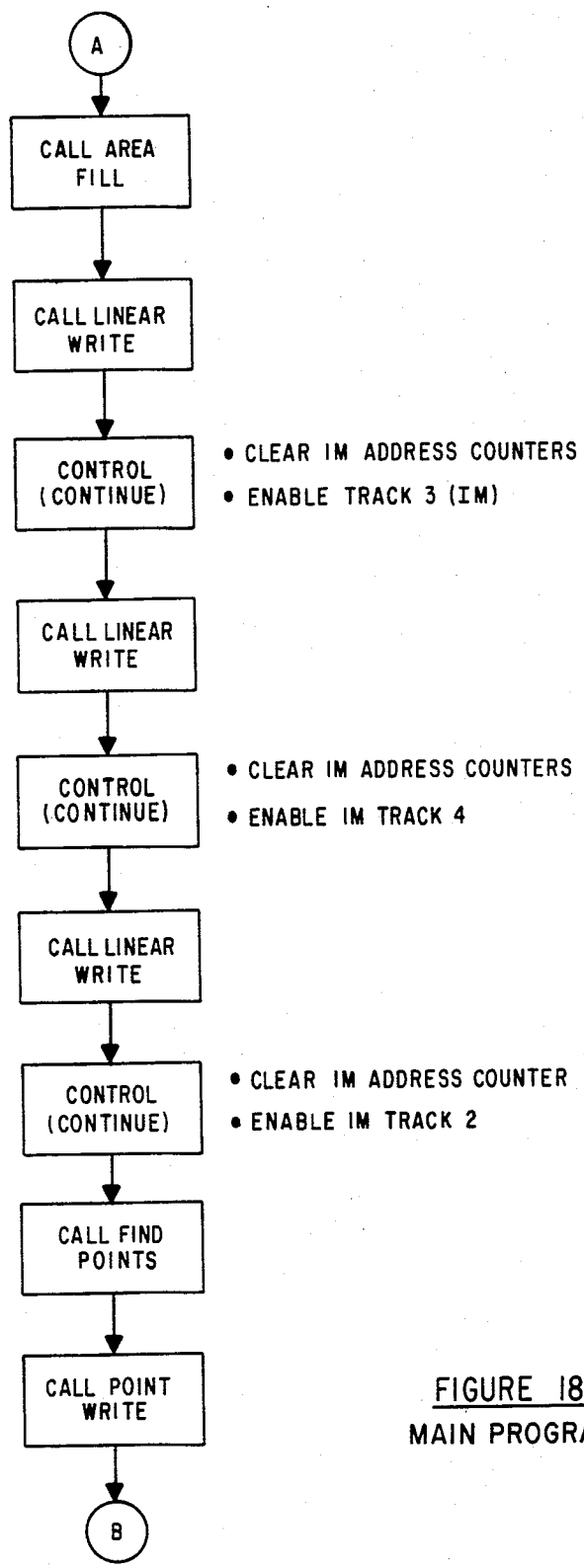
Figure 19:
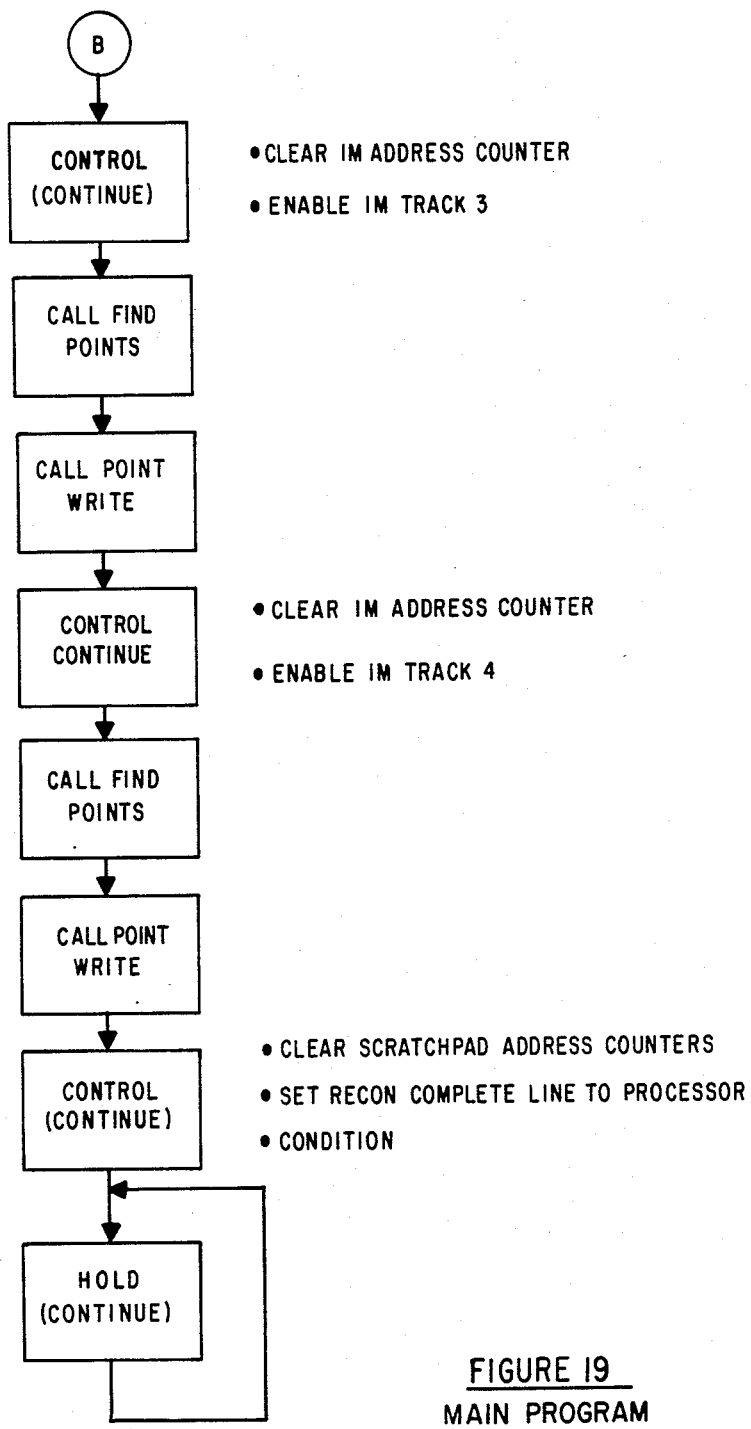
Figure 20:
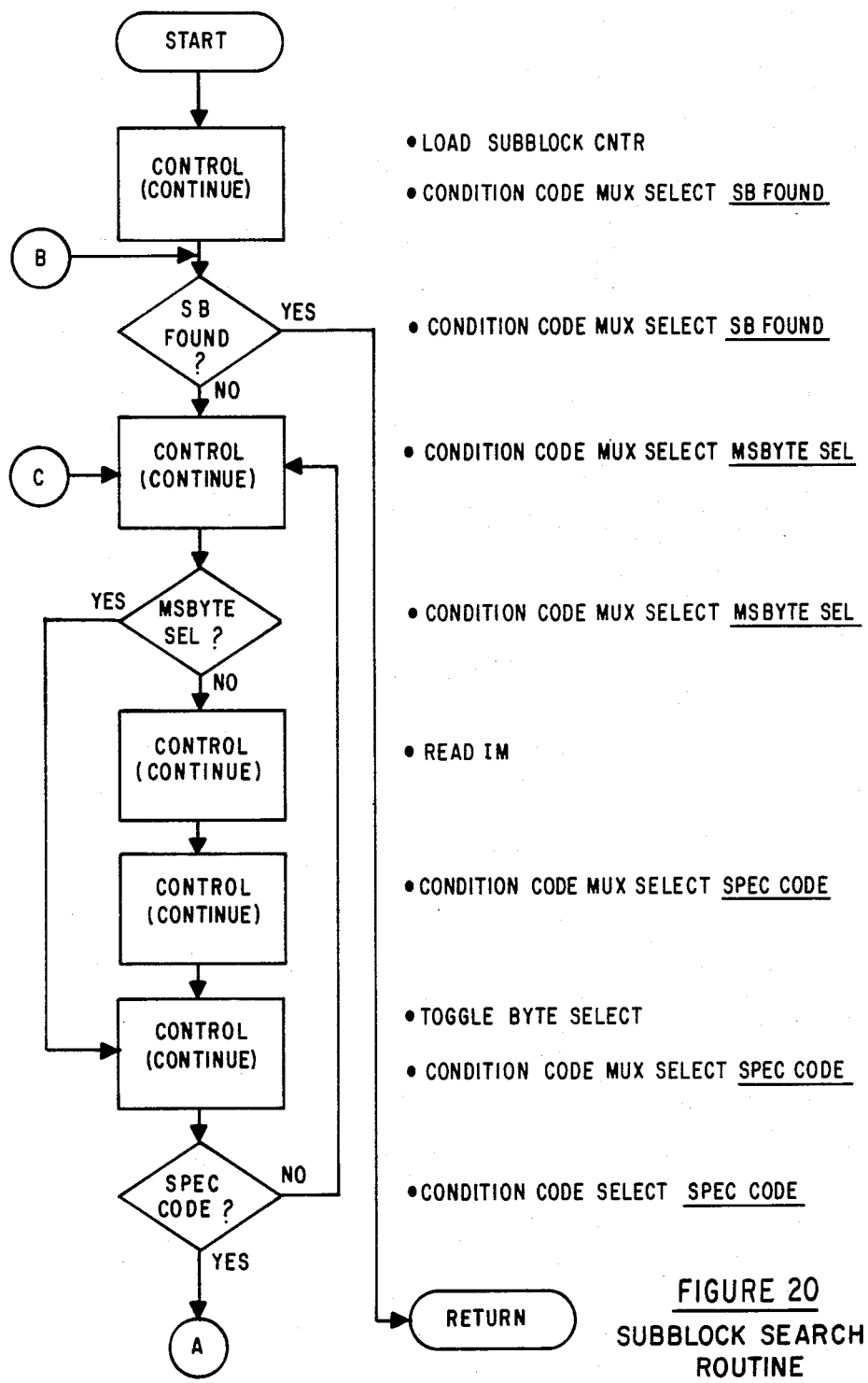
FIGS. 20 and 21 contain a flow chart of the subblock search routine shown in FIG. 16.
Figure 21:
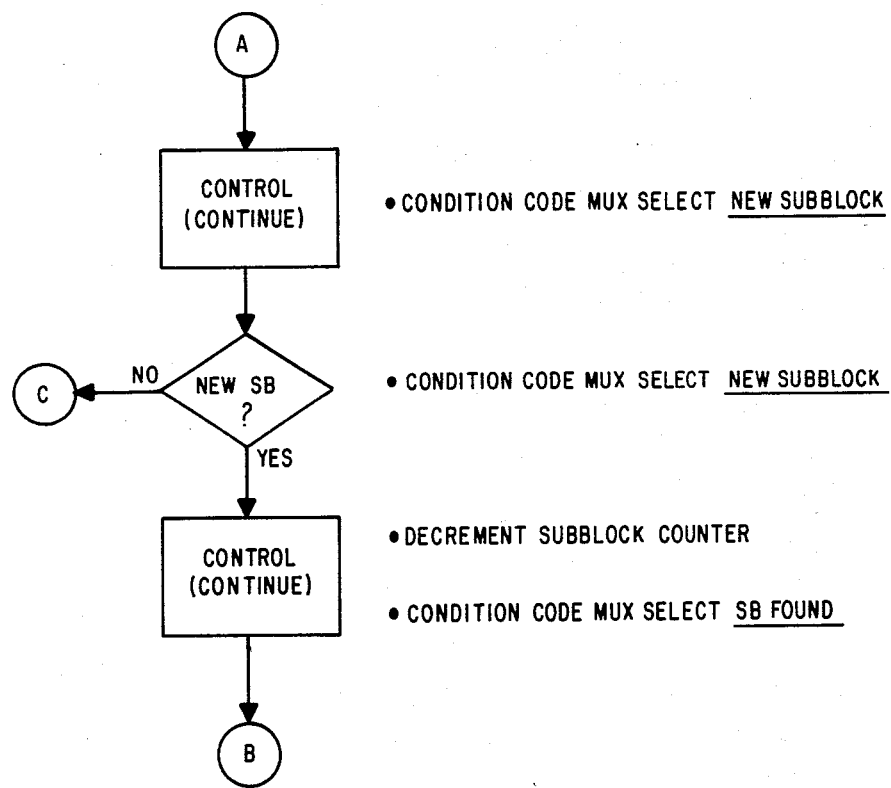
Figure 22:
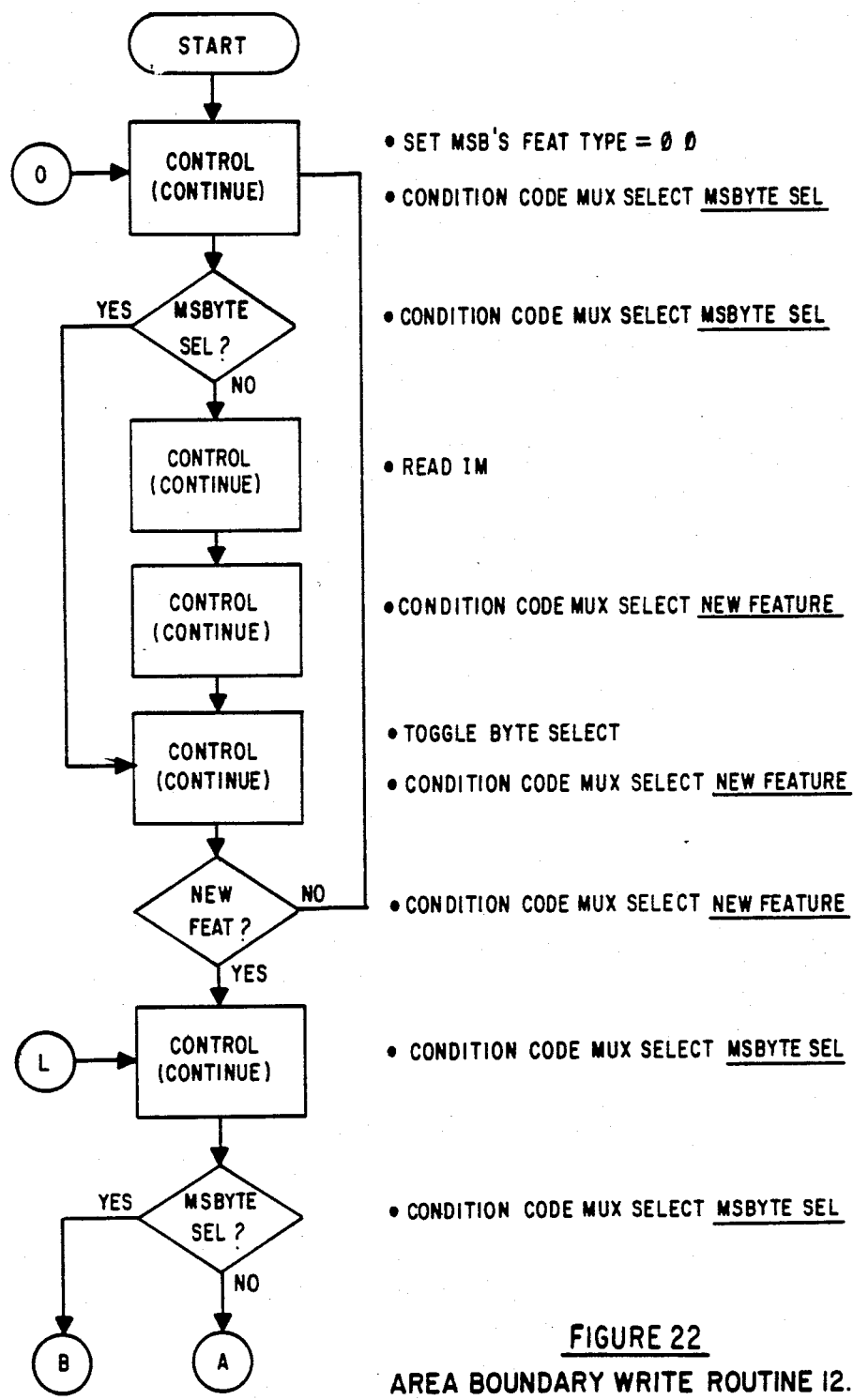
FIGS. 22–30A contain a flow chart of the area boundary write routine 12.5 m of the diagram shown in FIG. 16.
Figure 23:
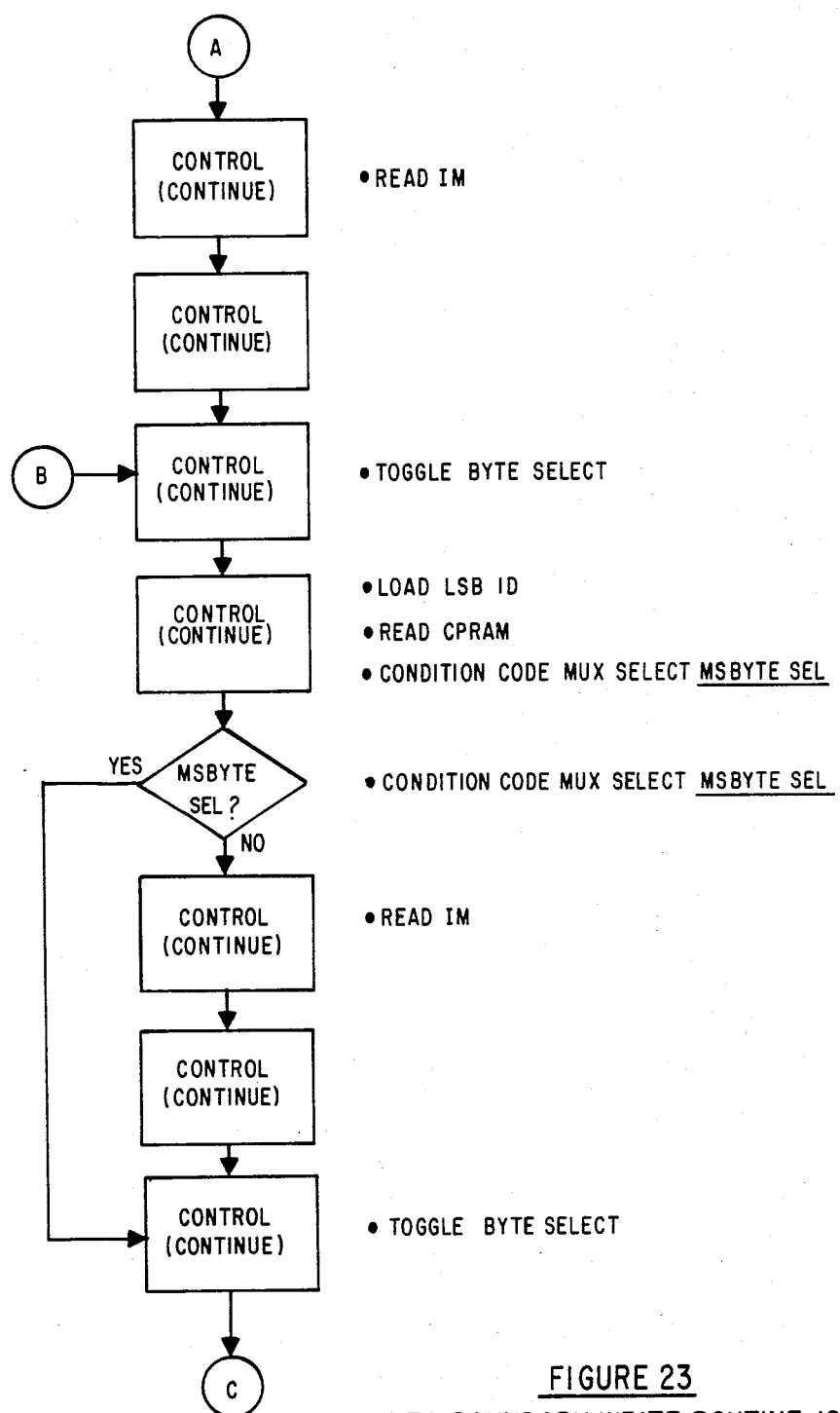
Figure 24:
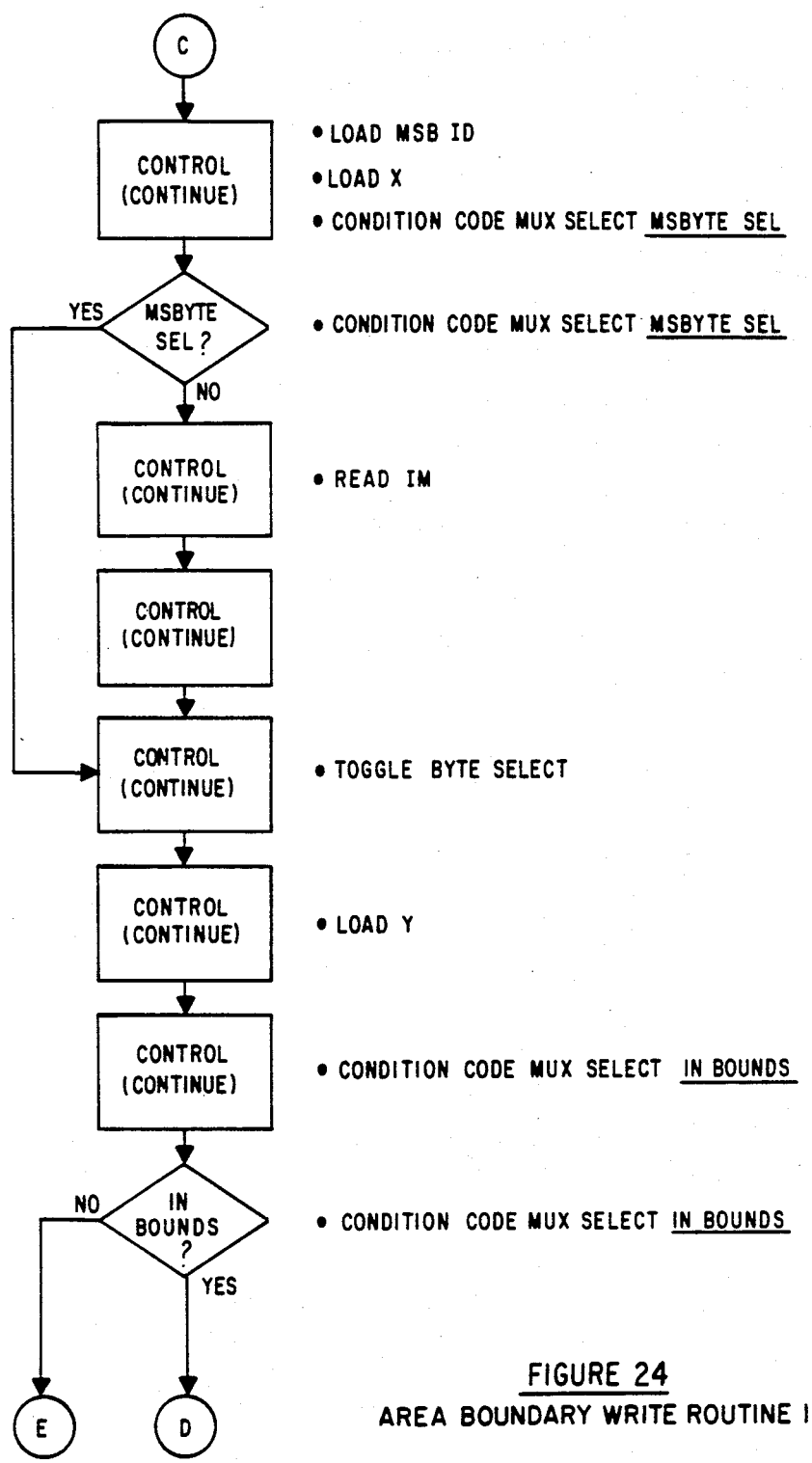
Figure 25:
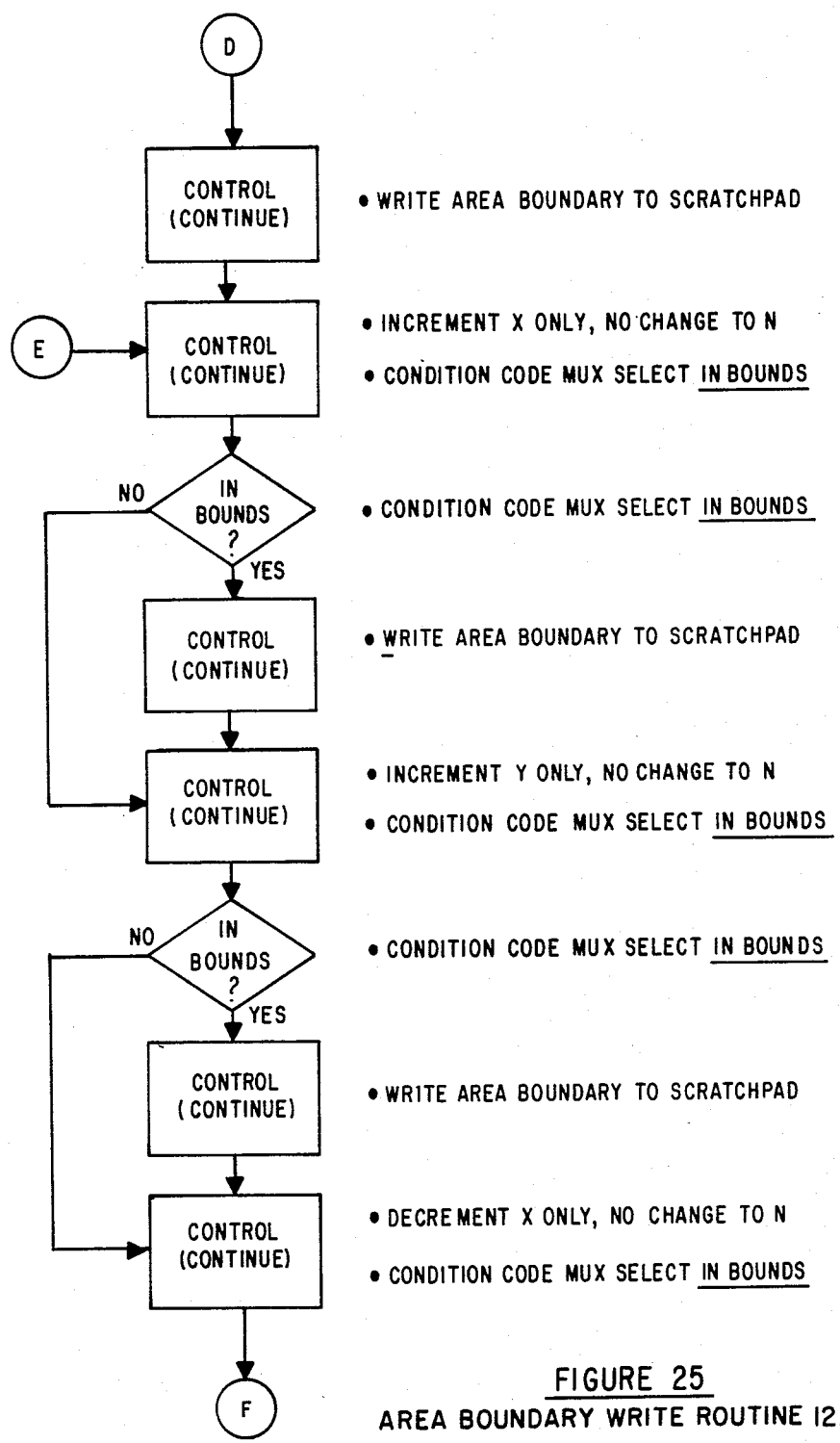
Figure 26:
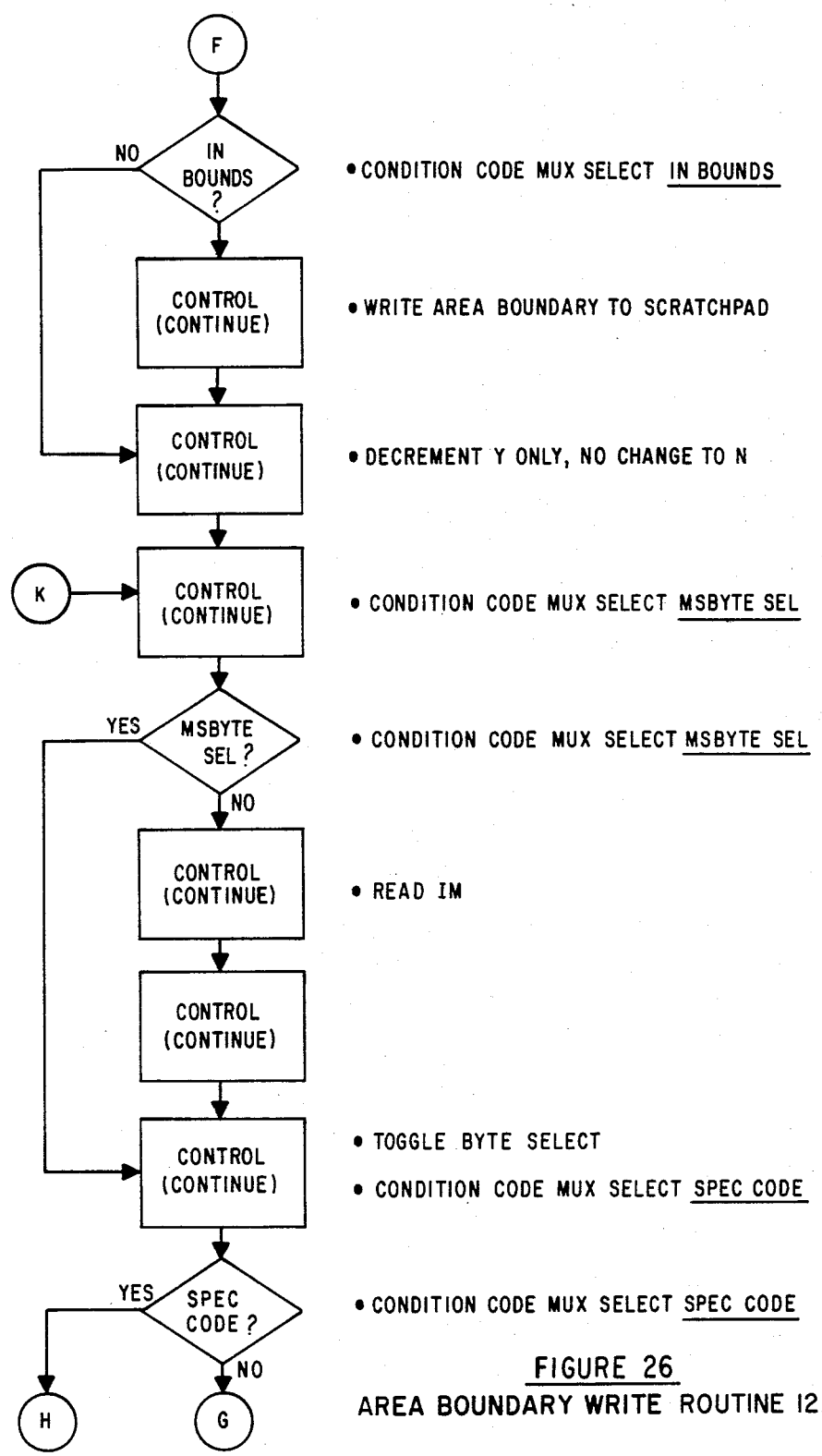
Figure 27:
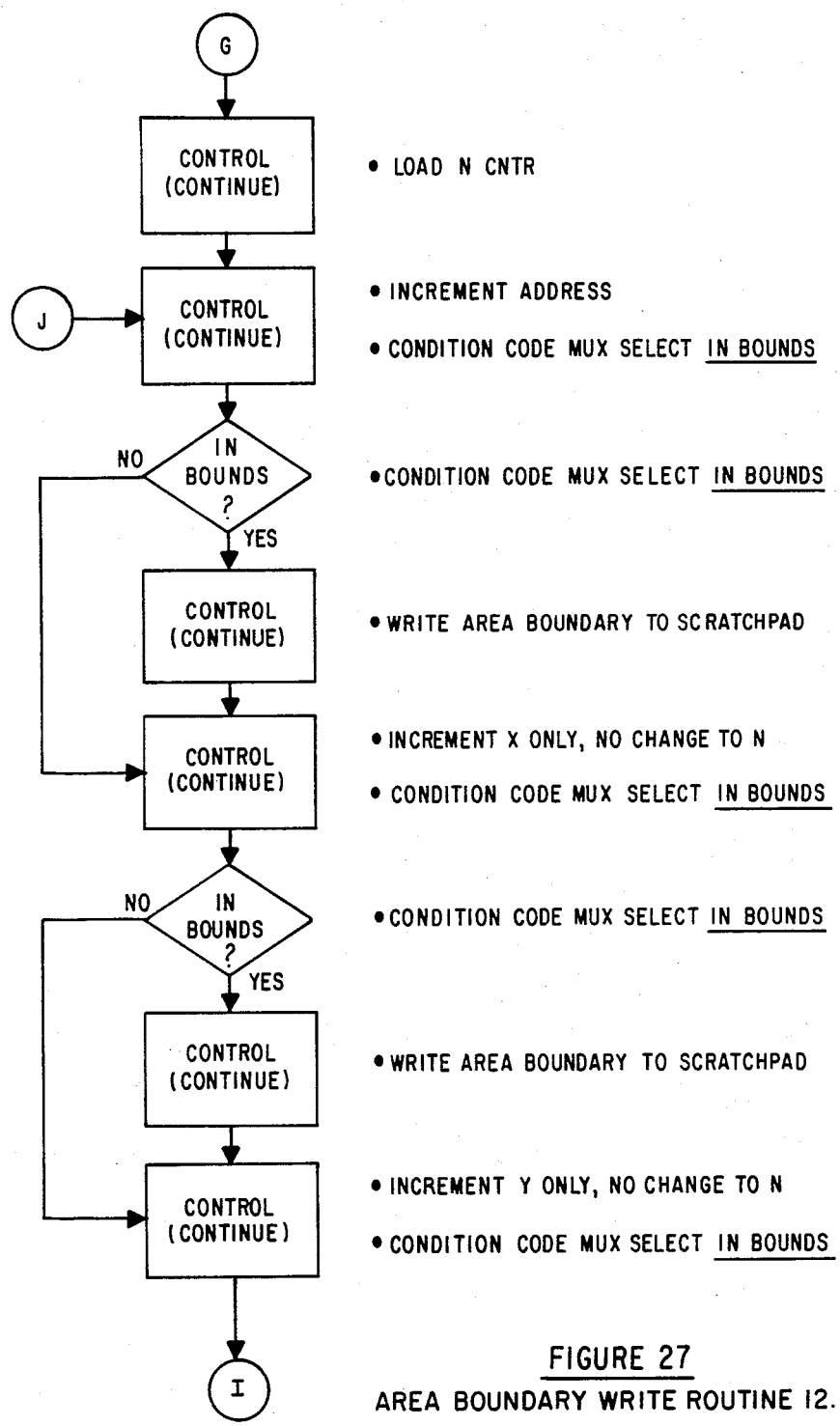
Figure 28:
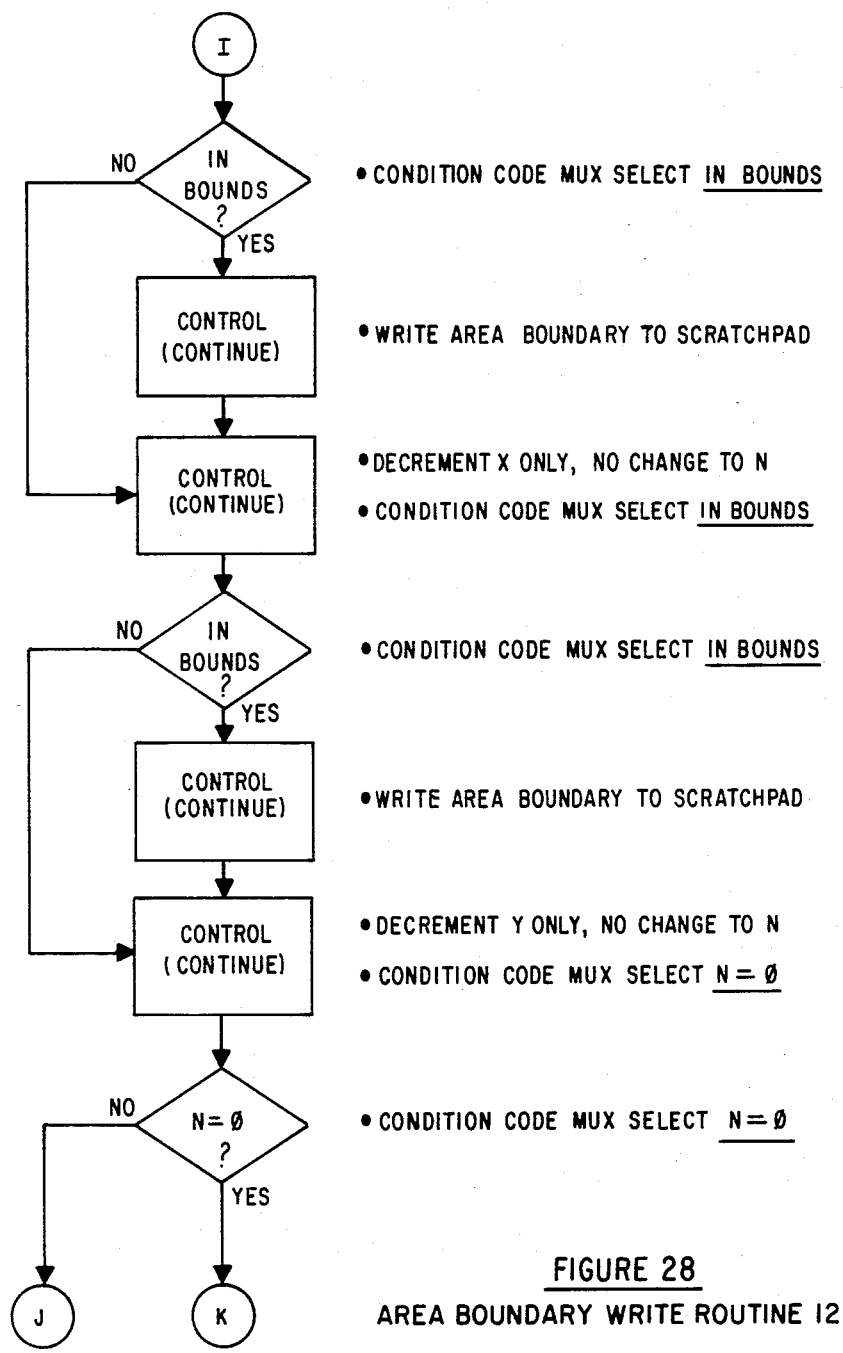
Figure 29:
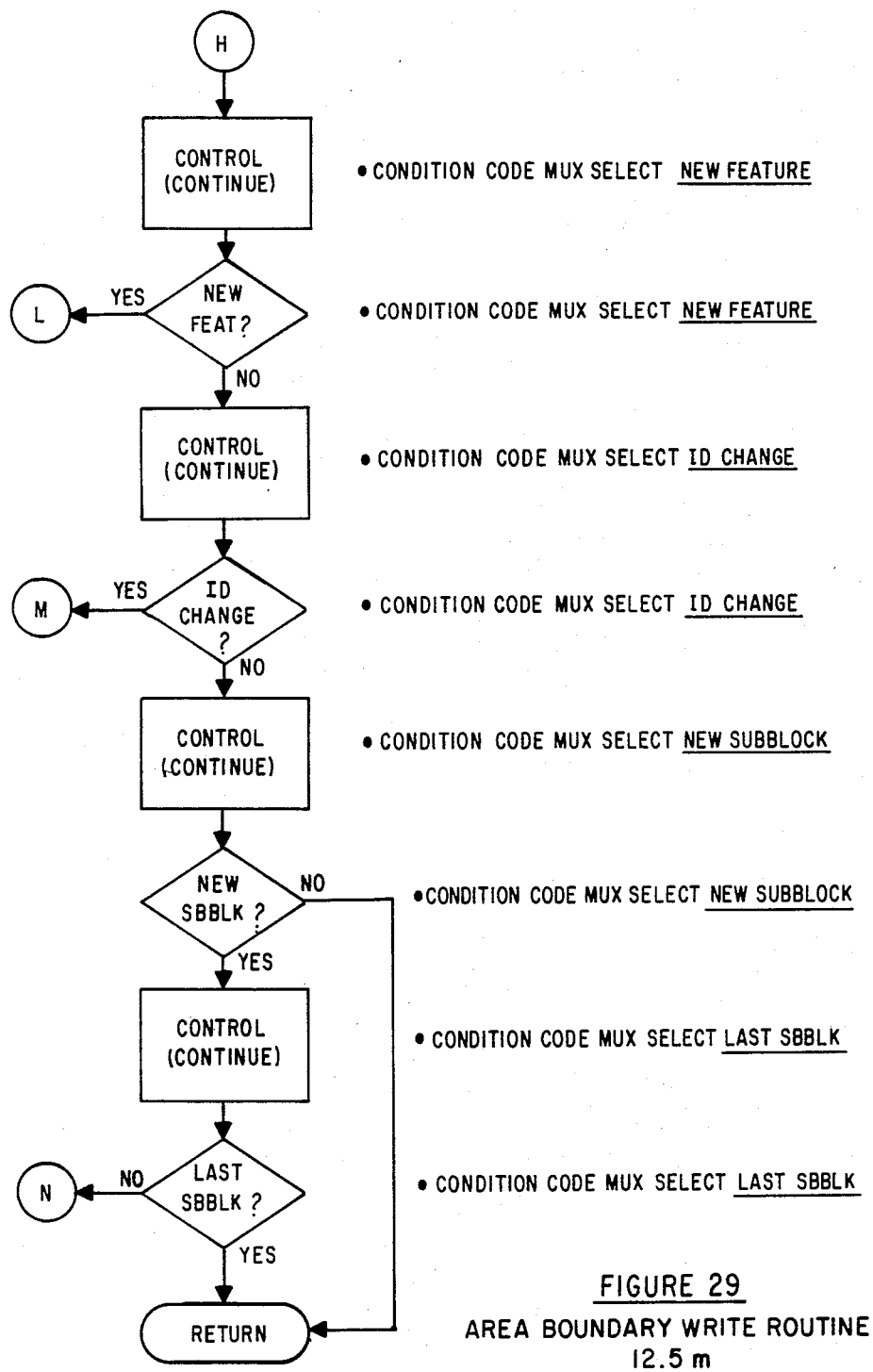
Figures 30, 30A:
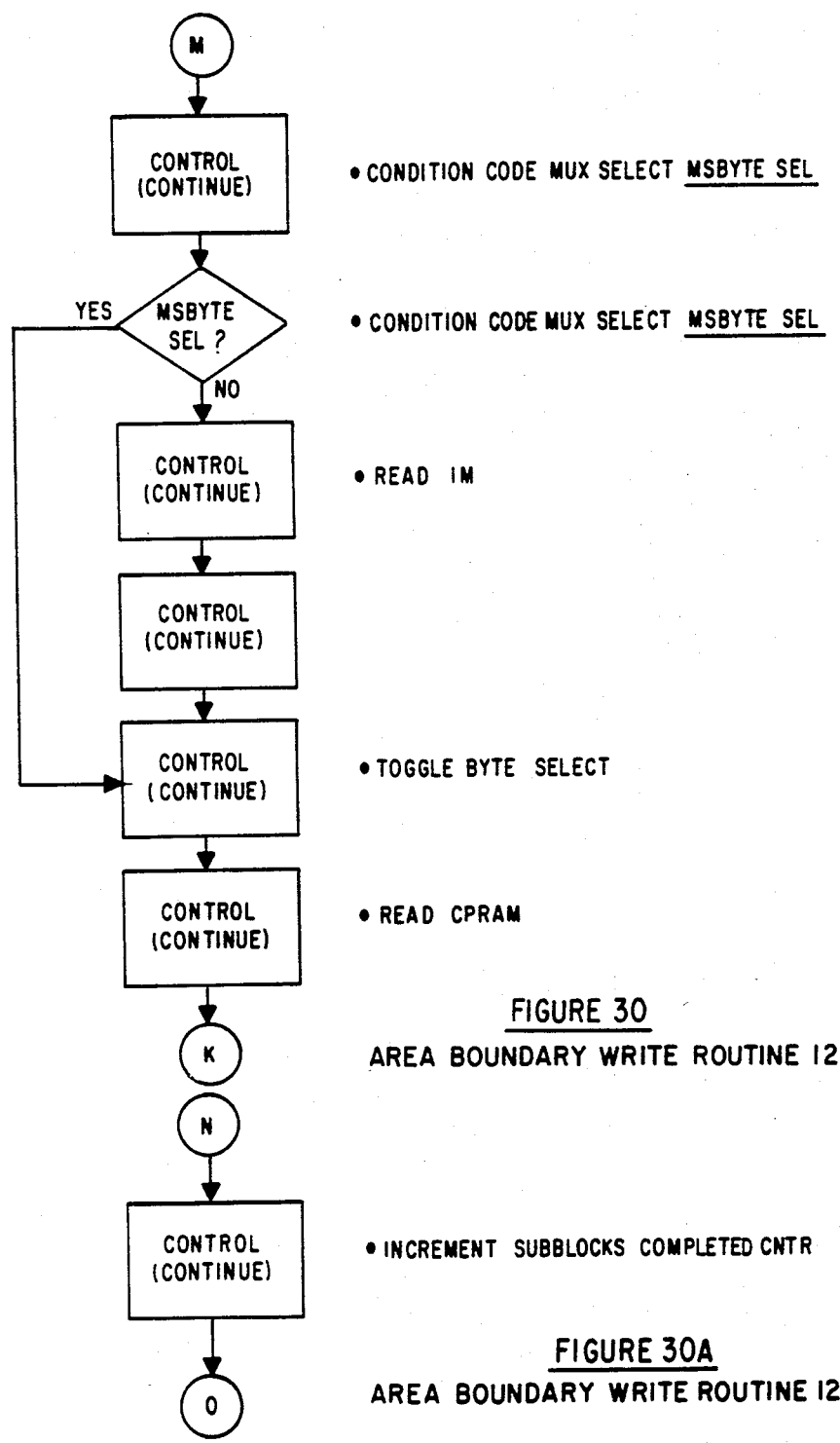
Figure 31:
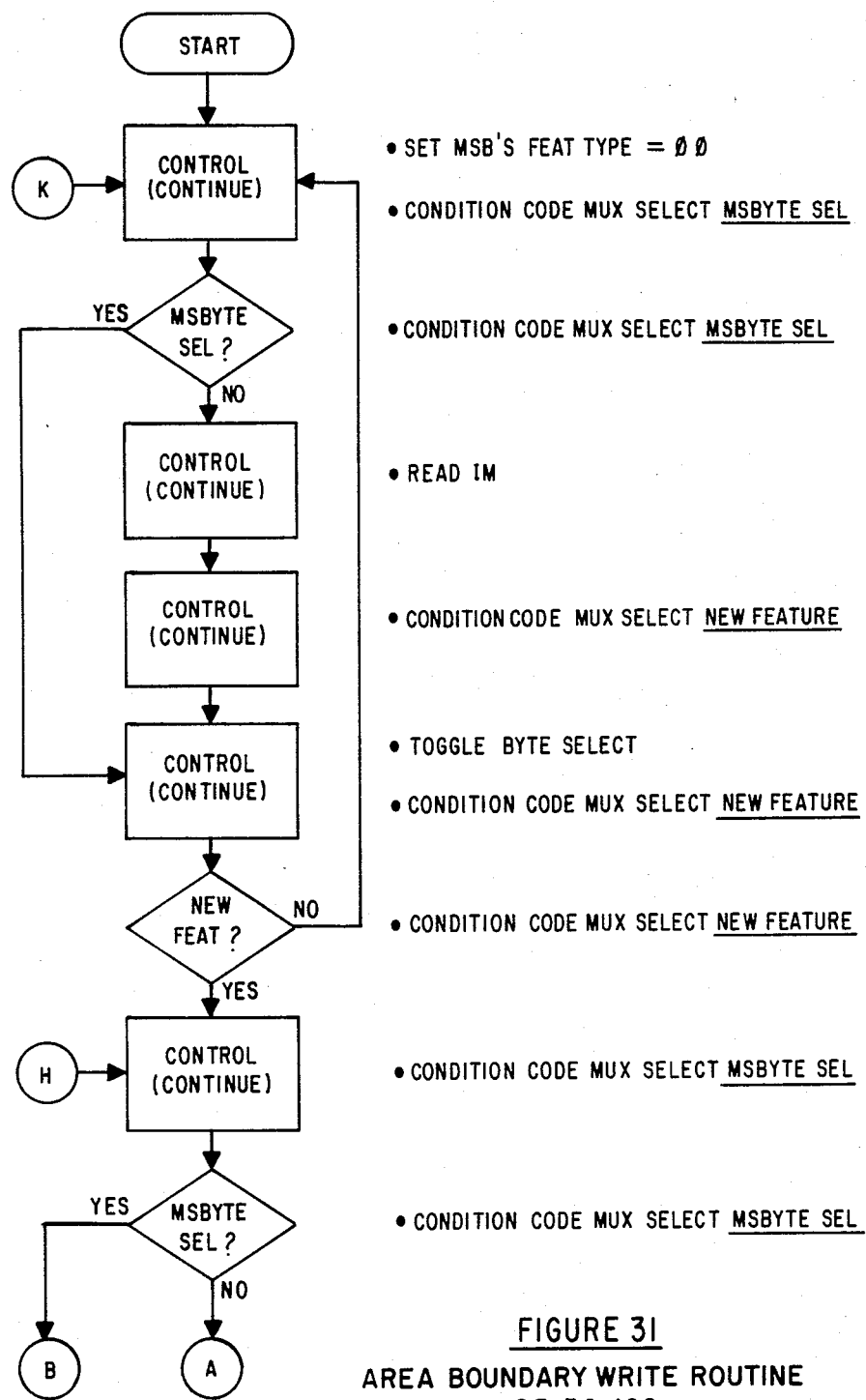
FIGS. 31–38 contain a flow chart of the area boundary write routine 25, 50, 100 m of the diagram of FIG. 16.
Figure 32:
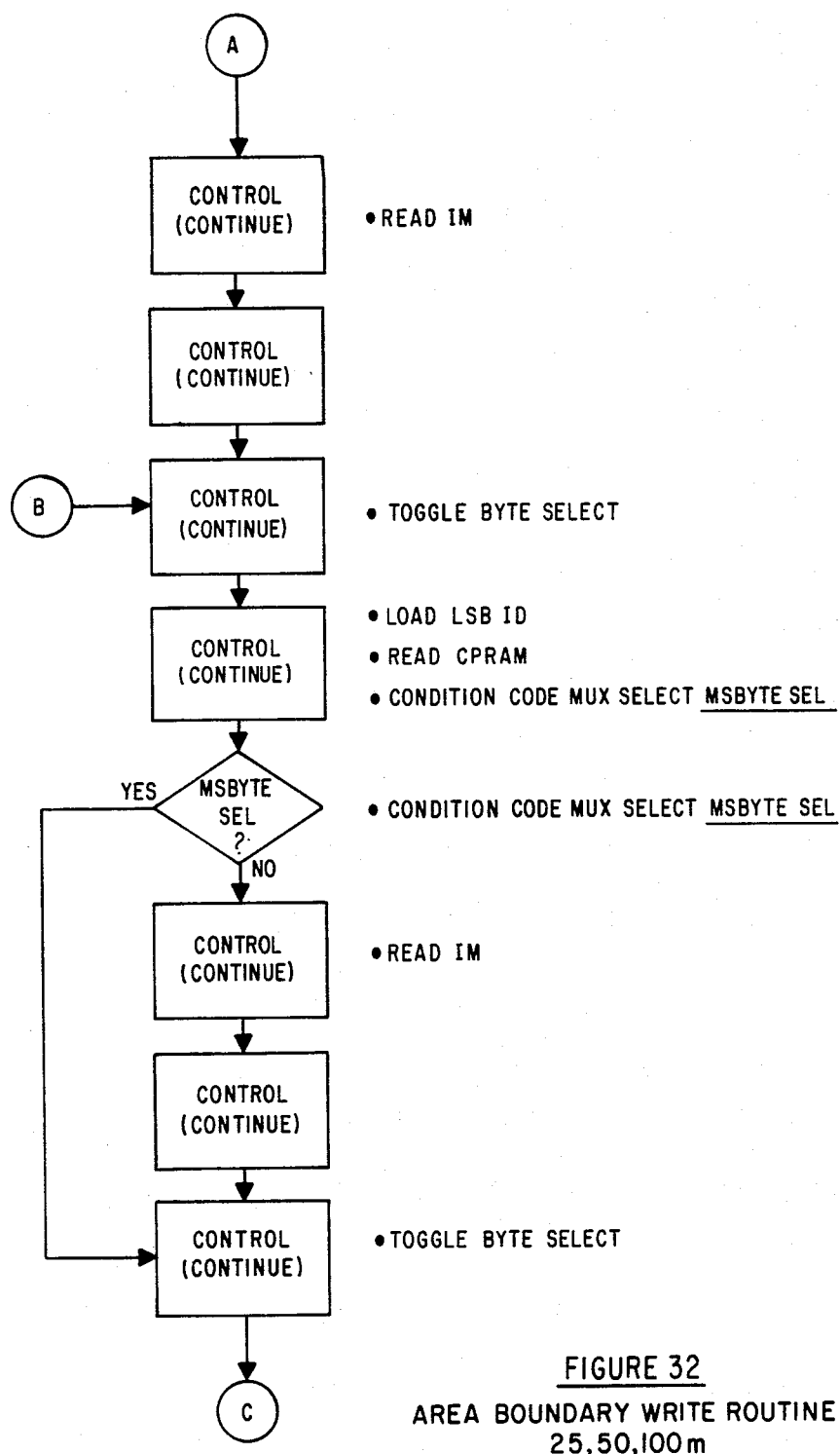
Figure 33:
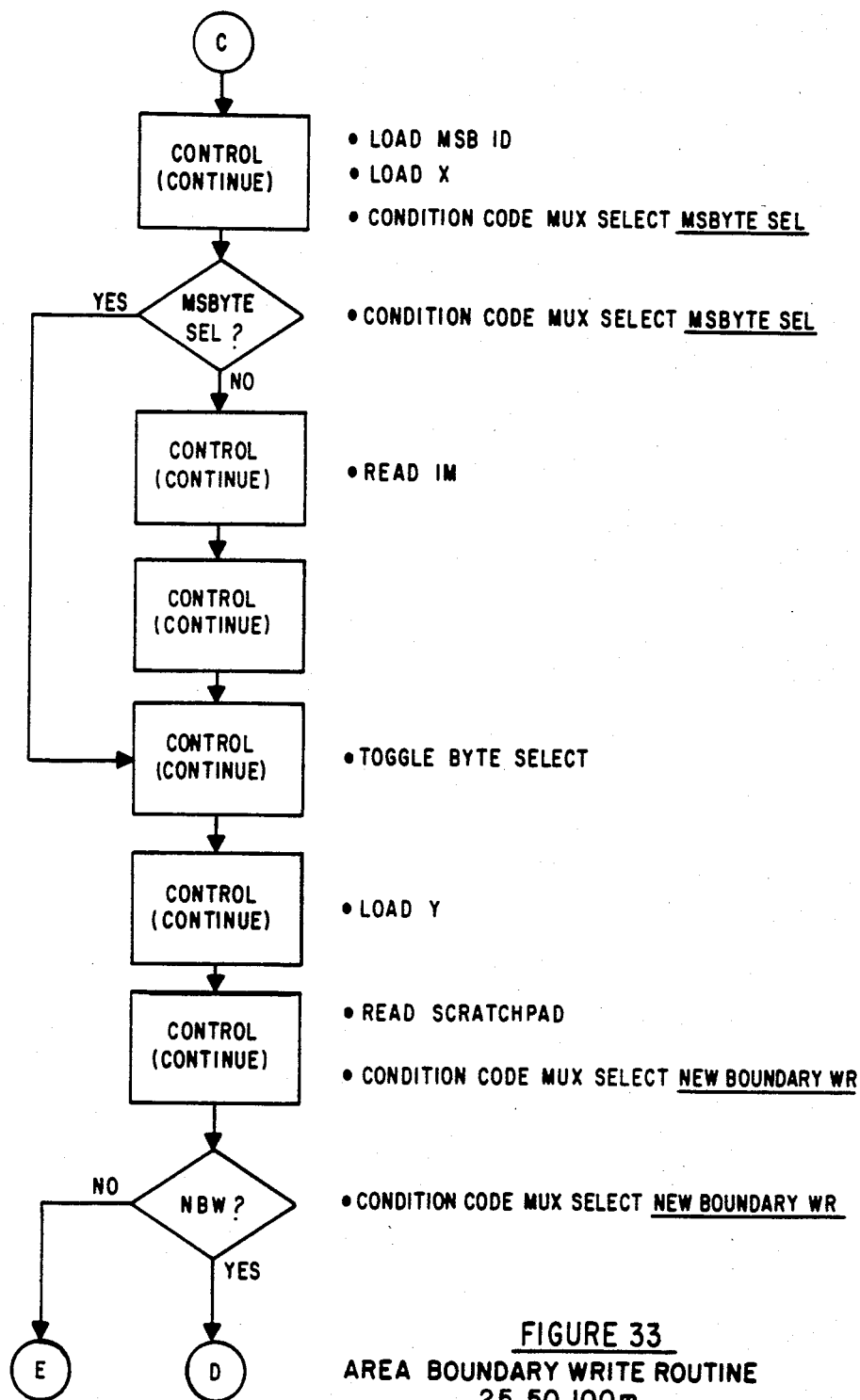
Figure 34:
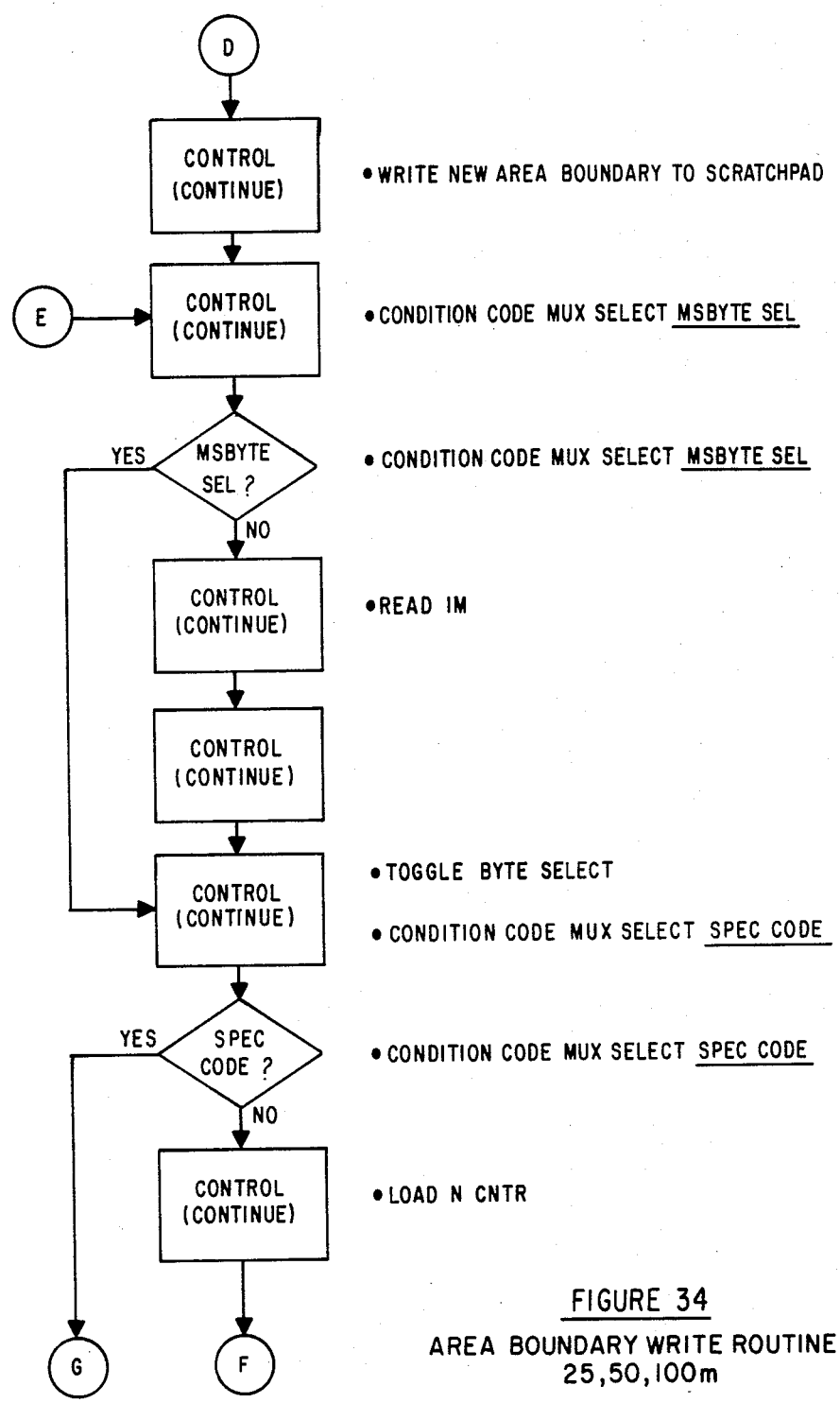
Figure 35:
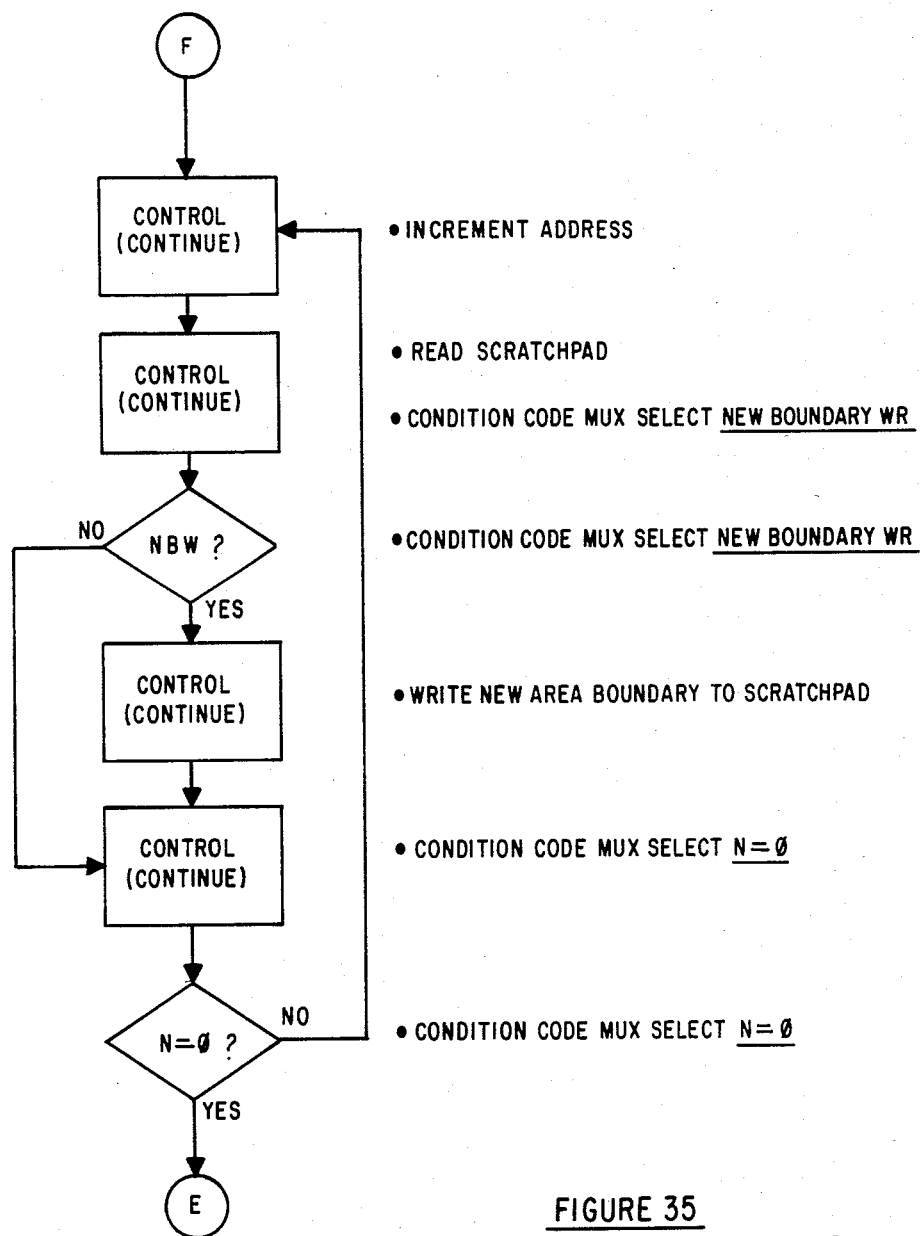
Figure 36:
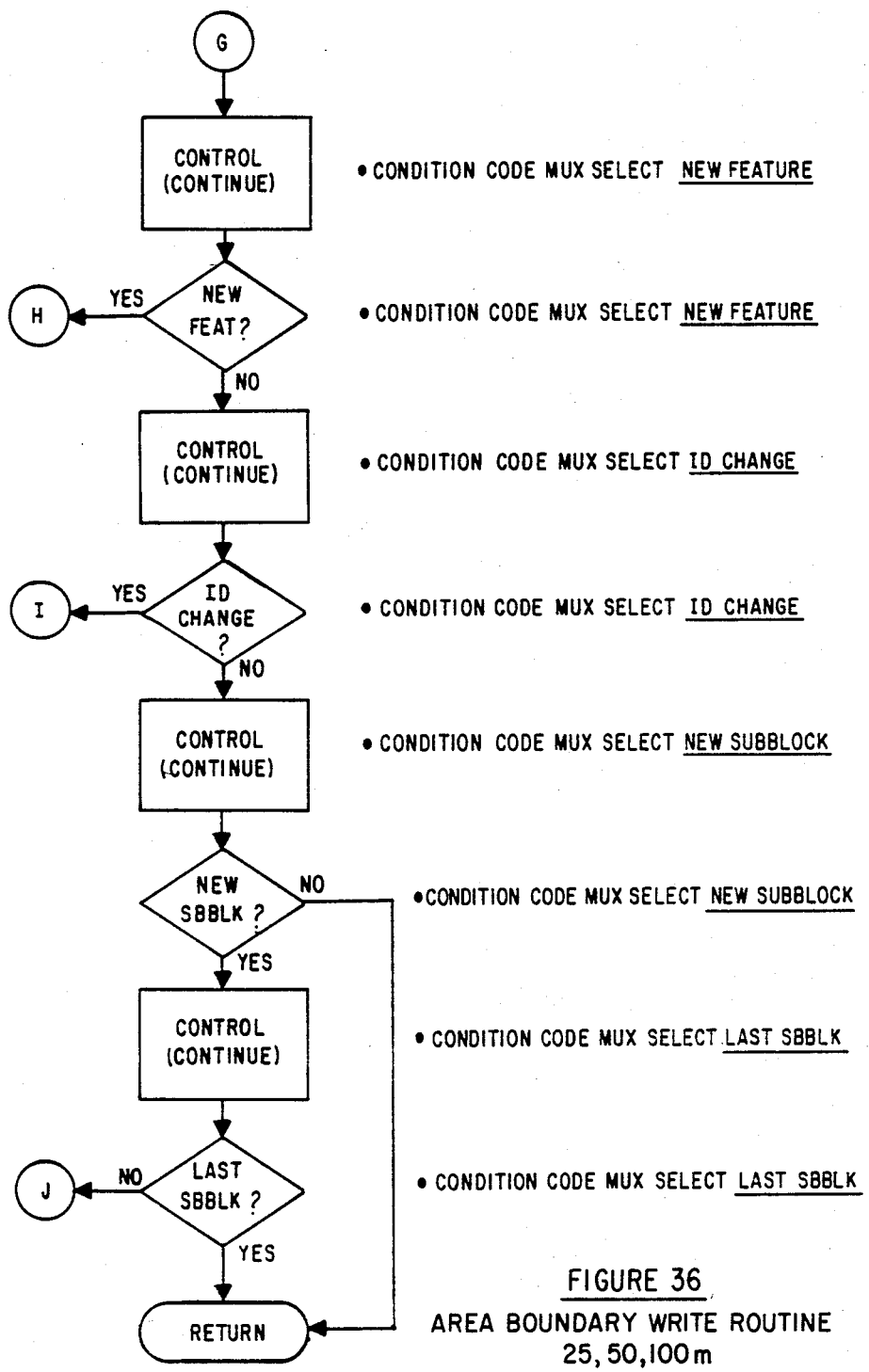
Figures 37, 38:
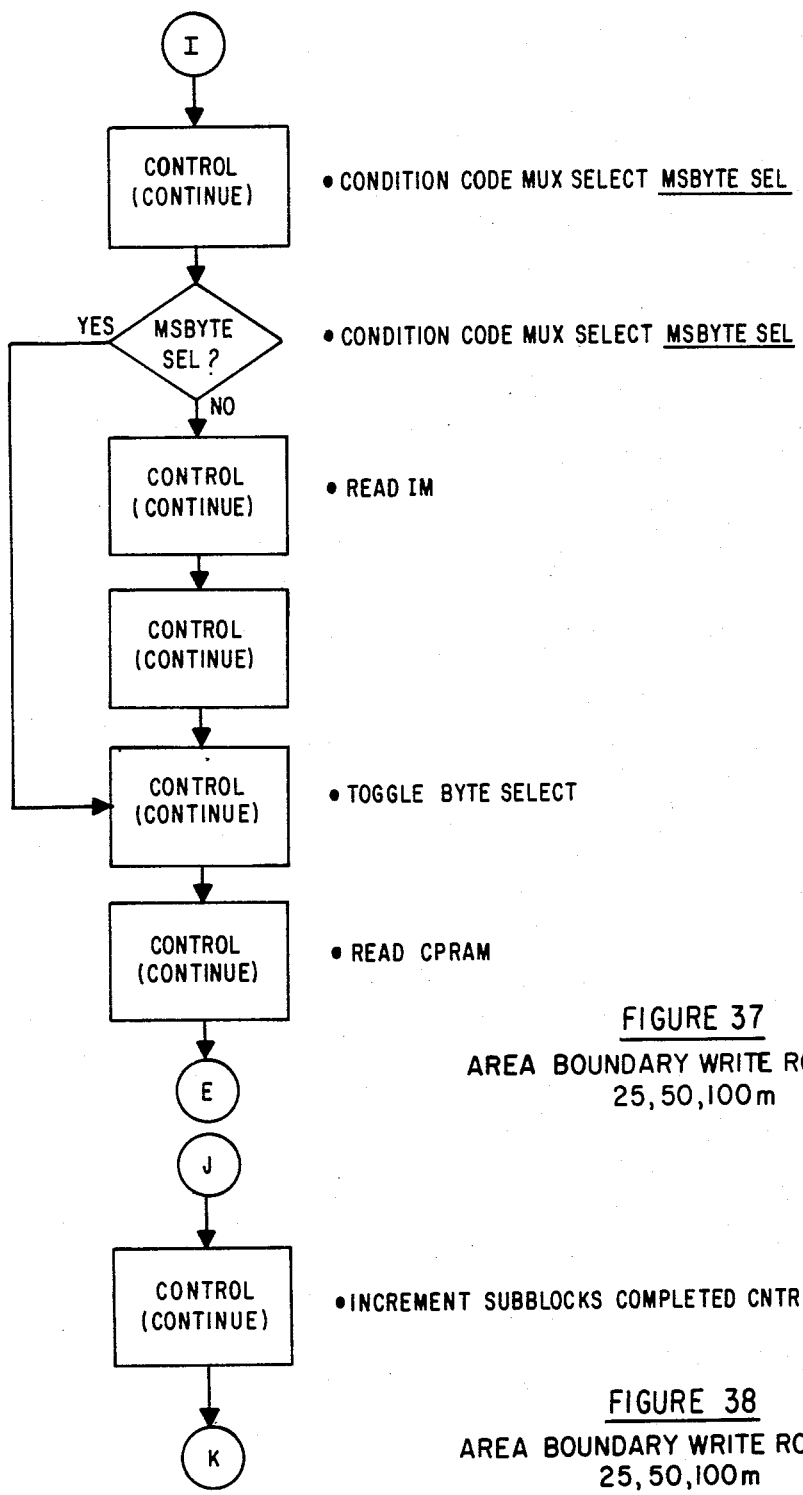
Figure 39:
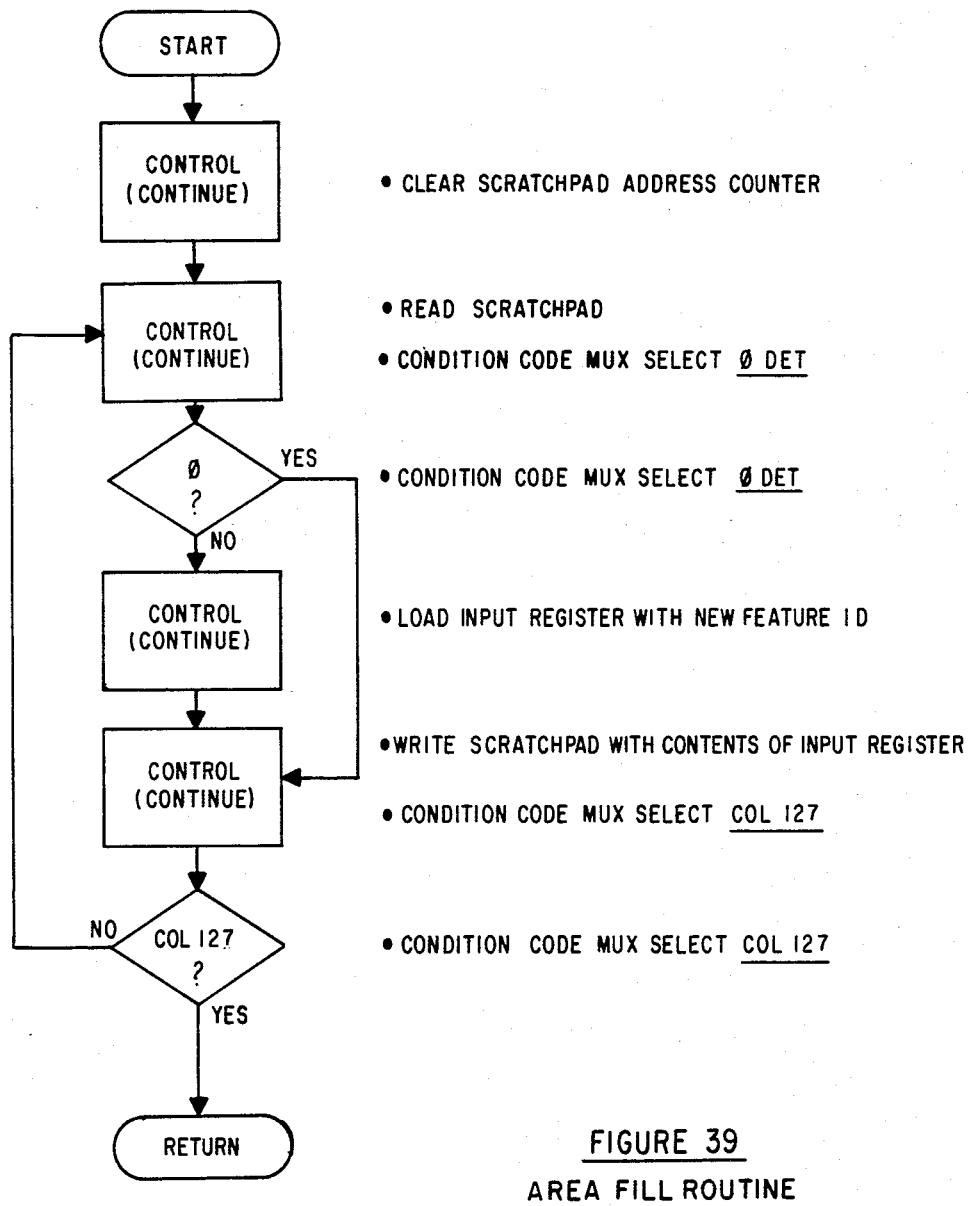
FIG. 39 is a flow chart of the area fill routine of the diagram of FIG. 16.
Figure 40:
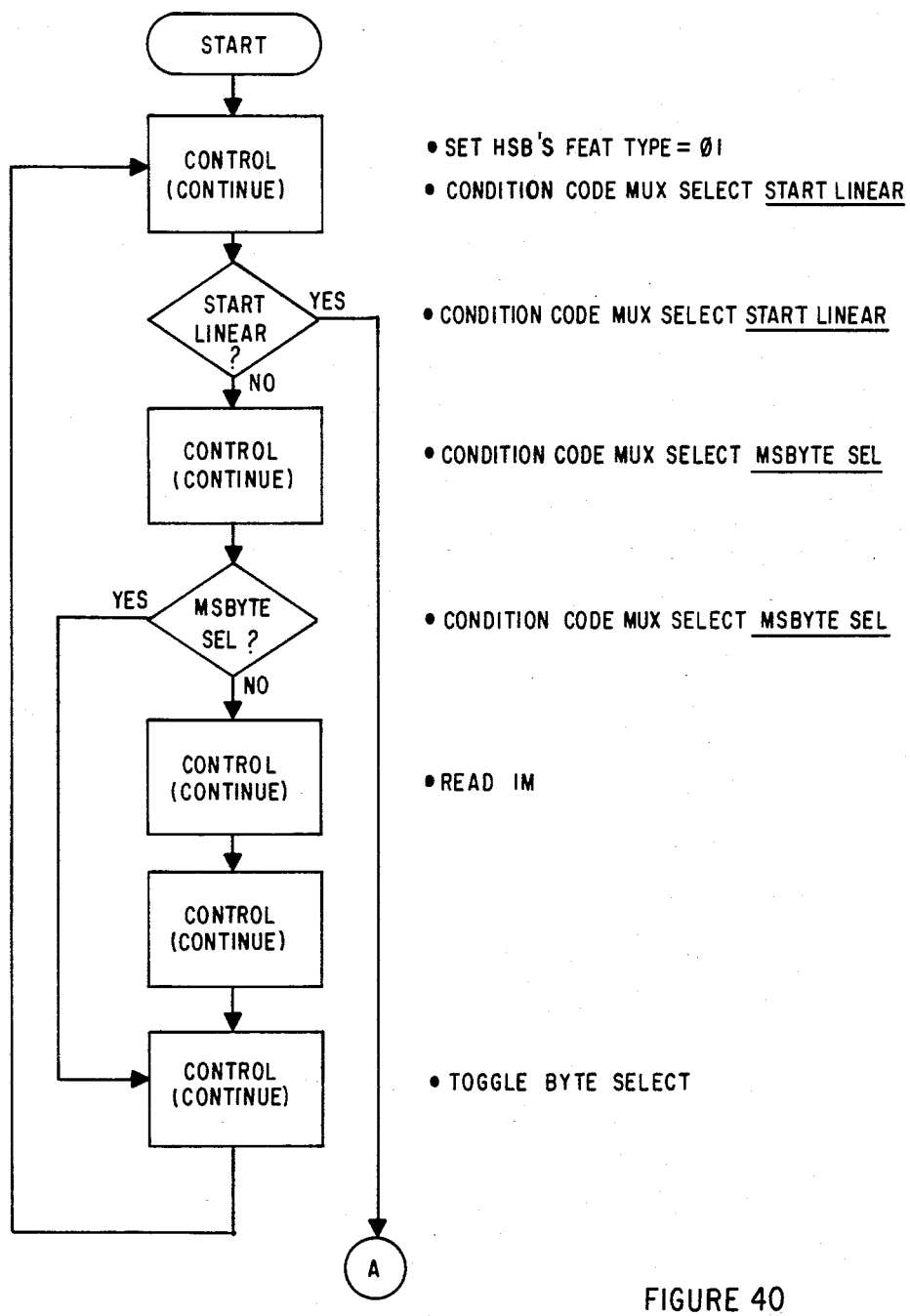
FIGS. 40–49 contain a flow chart of the linear write routine portion of the diagram shown in FIG. 16.
Figure 41:
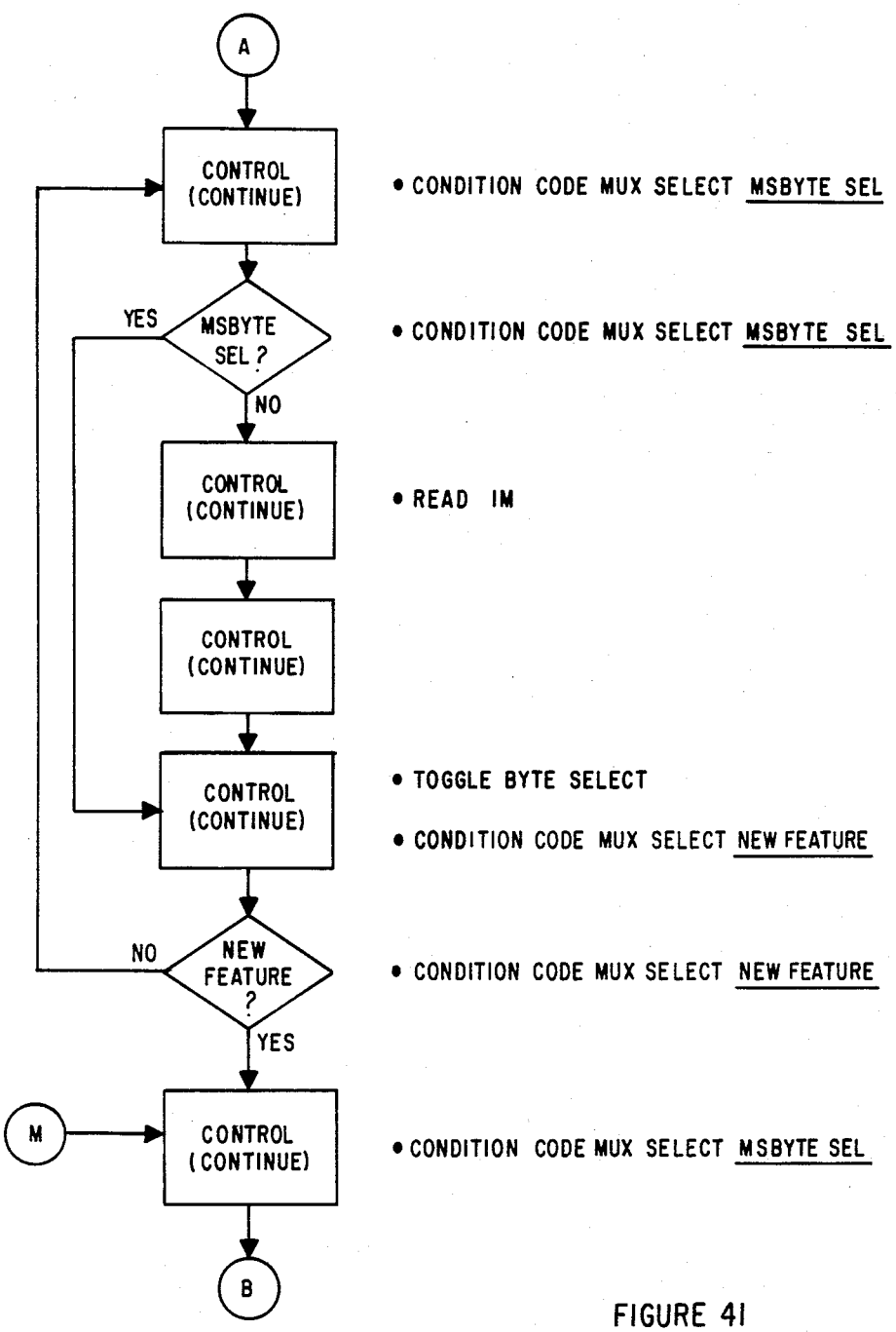
Figure 42:
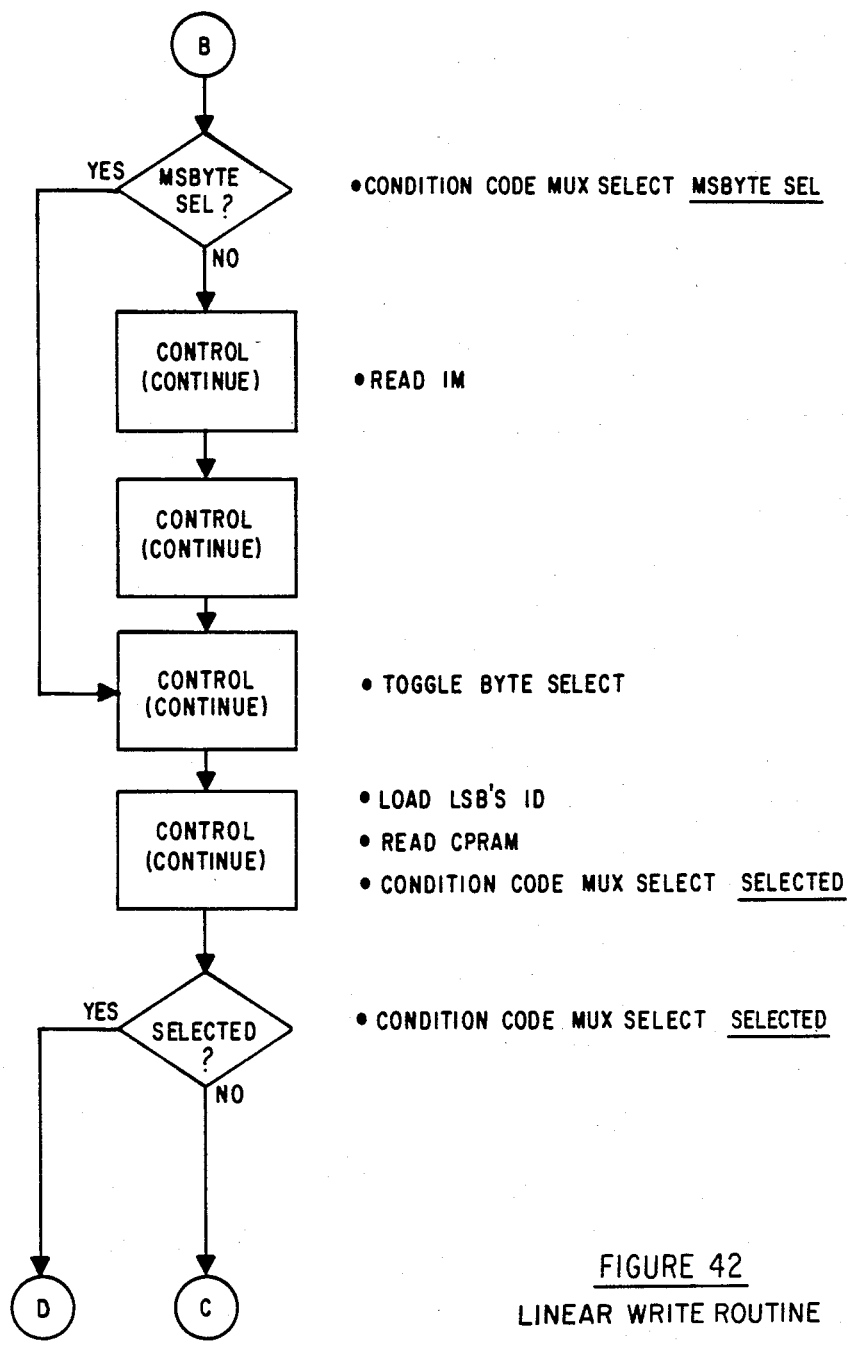
Figure 43:
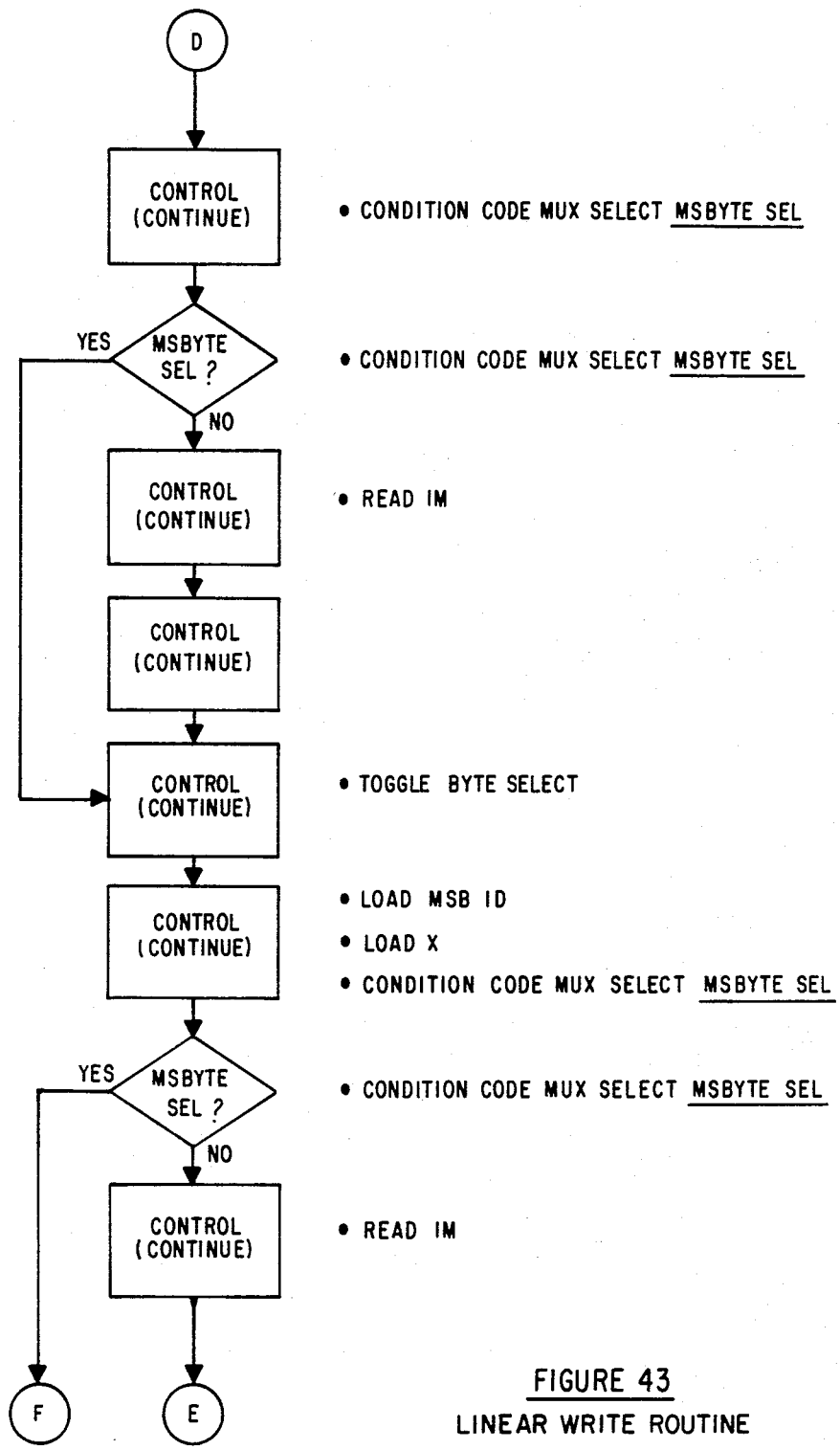
Figure 44:
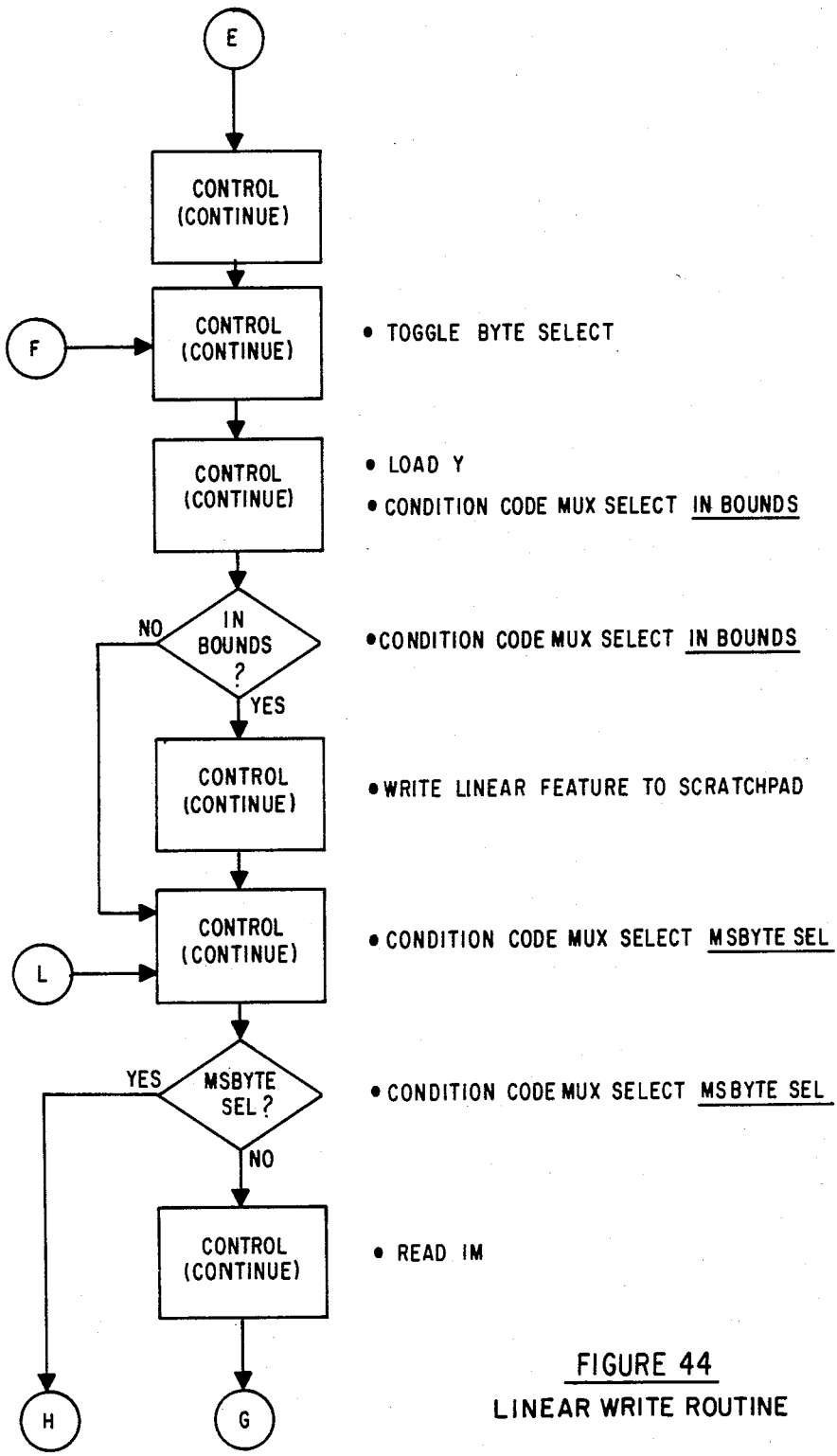
Figure 45:
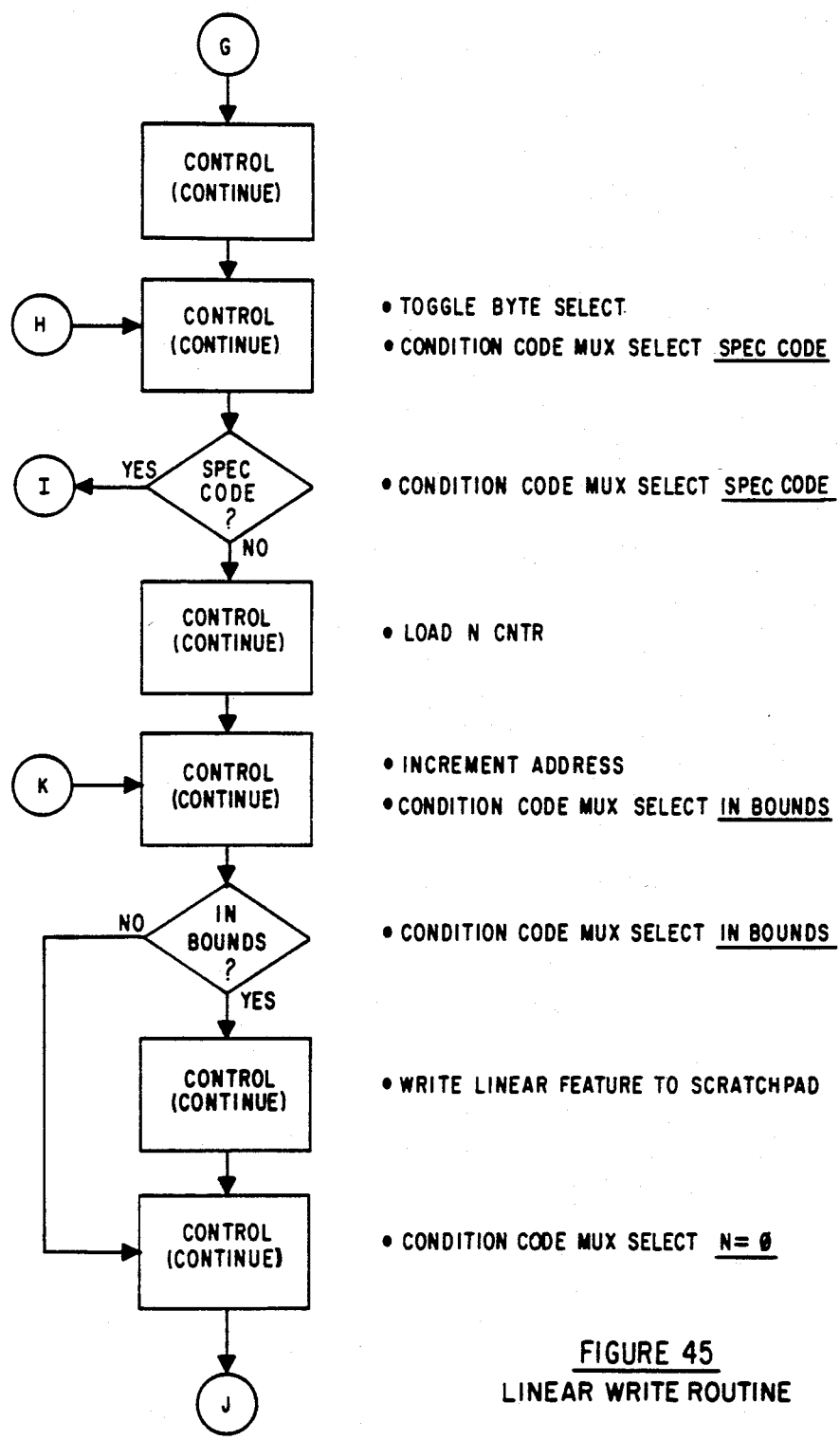
Figures 46, 47:
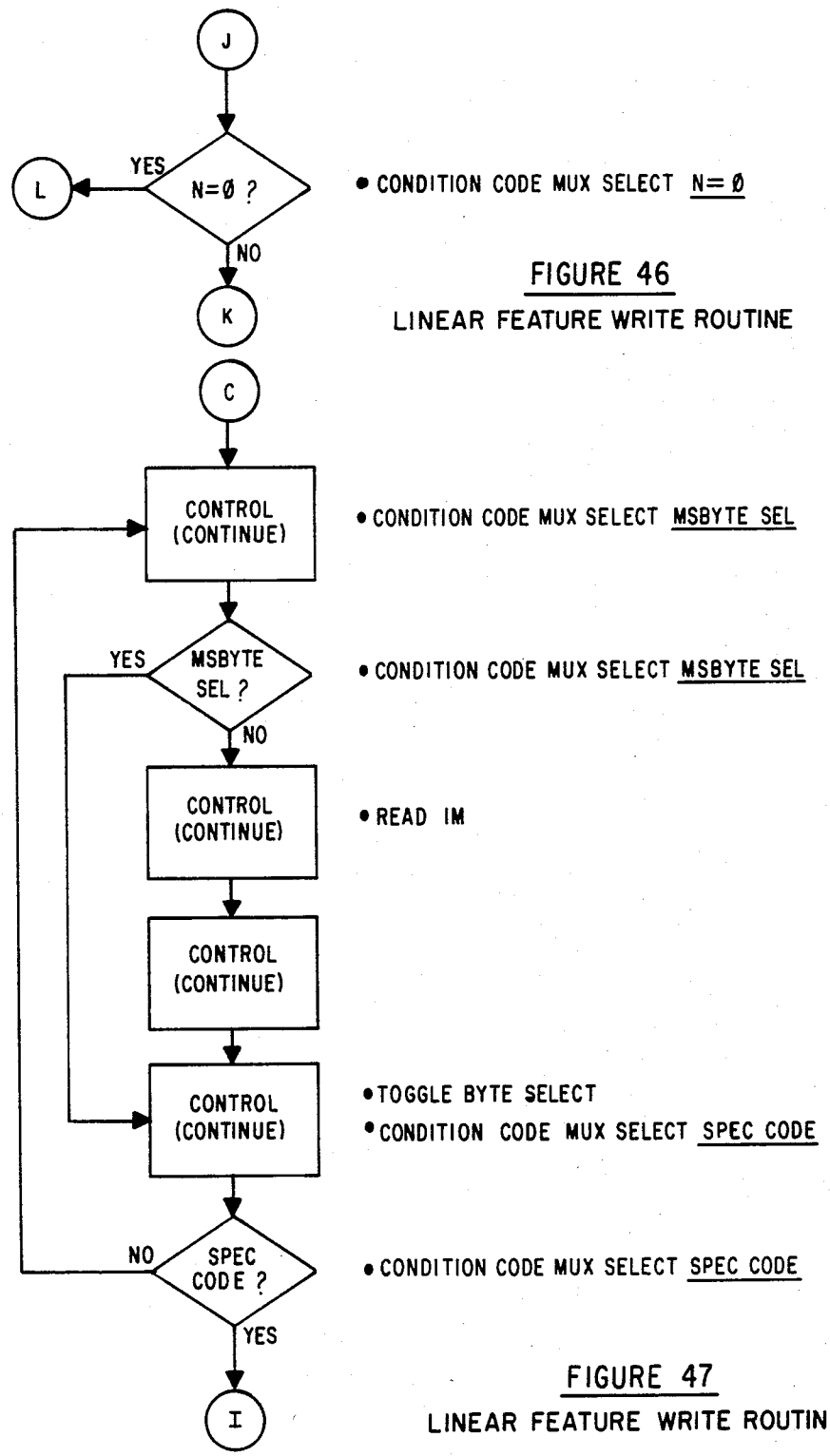
Figure 48:
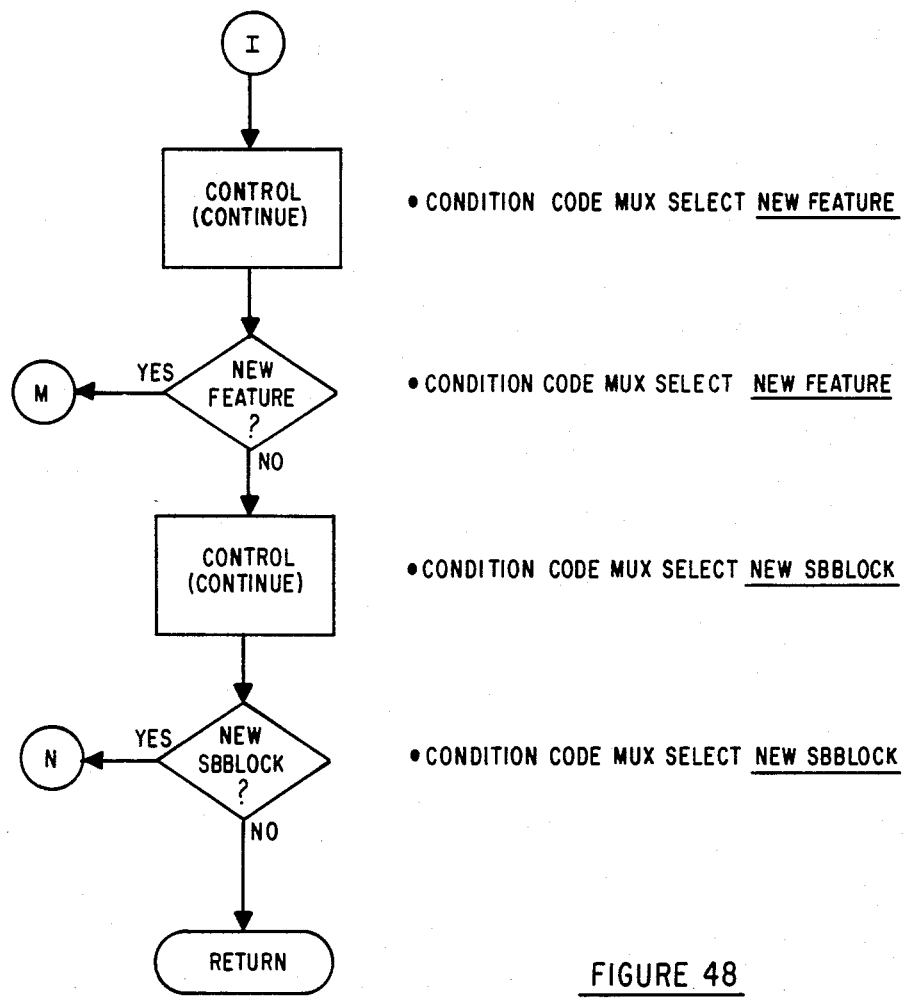
Figure 49:
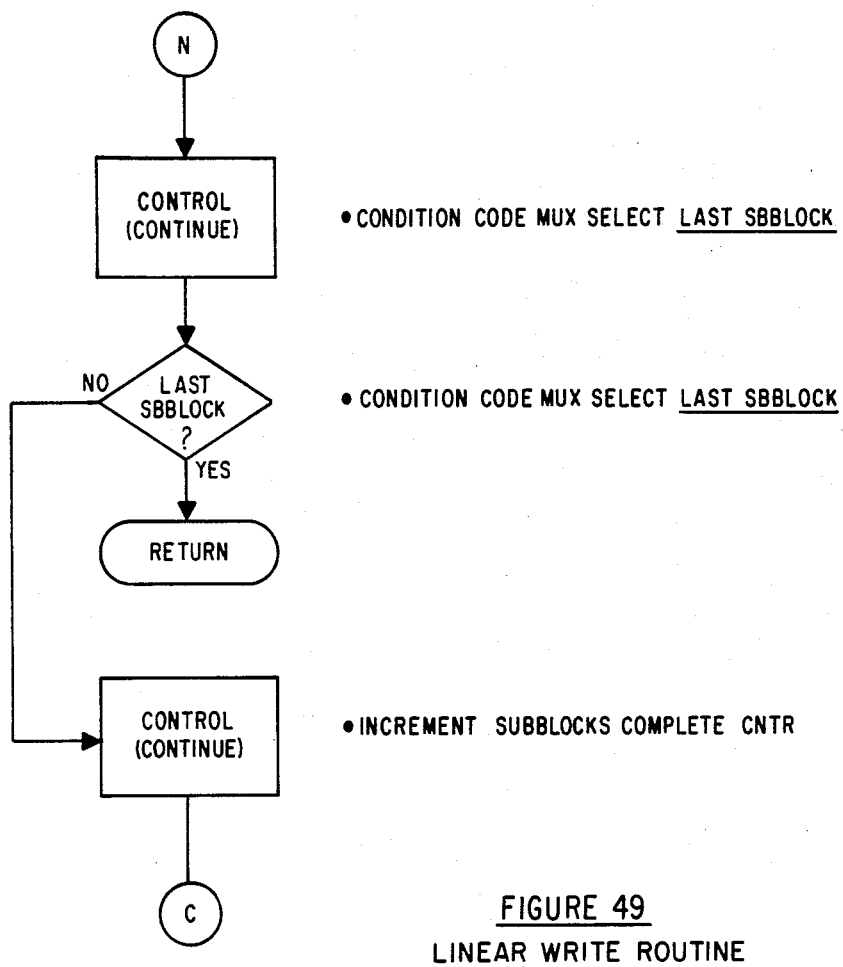
Figure 50:
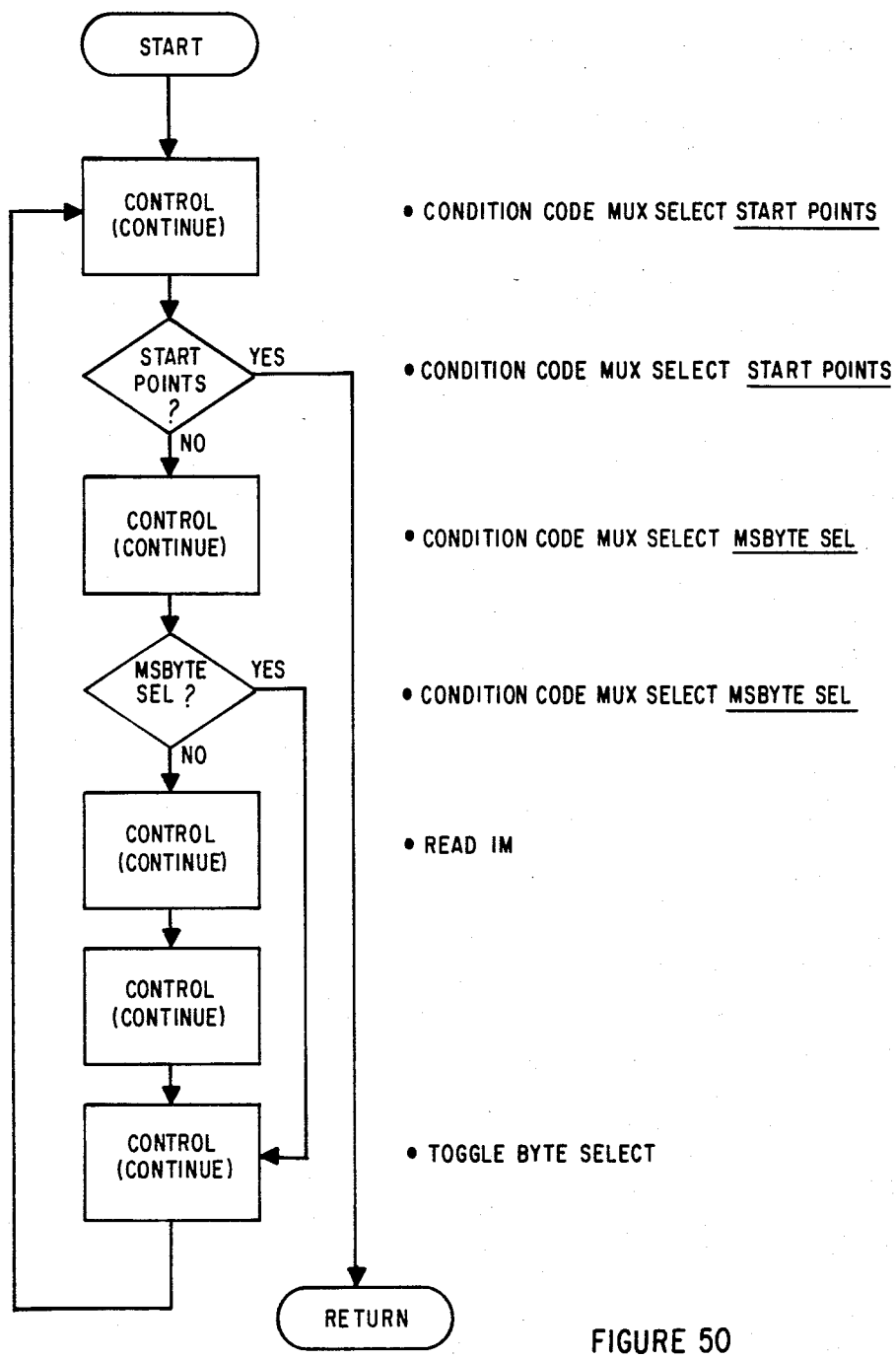
FIG. 50 is a flow chart of the find point feature routine of the diagram of FIG. 16.
Figure 51:
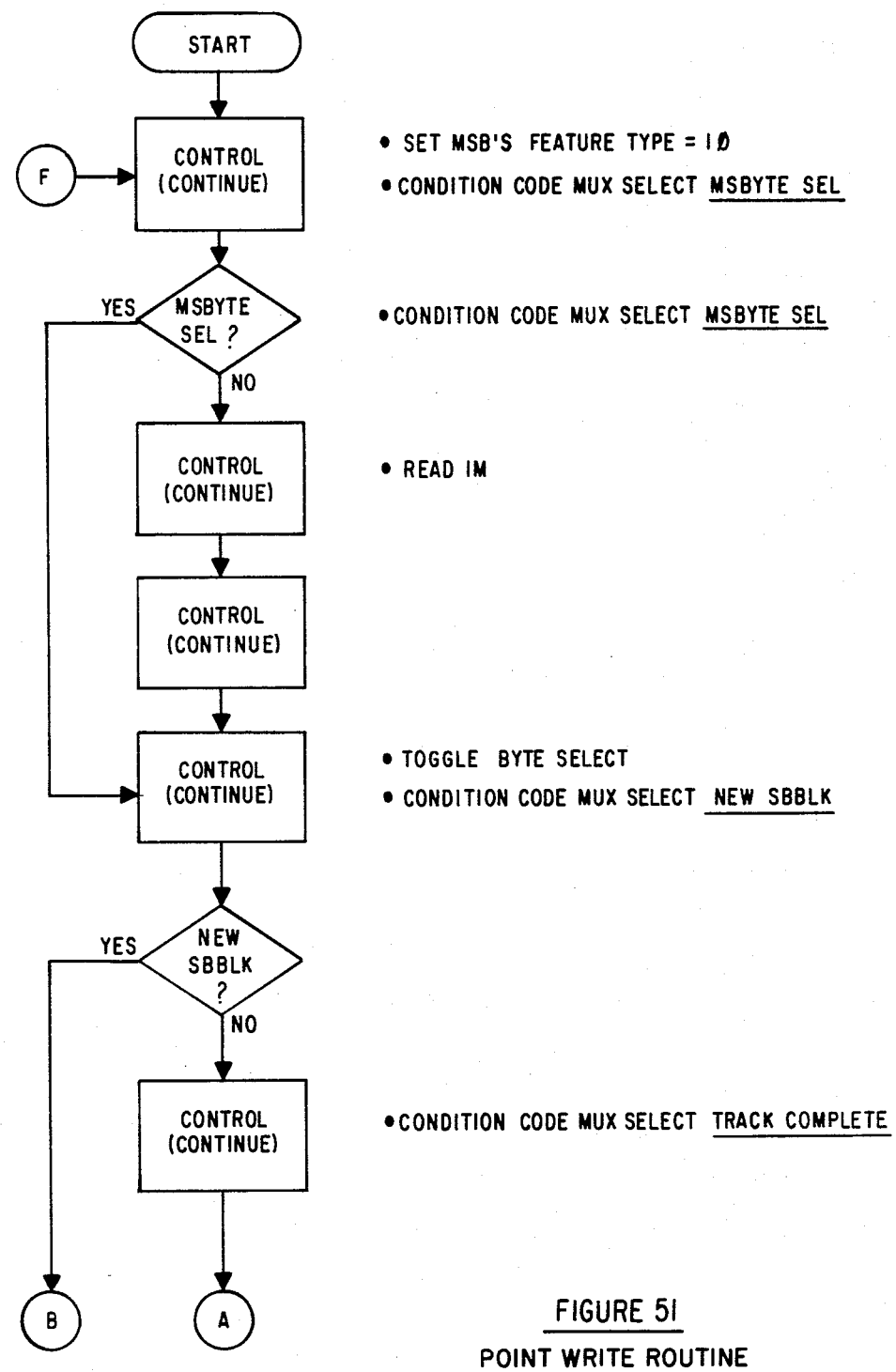
FIGS. 51–56 contain a flow chart of the point write routine of the diagram of FIG. 16.
Figure 52:
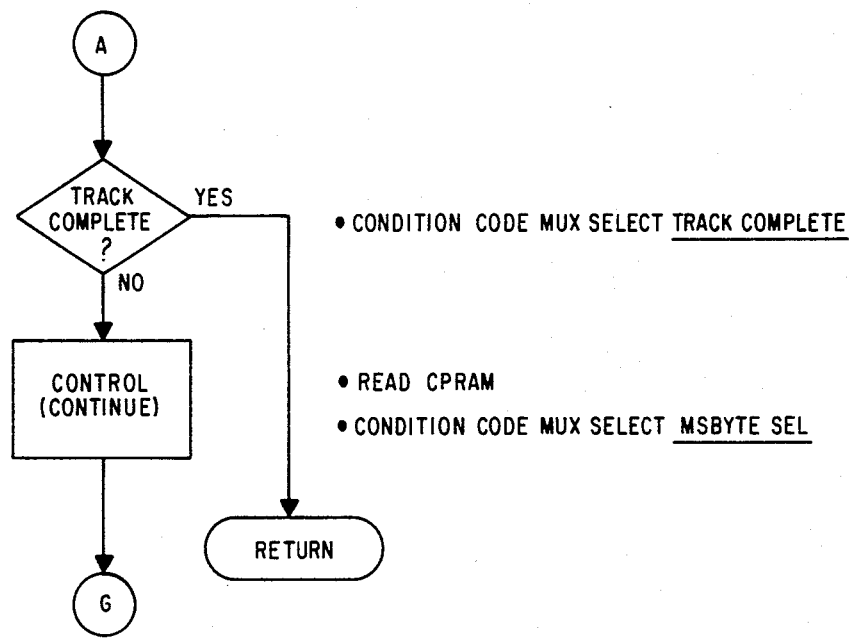
Figure 53:
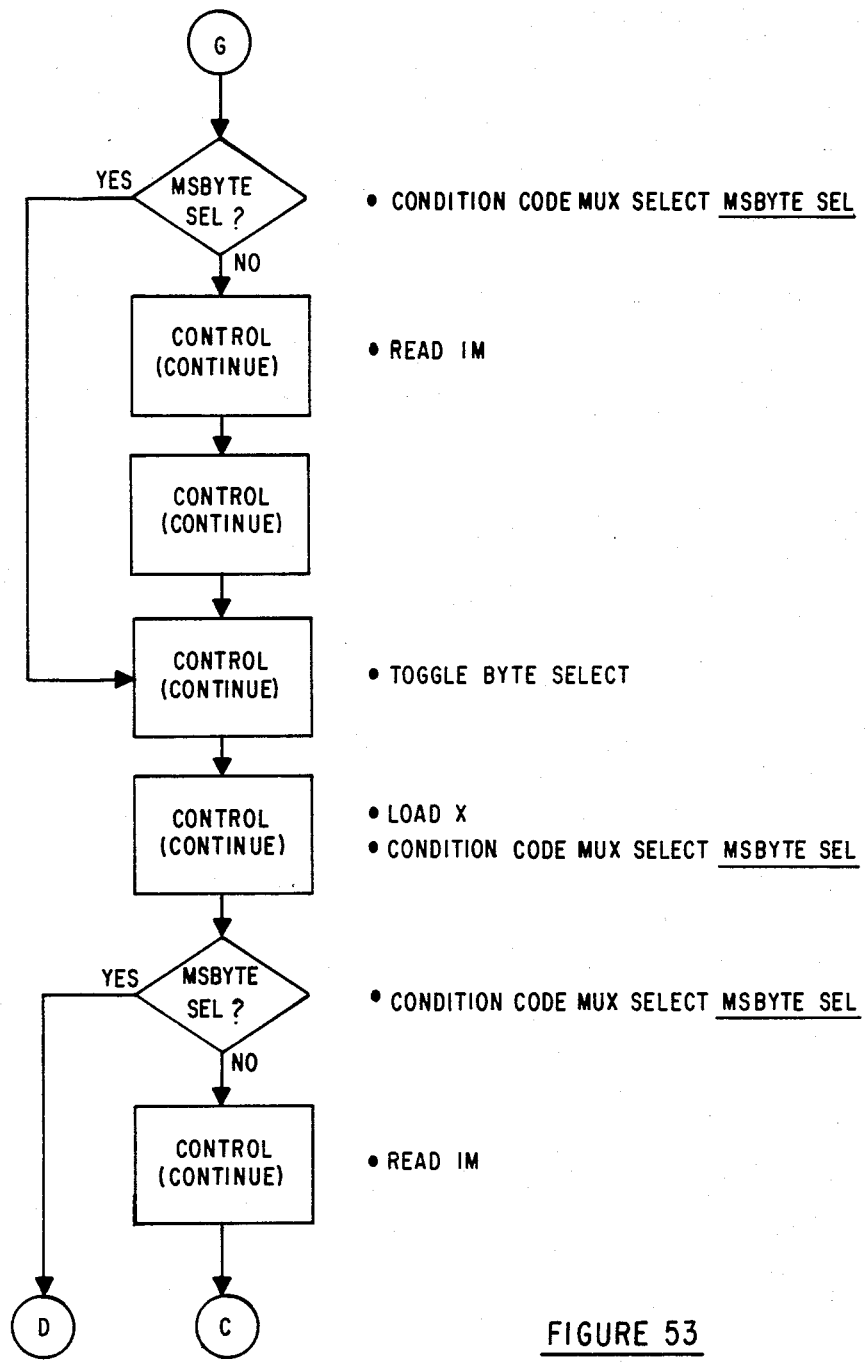
Figure 54:
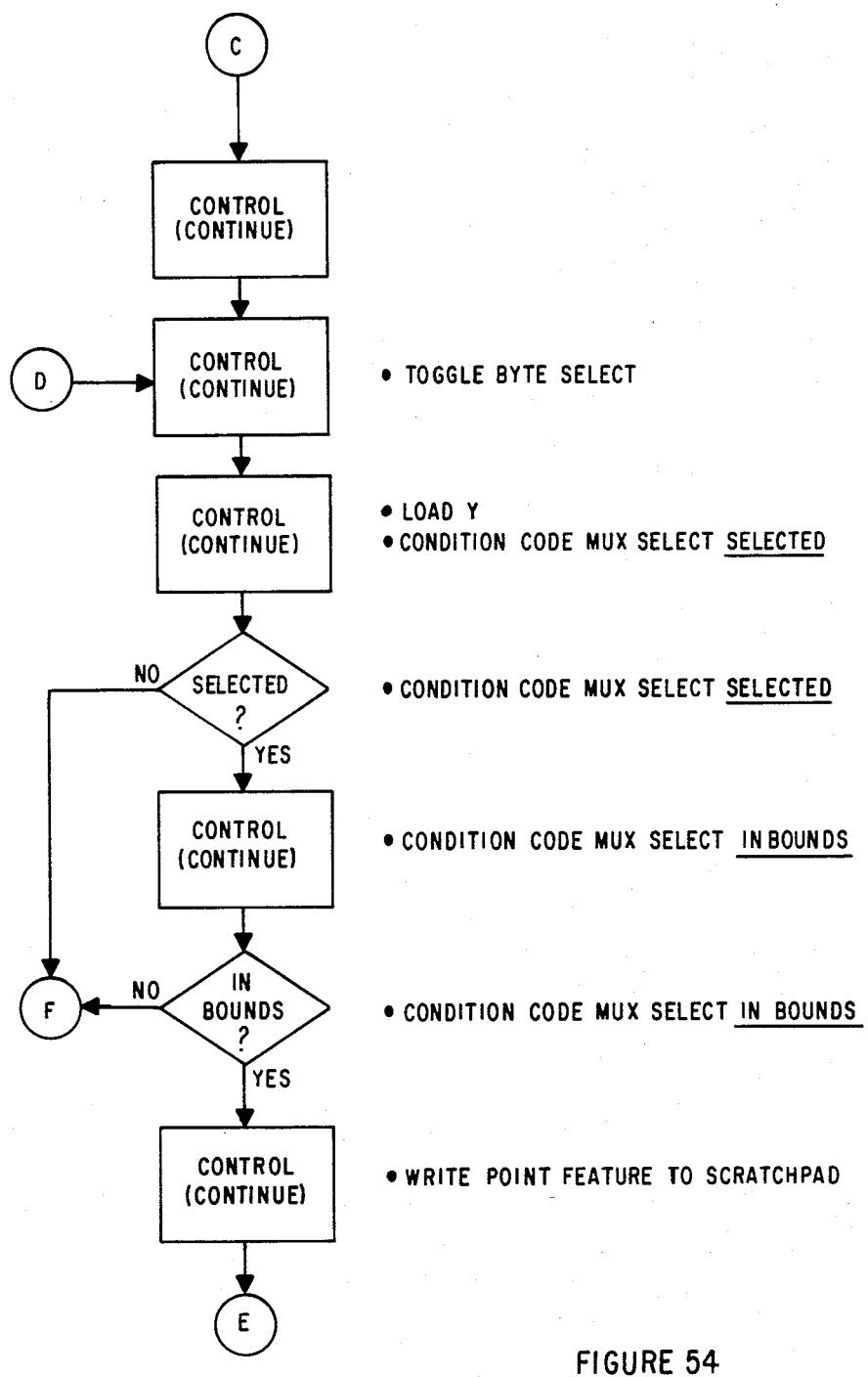
Figure 55:
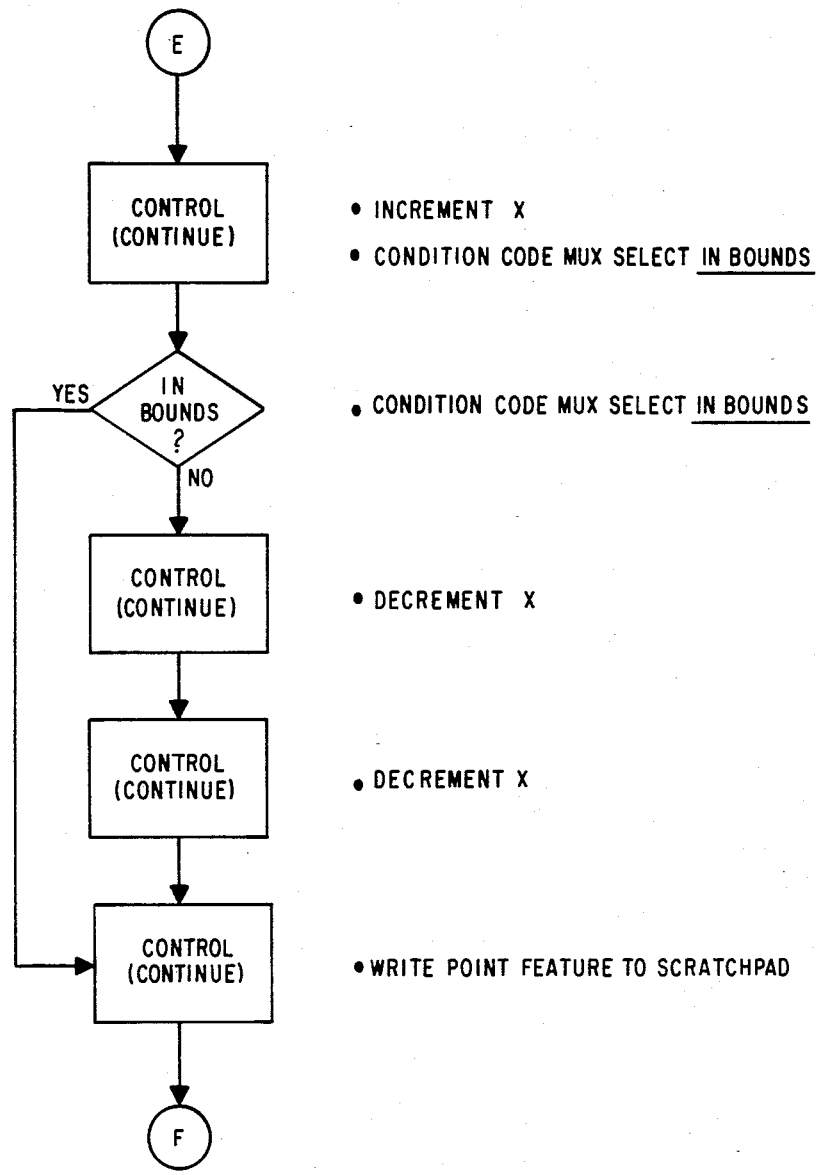
Figure 56:
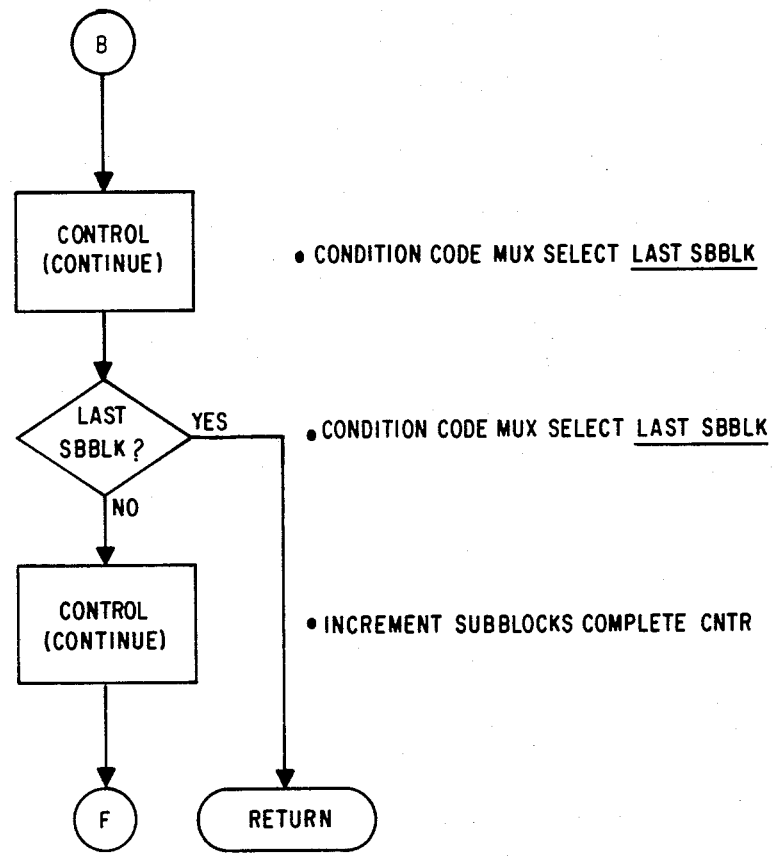

Looking to the example illustrated in FIG. 15, in which the data on a 25 meter scale is changed to a 50 meter scale in the cultural scratch pad memory 180, two cultural features are designated in the reconstructed data by the letters H and K. Since the addresses generated by the address counter 152 and 162 will be modified in accordance with the scale factor in the example illustrated in FIG. 15 to provide a shifting of the address by one place to the right, thereby dividing the addresses in both the X and Y directions by 2, four pixels in the reconstructed data will in effect be allocated to a single pixel position within the cultural scratch pad memory 180. In this combining of pixels, a problem arises when the four pixels to be reduced to a single pixel in the memory 180 represent different cultural features. Thus, as seen by the four pixels circled in the left-hand portion of FIG. 15, two of the pixels relate to the feature K and two of the pixels relate to the feature H. In such a situation, the question arises as to whether the feature ID inserted in the memory 180 at the single pixel position will relate to the feature H or the feature K. In the present example, the proper feature identification for the single pixel position in the memory 180 relates to the feature K. Thus, if that pixel position is identified with the feature K, the stored data will be erroneous, and produce a problem in the subsequent reproduction of the data, especially for area features, where this boundary will cause a designation of the feature K to be filled in along the remaining portion of the line.

This problem is handled in the following way in accordance with the present invention. Where the X and Y addresses are divided to take into consideration a change in scale factor, it will be noted that division of an integer by 2 will always provide one fractional bit, while division of an integer by 4 will always provide two fractional bits. In the example of FIG. 15, the bit H at the X address 120 will be relocated in the memory 180 at the X position 60.0 while the K bit at the X address 121 will be provided with a modified X address 60.5. Thus, by looking at the fractional bits of the modified addresses, where the integers of two addresses are the same, it is apparent that the address having the larger fractional bit will represent a pixel to the right of the other pixel. In other words, considering the pixels at the X addresses 120 and 121 in FIG. 15, the pixel H at address 120 will receive the modified address 60 while the pixel K at address 121 will receive the modified address 60.5. Since the K pixel has the larger of the two fractional bits, it is apparent that this pixel is to the right of the pixel H.

Referring to FIG. 7b, as part of the reconstruction of area features, when an X address consisting of five integer bits (MSB's) and two fractional bits (LSB's) is applied to the cultural scratchpad memory 180 via the refresh and address multiplexer and control circuit 175 from the adder 170, the two fractional bits (LSB's) of this address applied to data input multiplexer 177 via line 178 so as to be written into the addressed pixel location in the memory 180 along with the feature identification for that pixel. The multiplexer 177 is controlled by the microsequencer 150 to perform this operation. When the next X address is received from the adder 170, the two fractional bits previously stored in the memory 180 are read out to register 182. These two bits in register 182 (now MSB's) are then compared to the two fractional bits of the incoming X address in comparator 185 to determine which is larger. If the fractional bits on line 178 represent a larger value than the fractional bits in register 182, then the comparator 185 will control the microsequencer 150 to override causing the previously-stored feature identification to be overwritten by the new feature identification through multiplexer 177. If the value of the fractional bits stored in the register 182 is larger, the comparator 185 will control the microsequencer 150 to inhibit the writing of the new feature identification into that pixel position.

In this way, for area features, where the scale factor results in more than one pixel being allocated to a single pixel position in memory 180, the feature identification stored in that single pixel position will correspond to the feature identification of the right-most one of these plural pixels. Thus, left-facing boundaries of area features will not be lost as a result of changes in scale factor. This operation is not required for linear features, however, since no fill-in operation is required for such features, and therefore, only a single erroneous pixel could result in the reconstruction thereof. In this regard, the reconstruction of area boundaries is followed by a fill-in process in which the areas within these boundaries are filled in. This is followed by reconstruction of linear and then point features which are written over previously-stored data.

The fill-in process for area features again involves the use of register 182, along with an additional register 183 and a zero detector 186. For this process the address generator 176 is enabled by the microsequencer 150 to scan the cultural scratchpad memory 180 to cause the data to be read out to the register 182. As each scratchpad memory location (6- bits) is stored in the register 182, the zero detector 186 will analyze this data to determine whether it is zero. If it is not zero, the content of register 182 will be transferred to register 183 and stored back in memory 180 at the same pixel position. On the other hand, if the content of register 182 is found to be zero by detector 186, the feature identification last stored in register 183 will be written into the pixel position in memory 180.

Thus, in scanning across the memory 180 from one pixel position to the next, each pixel position will have zero stored therein except for those pixels which form the boundaries of an area feature. For this reason, when non-zero data is encountered, as detected by zero detector 186, the microsequencer 150 will cause that new feature identification to be stored in register 183 in place of any data previously stored therein, and all subsequently-scanned pixel positions having zero data will receive this same feature identification from register 183 via multiplexer 177 until a pixel having a new feature identification is encountered. By this means, the area features are filled in to complete the area feature data stored in the memory 180.

FIG. 7c illustrates a portion of the cultural reconstruction processor which controls the feature identification and makes possible selected control over the processor by the memory management control 25. A cultural preselect RAM 120 stores the identification values for the various cultural features, which are grouped in three categories—line features, area features and point features. Thus, different code values are provided for different types of cultural features. For example, different linear features such as two-lane roads, four-lane roads, streams, rivers and the like may be designated by different coded values; while, area features such as forests, swamps, lakes, farm lands and the like may be designated by a different set of code values. These code values are stored in the cultural preselect RAM and are read out as data to a register 125 in response to a feature address received from the feature data line 112 via the multiplexer 115 under control of the microsequencer 150. This data which designates the various cultural features as stored in the RAM 120 can be selectively changed under control of the memory management control 25 by addressing the RAM 120 via line 122 and multiplexer 115 while supplying the data to be written into the RAM 120 via the line 123.

As indicated previously in conjunction with FIG. 2, the memory management control 25 controls the transfer of data from the cassette tape to the intermediate memory 20 and also controls the reading of the sub-blocks of cultural data from the intermediate memory 20 for application to the reconstruction processor 30. Thus, the memory management control 25 provides on the data line 123 information concerning the sub-block number of the data being read from the intermediate memory 20, which data is stored in the register 116. In addition, the memory management control 25 is responsive to instructions received through the external interface 90 from the operator of the aircraft concerning the scale factor desired in the resulting display of the terrain data, and information concerning this scale factor is supplied as data on line 123 to the register 117.

The scale factor designation provided in the register 117 is also supplied through a multiplexer 121 to control whether a particular cultural feature is to be included in the resulting display or inhibited in the display. In this regard, if all cultural features are simultaneously displayed, the resulting display may appear to be cluttered and unintelligible to the viewer. For example, when a scale of 12.5 m is selected, it will be desirable to see such minor features as single lane or unimproved roads, small streams and the like; however, at a 100 m scale, such small features would clutter the display and may be confused with other features. Thus, the system provides an automatic select/deselect feature for controlling display of features on the basis of the scale factor.

The different values of feature identification will be mapped into different colors in the resulting video display so that different cultural features will appear as different colors on the display. This provides for ease in distinguishing between various features and lends a more-natural appearance to the natural cultural features which appear in the terrain being displayed.

While we have shown and described an exemplary embodiment in accordance with the present invention, it is understood that the invention is not limited to the details shown and described herein but is intended to cover all changes and modifications as obvious to one of ordinary skill in the art, and we, therefore, do not wish to be limited to the details shown and described herein but intend to cover all such changes and modifications known to those skilled in the art.

What is claimed is:

1. A method of compressing data which is to produce an area feature in a display which is to be scanned in a predetermined direction, comprising the steps of:
   eliminating all points of the area feature except for those points which form the boundary thereof;
   eliminating the points which form that part of the boundary of the area feature which faces opposite said predetermined scanning direction; and
   storing an address of an initial point at one end of the remaining part of the boundary of the area feature along with at least one delta code value which identifies a further point on the remaining part of the boundary with respect to the direction of the boundary at said initial point.

2. A method according to claim 1, which further includes storing an initial direction code identifying an initial direction of said remaining part of the boundary at the initial point at said one end thereof.

3. A method according to claims 1 or 2, further including storing a feature identification code which identifies a characteristic said area feature is meant to depict.

4. A method according to claim 2, wherein a plurality of delta code values are stored which identify successive points on the boundary in relation to the direction of the boundary at each individual point.

5. A method according to claim 4, wherein said delta code values are selected from an elongated footprint pattern of points which is oriented so as to extend at each point on the boundary part being compressed away from that point in the direction of the boundary up to that point.

6. A method according to claim 5, wherein said elongated fqotprint pattern includes a major lobe and a contiguous minor lobe, the orienting of said footprint pattern so as to select said delta code values at each point including positioning said pattern so that the point on the boundary falls within said minor lobe and said major lobe extends away from said point in the direction of the boundary to that point.

7. A method of compressing cultural data which is to produce linear and area features in a moving map display of terrain which is generated through scanning of data in a predetermined direction, comprising the steps of:
   eliminating all points of each area feature except for those points which form a linear boundary thereof;
   eliminating the points of that part of the linear boundary of said area features which face opposite said predetermined scanning direction so that only linear boundary parts remain;
   storing an address of an initial point at one end of each of said linear features and said linear boundary parts; and
   storing a plurality of delta code values which identify respective points on said linear features and said linear boundary parts with respect to the direction of the corresponding linear feature or linear boundary part at the initial point thereof.

8. A method according to claim 7, wherein the addresses of the initial points and the delta code values of said linear boundary parts are stored prior to the storing of the addresses of the initial points and delta code values of said linear features.

9. A method according to claim 8, further including the step of storing a special code indicating the start of linear feature data between the stored linear boundary part data and the stored linear feature data.

10. A method according to claim 7 or 8, further including the step of storing with the addresses and delta code values of said linear boundary parts and linear features respective feature identification codes which identify a characteristic thereof which is to be depicted in said display.

11. A method according to claim 7, further including the step of storing initial direction codes identifying initial directions of said linear boundary parts and said linear features at the initial points thereof.

12. A method according to claim 11, in which a plurality of delta code values are stored for each linear boundary part and each linear feature, which delta code values identify successive points in relation to the direction of the linear boundary part or linear feature at the previous point thereof.

13. A method according to claim 12, wherein said delta code values are selected from an elongated footprint pattern of points which is oriented so as to extend at each of said successive points on said linear boundary part or said linear feature away from that point in the direction of the linear boundary part or linear feature at that point.

14. A method according to claim 13, wherein said elongated footprint pattern includes a major lobe and a contiguous minor lobe, the orienting of said footprint pattern so as to select said delta code values at each of said successive points including positioning said pattern so that the point on the linear boundary part or the linear feature falls within said minor lobe and said major lobe extends away from said point in the direction of the linear boundary part or the linear feature to that point.

15. A reconstruction processor for reconstructing compressed digital data which is derived from a linear feature in an image pattern to be displayed, said compressed digital data including an address for the initial point at one end of said linear feature, an initial direction code indicating an initial direction for the linear feature at the initial point and at least one delta code value identifying a further point on said linear feature on the basis of said initial direction comprising sequencer control means for producing a plurality of timing and control signals in response to stored instructions and applied status and direction signals to control reconsturction of said compressed digital data;

address counter means for effecting selective incrementing and decrementing of a preset address in response to said sequencer control means so as to step through successive states corresponding to a plurality of memory addresses;

means for presetting said address counter means to a preset state in accordance with the initial point address in said compressed digital data;

footprint memory means responsive to said applied delta code value for producing direction signals indicating whether said address counter means is to increment or decrement said preset address as well as signals indicating the number of steps of incrementing or decrementing to be performed and the amount of the incrementing or decrementing to be performed at each step thereof;

means for applying the output signals of said footprint memory means to said address counter means and said sequencer control means;

data memory means for storing reconstructed digital data which is to be used to produce said linear feature in said display; and storing means for causing data to be stored in said data memory means at each memory location corresponding to the successive states of said address counter means including said preset state, said data stored in said data memory means corresponding to said reconstructed linear feature.

16. A reconstruction processor according to claim 15, wherein said sequencer control means includes a microsequencer providing control signals to said address counter means to effect successive incrementing or decrementing of the contents thereof by a specified amount for each of a designated number of steps according to the direction signals received from said footprint memory means.

17. A reconstruction processor according to claim 16, wherein said sequencer control means further includes a step counter which is preset under control of said microsequencer to a value equal to the number of steps indicated by the output signal from said footprint memory means and is decremented by said microsequencer in synchronism with each step of incrementing or decrementing by said address counter means, and zero detector means responsive to a zero state of said step counter for signaling said microsequencer to stop the incrementing or decrementing by said address counter means.

18. A reconstruction processor according to claim 17, further including multiplier means connected between said footprint memory means and said step counter for selectively multiplying the value to which said step counter is preset by a predetermined factor related to a selected scale factor of the resulting display.

19. A reconstruction processor according to claims 15 or 18, wherein said footprint memory means includes a memory having a plurality of storage locations which are unequally addressed by respective delta code values and which store data corresponding to points which form an elongated footprint pattern, the data stored in each storage location comprising a fractional value, a value equal to the number of steps of incrementing or decrementing to be performed and a change in direction value, the data stored in each storage location relating to the position of a respective point in said footprint pattern and the initial direction indicated by said initial direction code.

20. A reconstruction processor according to claim 19, wherein said footprint memory means further includes register means for storing said initial direction code, logic circuit means responsive to the content of said register means and the change in direction value produced by said memory in response to an applied delta code value for generating a new direction code value, and means for inserting said new direction code value into said register means in place of the previous contents thereof.

21. A reconstruction processor according to claim 15, wherein said compressed digital data further includes a feature identification code which identifies a characteristic which said linear feature is meant to depict in said display, and wherein said storing means includes means responsive to said feature identification code and the successive states of said address counter means for storing in said data memory means a data value related to said feature identification code at memory locations identified by the successive addresses generated by said address counter means.

22. A reconstruction processor according to claims 15 or 21, further including address modification means for modifying the addresses generated by said address counter means in accordance with a selected scale factor and means for applying said modified addresses to said storing means to control the storing of data in said data memory means in response thereto.

23. A reconstruction processor according to claim 22, wherein said address modification means includes a digital shifting circuit for selectively shifting the digital contents of said address counter means and means for adding or subtracting selected numerical values to the output of said digital shifting circuit.

24. A reconstruction processor for reconstructing compressed digital data which is derived from an area feature in an image pattern to be displayed, said compressed digital data representing a partial boundary of the area feature in the form of a line and including an address for the initial point at one end of said line, an initial direction code indicating an initial direction for the line at said initial point and at least one delta code value identifying a further point on said line on the basis of said initial direction, comprising sequencer control means for producing a plurality of timing and control signals in response to stored instructions and applied status and direction signals to control reconsturction of said compressed digital data;

address counter means for effecting selective incrementing and decrementing of a preset address in response to said sequencer control means so as to step through successive states corresponding to a plurality of memory addresses;

means for presetting said address counter means to a preset state in accordance with the initial point address in said compressed digital data;

footprint memory means responsive to said applied delta code value for producing direction signals indicating whether said address counter means is to increment or decrement said preset address as well as signals indicating the number of steps of incrementing or decrementing to be performed and the amount of the incrementing or decrementing to be performed at each step thereof;

means for applying the output signals of said footprint memory means to said address counter means and said sequencer control means;

data memory means for storing reconstructed digital data which is to be used to produce said area feature in said display including a scratchpad memory having storage locations for the points in an area of said image pattern including said area feature;

storing means for causing data having a preselected value to be stored in said data memory means at each memory location corresponding to the memory addresses generated by said address counter means; and means for filling in the remaining storage locations in said scratchpad memory subsequent to the storing operation of said storing means including means for scanning the storage locations of said scratchpad memory in successive lines and means for inserting into each storage location along a given scanning line which has zero value data therein a data value corresponding to that of the last storage location encountered on that line which had a non-zero data value.

25. A reconstruction processor according to claim 24, wherein said footprint memory means includes a memory having a plurality of storage locations which are unequally addressed by respective delta code values and which store data corresponding to points which form an elongated footprint pattern, the data stored in each storage location comprising a fractional value, a value equal to the number of steps of incrementing or decrementing to be performed and a change in direction value, the data stored in each storage location relating to the position of a respective point in said footprint pattern and the initial direction indicated by said initial direction code.

26. A reconstruction processor according to claim 25, wherein said footprint memory means further includes register means for storing said initial direction code, logic circuit means responsive to the content of said register means and the change in direction value produced by said memory in response to an applied delta code value for generating a new direction code value, and means for inserting said new direction code value into said register means in place of the previous contents thereof.

27. A reconstruction processor according to claims 24 or 26, wherein said compressed digital data further includes a feature identification code which identifies a characteristic which said linear feature is meant to depict in said display, and wherein said storing means includes means responsive to said feature identification code and the successive states of said address counter means for storing in said data memory means a data value related to said feature identification code at memory locations identified by the successive addresses generated by said address counter means.

28. A reconstruction processor according to claim 24, further including address modification means for modifying the addresses generated by said address counter means in accordance with a selected scale factor and means for applying said modified addresses to said storing means to control the storing of data in said data memory means in response thereto.

29. A reconstruction processor according to claim 28, further including step counter means which is operated under control of said sequencer control means to count the number of steps of incrementing or decrementing performed by said address counter means and for producing an output when said count reaches the value equal to the number of steps designated by said footprint memory means.

30. A reconstruction processor according to claim 29, further including multiplexer means for increasing the number of steps designated by said footprint memory means by an integral factor related to the selected scale factor.

31. A reconstruction processor for reconstructing compresssed digital data which is derived from linear and area features in an image pattern to be displayed, wherein said compressed digital data represents a line forming a linear feature or a partial boundary of an area feature and includes an X-Y address for the initial point at one end of said line, an initial direction code indicating an initial direction for the line at said initial point on the basis of coordinate X and Y directions in said image pattern and a plurality of delta code values identifying further points on said line on the basis of said initial direction, said reconstruction processor comprising:

address counter means for effecting selective incrementing and decrementing of the X and Y components of said initial point address in unit and designated fractional amounts and for outputting X and Y memory address signals identifying generated points on said line in accordance with the successive states thereof;

footprint memory means responsive to each successively-applied delta code value for producing a first output signal indicating the number of steps of incrementing or decrementing to be performed by said address counter means, a second output signal indicating a designated fractional amount of incrementing or decrementing to be performed by said address counter means, and a directional signal representing the extent of the change in direction to be attributed to the particular delta code value;

logic means for logically combining said direction signal from said footprint memory means attributed to a first delta code value with said initial direction code to produce a new direction code and for logically combining successive directional signals with successively-produced new direction codes, said logic means including means for producing an output for each new direction code including a bit indicating whether unit incrementing is to be for the X or Y address component, another bit indicating whether the X address component is to be incremented or decremented and a bit indicating whether the Y address component is to be incremented or decremented;

control means responsive to said first and second outputs of said footprint memory means and the output of said logic means for controlling operation of said address counter means to generate a plurality of X and Y memory address signals for each delta code value in said compressed digital data; and storage means for storing a data identification at coordinate locations identified by the X and Y memory address signals generated by said address counter means.

32. A reconstruction processor according to claim 31, further including address modification means for modifying the X and Y memory address signals generated by said address counter means in accordance with a selected scale factor and means for applying said modified X and Y memory addresses to said storage means to control the storing of data identifications at said coordinate locations.

33. A reconstruction processor according to claim 31, wherein said control means includes multiplier means for selectively multiplying the value of said first output signal of said footprint memory means by an integral value in accordance with a predetermined selected scale factor.

34. A reconstruction processor according to claim 31, wherein said storage means includes a data memory having coordinate storage locations for the points in an area of said image pattern including said area features represented by said compressed digital data and fill-in means operating subsequent to the storing of said data identifications at the coordinate locations identified by the X and Y addresses generated by said address counter means to reconstruct the partial boundaries of one or more area features, for filling in the remaining coordinate storage locations in said data memory in accordance with the data identifications already stored so as to reconstruct said area feature or features.

35. A reconstruction processor according to claim 34, wherein said fill-in means includes means for scanning said data memory in successive lines to read out the data stored therein, means for detecting whether data read from successive storage locations in each scanning line is zero or non-zero data, means for reinserting in those storage locations in which non-zero data is detected the same data previously stored therein and for inserting in storage locations in which zero data is detected the data identification corresponding to that stored in the last storage location of the same scanning line which had non-zero data stored therein.

36. A reconstruction processor according to claim 31, wherein said footprint memory means includes a memory having a plurality of storage locations which are uniquely addressed by respective delta code values and which store data corresponding to points which form an elongated footprint pattern.

37. A reconstruction processor according to claim 31, wherein said logic means includes a register for storing said initial direction code and said new direction codes generated in response to each delta code value, adder means for adding the directional signal received from said footprint memory means to the content of said register to produce said new direction code and means for replacing the previous content of said register with the newly-generated new direction code.

38. A reconstruction processor according to claims 31, 36 or 37, wherein said compressed digital data represents a plurality of lines representing at least two different types of linear and/or area features and includes a feature identification code as part of the data representing each feature, further including means responsive to said feature identification code for supplying said data identification to said storage means to store at said coordinate locations a data identification which identifies a characteristic which the respective feature is to depict in a display.

39. A reconstruction processor according to claim 38, wherein said means for supplying said data identification to said storage means includes a preselection memory which is responsive to said feature identification codes for generating said data identifications and means responsive to a scale factor signal for inhibiting the generation of selected data identifications for certain predetermined scale factors.

40. A reconstruction processor according to claim 39, further including address modification means for modifying the X and Y memory address signals generated by said address counter means in accordance with a selected scale factor and means for applying said modified X and Y memory addresses to said storage means to control the storing of data identifications at said coordinate locations.

41. A reconstruction processor according to claim 40, wherein said control means includes multiplier means for selectively multiplying the value of said first output signal of said footprint memory means by an integral value in accordance with a predetermined selected scale factor.

42. A reconstruction processor according to claim 40, wherein said address modification means includes a digital shifting circuit for selectively shifting the X and Y addresses from said address counter means and means for adding or subtracting selected numerical values to the output of said digital shifting circuit in accordance with said selected scale factor.

43. A reconstruction processor accirding to claim 42, wherein said storage means includes means for comparing fractional bits of successive modified X address signals having the integral address values and for storing the data identification of that modified X address signal having the larger value fractional bits in the coordinate location of the integral address value.

* * * * *